United States Patent [19]

Nakai et al.

[11] Patent Number: 4,529,288
[45] Date of Patent: Jul. 16, 1985

[54] CAMERA SYSTEM WITH INTERCHANGEABLE OBJECTIVE LENS

[75] Inventors: Masaaki Nakai, Nara; Masayoshi Sahara, Sennan; Nobuyuki Taniguchi, Tondabayashi, all of Japan

[73] Assignee: Minolta Camera Kabushiki Kaisha, Osaka, Japan

[21] Appl. No.: 529,969

[22] Filed: Sep. 7, 1983

[30] Foreign Application Priority Data

Sep. 9, 1982 [JP] Japan .................................. 57-157895

[51] Int. Cl.³ .......................... G03B 7/097; G03B 7/20
[52] U.S. Cl. ...................................... 354/442; 354/286
[58] Field of Search ........................ 354/410, 441–445, 354/455, 460, 456, 286, 289.12

[56] References Cited

FOREIGN PATENT DOCUMENTS

| 108628 | 8/1979 | Japan | 354/289.12 |
|---|---|---|---|
| 55-143542 | 11/1980 | Japan | 354/442 |
| 56-74226 | 6/1981 | Japan | 354/432 |
| 56-107221 | 8/1981 | Japan | 354/455 |

*Primary Examiner*—William B. Perkey
*Attorney, Agent, or Firm*—Joseph W. Price

[57] ABSTRACT

A camera system having an interchangeable objective lens selectively mountable to at least two different types of camera bodies of a, first type and second type, is involved. The camera system has a ROM located in the interchangeable objective lens for storing a plurality of compensation data: one is suitable for the first type camera body; and the other is suitable for the second type camera body. Each data compensates an error in fully-open aperture light measurement for each type of camera. The compensation data is transmitted from the lens to the camera body. A register is provided in the camera body for storing a selected compensation data which is necessary for the type of camera body mounted with the lens. A device is provided in the camera body for practicing a fully-open aperture light measurement through the interchangeable objective lens to produce a light measuring information including the light measurement error. A calculator is provided in the camera body for calculating a correct exposure information using the compensation data stored in the register and the light measuring signal, whereby the error included in the light measuring signal can be removed.

14 Claims, 19 Drawing Figures

CAMERA SYSTEM WITH INTERCHANGEABLE OBJECTIVE LENS

BACKGROUND OF THE INVENTION

1. Field of the Invention

The present invention relates to a camera system with an interchangeable objective lens and, more particularly, to a compensation of an error related to the fully-open aperture in the camera system.

2. Description of the Prior Art

In the field of a camera system with an interchangeable objective lens, an error related to the fully-open aperture occurs when the light measuring is carried out through the fully-open aperture under the TTL light measuring system.

Generally, in a TTL camera system with an interchangeable objective lens designed to measure light through the fully-open aperture, the light measuring output characteristics vary with respect to the details of the optical system, e.g., the location and diameter of the exit pupil, or to the details of the light measuring optical system, e.g., a deviation between the position where a light receiving element is located and the optical equivalent position of a film surface or a manner of diffusion of incident light to the light receiving element.

When a light amount of an object having a certain brightness is measured with a camera mounted with a certain interchangeable lens, the camera shows a different measured amount of light with respect to the type of mounted interchangeable lens. Therefore, unless the measured amount of light is compensated, the correct exposure control cannot be accomplished. Generally, the error caused by this measured amount of light (referred to as a fully-open aperture light measurement error) is expressed by a difference between the measured amount of light with a standard interchangeable lens (for example, a 50 mm/F1.4 lens) and that with another interchangeable lens.

Conventionally, various ways to compensate the fully-open aperture light measurement error have been proposed, and they can be divided into two groups. The first group is disclosed, for example, in Japanese Patent Laid-Open Publication No. 56-107221. According to this article, a means for generating a signal corresponding to the fully-open aperture light measurement error inherent to each type of interchangeable lens is provided in each interchangeable lens. The generated signal is transferred to the camera body for compensating the amount of light measured by the camera body. The generating means can be a type that generates a signal directly representing the fully-open aperture light measurement error or a type that generates a signal representing an amount of shift to be effected in a device for transmitting an aperture signal.

The second group is disclosed, for example, in Japanese Patent Laid-Open Publication Nos. 55-143542 and 56-74226. According to these articles, the camera body calculates a fully-open aperture light measurement error based on information of fully-open aperture size or focal length, as obtained from an interchangeable lens. The calculated error is used for compensating a measured light amount.

According to the prior art camera systems, however, the amount of fully-open aperture light measurement error differs not only when a different type of lens is mounted on the same type of camera body, but also when the same type of lens is mounted on a different type of camera body having a different optical system for the light measurement. Therefore, the above-mentioned prior art camera system has follow disadvantages.

In regard to the first group, the generating means provided in each interchangeable lens is stored with a signal corresponding to the fully-open aperture light measurement error, but such a signal can be used properly in one particular type of camera body, and can not be used in the other types of camera bodies having a different light measuring system. In other words, when an interchangeable lens of the first group is mounted on a camera body of a type other than said one particular type, the signal produced from the generating means does not correspond to the fully-open aperture light measurement error and, therefore, the measured light amount will not be corrected properly. Although this disadvantage can be removed by providing the same optical light measurement system to each of different types of camera bodies, this is not appropriate because the design freedom and the specification of light measuring characteristic may be undesirably limited, resulting in a high manufacturing cost.

In regard to the second group, the camera body may be provided with a calculator which calculates various compensation values for different types of interchangeable lens to correct the error. But, such a calculator may be complicated and very difficult to prepare. Thus, according to the prior art, estimated corrections described below are carried out.

In the case of compensating the error of the measured amount of light based on the information of a fully-open aperture, the compensation corresponding to the diameter of the exit pupil of the interchangeable lens is carried out to some degree, but no compensation corresponding to the position of the exit pupil is carried out. And, in the case of compensating the error of the measured amount of light based on the information of focal length, the compensation corresponding to the position of the exit pupil is carried out to some degree, but no compensation corresponding to the diameter of the exit pupil is carried out. Thus, according to the prior art, compensation with a high accuracy can not be accomplished.

An error related to the fully-open aperture also occurs when exposure control is taking place. Generally, an image is formed by a picture-taking lens (objective lens) with a highest illumination at the center, where the optical axis passes, and the illumination is reduced towards the periphery of the image. Such a reduction of illumination at the peripheral portions is great particularly when the lens is set at the fully-open aperture position or around this position because of the phenomenon of the vignetting. Therefore, when the lens is set at the fully-open aperture position, the illumination of the image averagedly estimated within a predetermined extent of area, e.g., an 18 mm diameter circle, including its center will be considerably less than the case of a stopped-down aperture position due to the great reduction of illumination at the peripheral portions; although the central illumination may be identical regardless of the aperture position. Thus, in an exposure control system for controlling the exposure based on the calculated aperture value, the amount of light actually exposed will be averagedly estimated as an under exposure, when the aperture is to be set equal to or near the fully-open position according to the calculated aperture value. In such a way, an exposure error takes place.

SUMMARY OF THE INVENTION

Accordingly, it is an object of the present invention to provide an improved camera system with an interchangeable lens which can compensate errors related to the fully-open aperture.

It is another object of the present invention to provide an improved camera system with an interchangeable lens which can control the exposure with a high accuracy.

It is a further object of the present invention to provide an improved camera system with an interchangeable lens which can compensate the fully-open aperture light measurement error.

It is a still further object of the present invention to provide an improved camera system with an interchangeable lens which can compensate the fully-open aperture light measurement error not only when a different type of interchangeable lens is mounted but also when an interchangeable lens is mounted on a different type of camera body.

It is another object of the present invention to provide an improved camera system with an interchangeable lens which can compensate the fully-open aperture light measurement error with a simple structure.

It is yet another object of the present invention to provide an improved camera system with an interchangeable lens which can compensate an error of exposure control which occurs when the aperture is set to its fully-open position, so as to provide an accurate exposure control.

In accomplishing these and other objects, an improved camera system according to the present invention has an outstanding feature in that the data necessary to compensate the error related to the fully-open aperture is stored in each interchangeable lens in digital form. The error is compensated in the camera body by reading and taking the data into the camera body.

According to the present invention, a camera system having a camera body and an interchangeable objective lens selectively attachable to the camera body and to at least one different camera body is involved. The camera system according to the present invention comprises: means located in the interchangeable objective lens for storing a plurality of compensation values suitable to the first mentioned camera body and to the at least one different camera body, respectively, to prepare for each case of compensating an error in fully-open aperture light measurement; means located in the interchangeable objective lens for transmitting the compensation data to the camera body to which the interchangeable objective lens is attached; means located in the first mentioned camera body for registering the compensation from the transmitting means; means located in the first mentioned camera body for controlling the camera system so that a predetermined one of the compensation values stored in the storing means is registered in the registering means; means located in the first mentioned camera body for practicing a fully-open aperture light measurement through the interchangeable objective lens to produce light measuring information including the error; and means located in the first mentioned camera body for calculating correct exposure information in response to the compensation data registered in the registering means and the light measuring signal, in which the error included in the light measuring signal is removed by utilizing the compensation value registered in the registering means.

By the above arrangement, the fully-open aperture light measurement error can be compensated with a high accuracy.

Also, according to the present invention, the camera system, having a camera body to be combined with an interchangeable objective lens which stores an exposure compensation value, which relates to exposure information other than the aperture size, such as the exposure time, for compensating an exposure error upon fully-open aperture size control, comprises: means for receiving the exposure compensating value from the interchangeable objective lens; means for practicing a light measurement to produce exposure information; means for providing aperture size information and exposure time information in response to the exposure information; means for determining whether or not the calculated aperture size information corresponds to the fully-open aperture size; means responsive to the determining means for modifying the exposure time information by the exposure compensating value when the calculated aperture size information corresponds to the fully-open aperture size, and for adopting the exposure time information as it is when the calculated aperture size information does not correspond to the fully-open aperture size; means for controlling the aperture size in response to the providing means; and means for controlling the exposure time in response to the modifying and adopting means.

By the above arrangement, the exposure error that takes place when the aperture is so controlled to be set to the fully-open position can be compensated with a high accuracy.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENT

Figure 1:
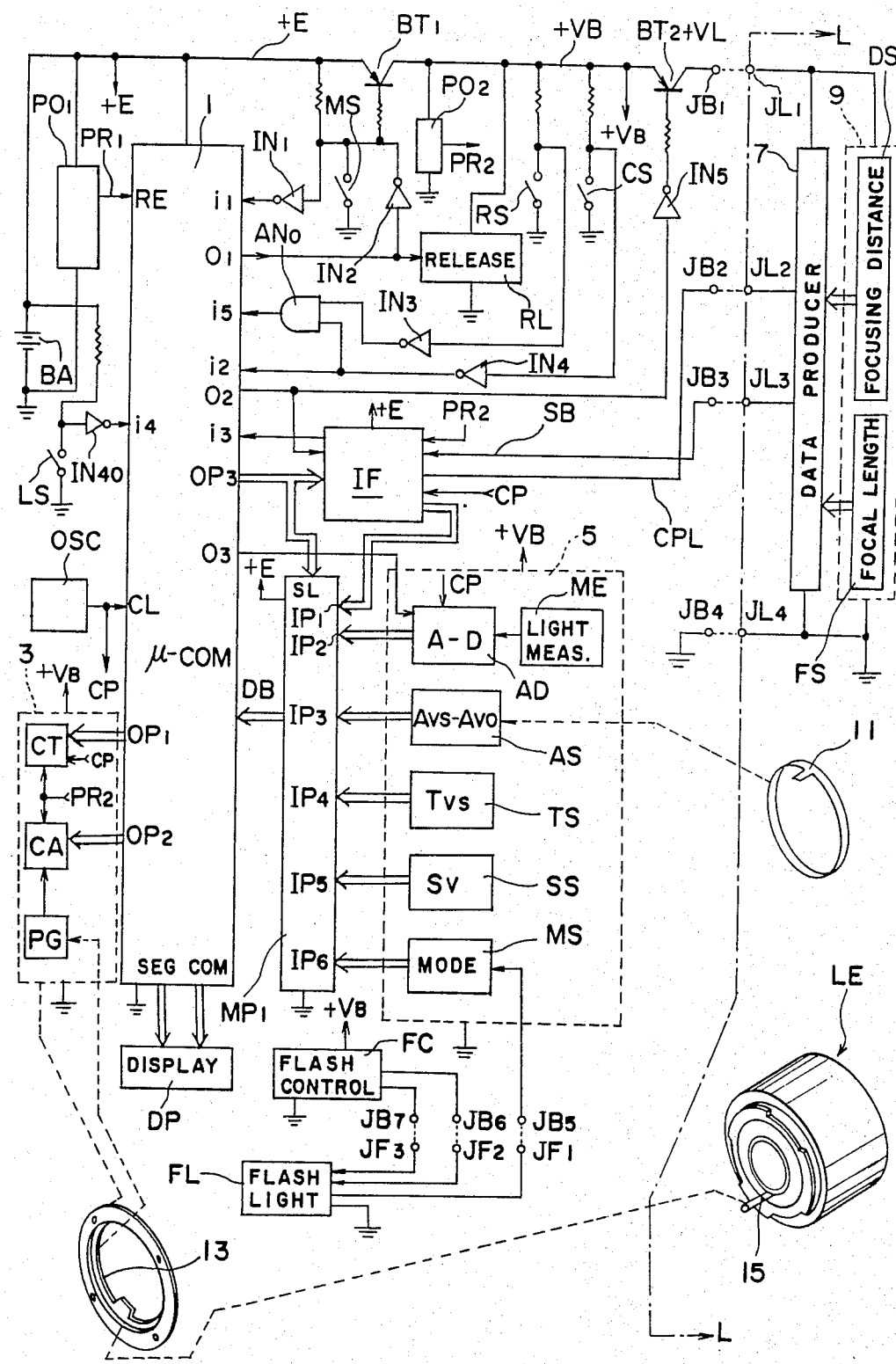
FIG. 1 is a block diagram of a camera system according to a preferred embodiment of the present invention.

Referring to FIG. 1, a camera system according to the present invention comprises a first portion to be employed in a camera body (not shown) and a second portion to be employed in a camera accessory, which is mountable on the camera body. The first portion is shown on the left-hand side of a line L—L shown in FIG. 1 and the second portion is shown on the right-hand side thereof. In a circuit diagram of FIG. 1, and also in FIGS. 4a, 4b, 8, 9 and 11, a broad line indicates a bundle of wires for transmitting a signal comprising a plurality of bits.

In FIG. 1, a reference number 1 designates a micro-computer or a micro-processor which sequentially controls the thorough operation of the camera system and also calculates to provide exposure information. When a battery BA is loaded in the camera, a power-on-reset circuit PO1 produces a power-on-reset signal PR1 which is applied to a reset terminal RE of the micro-computer 1. Accordingly, the micro-computer 1 is turned to a reset condition. A clock pulse generating means defined by an oscillator OSC is provided for producing a train of reference clock pulses CP which are applied to a clock terminal CL of the micro-computer 1 and also to other circuits for synchronizing the entire operation of the camera system shown in FIG. 1. A display device DP is formed, for example, by a liquid crystal and is operated in a time divided manner by signals obtained from segment terminal SEG and common terminal COM of the micro-computer 1 for the display of exposure control value, exposure control mode, warning indication, and so on. The micro-computer 1, the oscillator OSC and the display device DP, as well as other circuits, such as interface circuit IF, data selector MP1, inverters IN1 to IN5 and IN40, and AND gate AN0, receive electric power directly from the battery BA through a power line +E.

A normally open switch MS is a light measuring switch that closes when carrying out the light measuring operation. When the light measuring switch MS closes, an inverter IN1 produces a "HIGH" which is applied to an input i1 of the micro-computer 1. In response to the "HIGH" to the input i1, the micro-computer 1 reads data necessary for the exposure control and, at the same time, starts A-D (analog to digital) conversion of the signal from the light measuring circuit, exposure calculation and display operation. Furthermore, when the light measuring switch MS closes, a transistor BT1 conducts to provide electric power to a power line +VB, thus permitting the electric power supply to circuits in the camera body other than those which have been already receiving power from the power line +E. Moreover, when the transistor BT1 conducts, a power-on-reset PO2 produces a reset signal PR2, which is applied to each of exposure time control device CT and aperture control device CA, described later, for resetting them.

A circuit 3 enclosed by a broken line is an exposure control portion comprising exposure time control device CT, aperture control device CA, and pulse generator PG. The exposure time control device CT receives a fixed, or calculated, exposure time data Tvc. Tvc represents a value of time given in APEX numbering system. Similarly, other reference characters with a suffix of v, such as Av, Avo, Bv, Sv, Ev, represent values in APEX numbering system. Tvc is received from an output terminal OP1 of the micro-computer 1 and the time control device CT establishes a period of time relative to the data Tvc (i.e., a period of time $2^{-Tvc}$ from open-operation to close-operation of a shutter mechanism) using clock pulses CP so as to control the exposure time. The aperture control device CA receives a fixed, or calculated, stop-down degree data dAv from an output terminal OP2 of the micro-computer 1, and also pulses from the pulse generator PG. The pulse generator PG is provided operatively in association with a ring 13, which rotates together with a pin 15 in the interchangeable lens LE, and produces a number of pulses corresponding to the degree of rotation of the ring 13. More particularly, the interchangeable lens LE has a pin 15 connected to a diaphragm for the simultaneous movement about the axis of the lens LE with respect to the change of aperture size of the diaphragm, and is also connected to a first spring (not shown) for urging the diaphragm to fully open the aperture. On the other hand, the ring 13 has a projection which is held in contact with the pin 15 by an urging force of a second spring (not shown) connected to ring 13. The ring 13 further has a rack (not shown) which is engageable to a pawl (not shown). Since the second spring connected to the ring 13 is stronger than the first spring connected to the pin 15, the ring 13 starts to rotate by the force of the second spring when the pawl disengages from the rack, and, at the same time, the rotation of the ring 13 is transmitted to the pin 15 causing reduction of the aperture size of the diaphragm. During the rotation of the ring 13, the aperture control device CA counts the number of pulses from the pulse generator PG; the number of pulses corresponds to the degree of reduction of aperture size of the lens LE. The counted number is compared with the stop-down degree data dAv from the output OP1 of the micro-computer 1, and when these two match with each other, the pawl is so actuated as to stop the rotation of the ring 13, thus setting the diaphragm to a controlled aperture size.

A switch LS is a normally open switch provided for detecting whether the interchangeable lens LE is properly mounted on the camera or not. The switch LS closes when the interchangeable lens LE is mounted and locked to a camera mount, but it is maintained open when the locking is incomplete. When the switch LS closes, an inverter IN40 produces a "HIGH" which is applied to the micro-computer 1 through an input i4. In response to this, the micro-computer 1 starts to read data from the mounted lens LE and carries out an exposure calculation. On the contrary, when the switch LS is maintained open to provide a "LOW" to the input 4, the micro-computer reads no data from the lens, but carries out other calculations as will be described later.

Referring back to FIG. 1, a circuit portion enclosed by a broken line 5 is provided for producing exposure control data, and it includes light measuring circuit ME, A-D (analog to digital) converter AD, set aperture size signal producing device AS, set exposure time signal producing device TS, film sensitivity signal producing device SS, and mode signal producing device MS. The light measuring circuit ME is, for example, a TTL (through-the-lens) fully-open aperture metering type, and it produces a signal Bv-Avo-Avc in analog form and it is determined by the brightness Bv of an object, fully-opened aperture size Avo, and fully-open aperture light measurement error Avc (the error determined by the deviation of the light receiving element, which should be positioned at a predetermined distance from the film surface, and by the position of the exit pupil of the mounted lens) caused by the change of the lens. The A-D converter AD receives the signal Bv-Avo-Avc in analog form from the light measuring circuit ME, and converts it to digital form by a clock pulse CP in response to a positive going pulse from an output 03 of the micro-computer 1. The converted signal Bv-Avo-Avc in digital form is applied to a data selector MP1 at an input IP2.

The set aperture size signal producing device AS produces a data Avs-Avo and provides it to the data selector MP1 and an input IP3.

The set exposure time signal producing device TS produces a digital signal representing a manually set exposure time by way of an exposure time setting device (not shown) provided in the camera body. The output of the set exposure time signal producing device TS is connected to input IP4 of the data selector MP1.

The film sensitivity signal producing device SS produces a digital signal representing a manually set film sensitivity by way of a film speed setting device (not shown) provided in the camera body. The output of the film sensitivity signal producing device SS is connected to input IP5 of the data selector MP1.

And, the mode signal producing device MS produces a digital signal representing a manually selected mode by way of a mode selecting device (not shown), from a number of modes which are: exposure control mode; and a flash-light photographing mode wherein the mode signal producing device MS receives from the flash-light device FL through terminal JF1 of flash-light device side and terminal JB5 of camera body side, a charge completion signal indicating that a main capacitor (not shown) in the flash-light device FL is fully charged. The output of the mode signal producing device MS is connected to input IP6 of the data selector MP1.

Figure 4A:
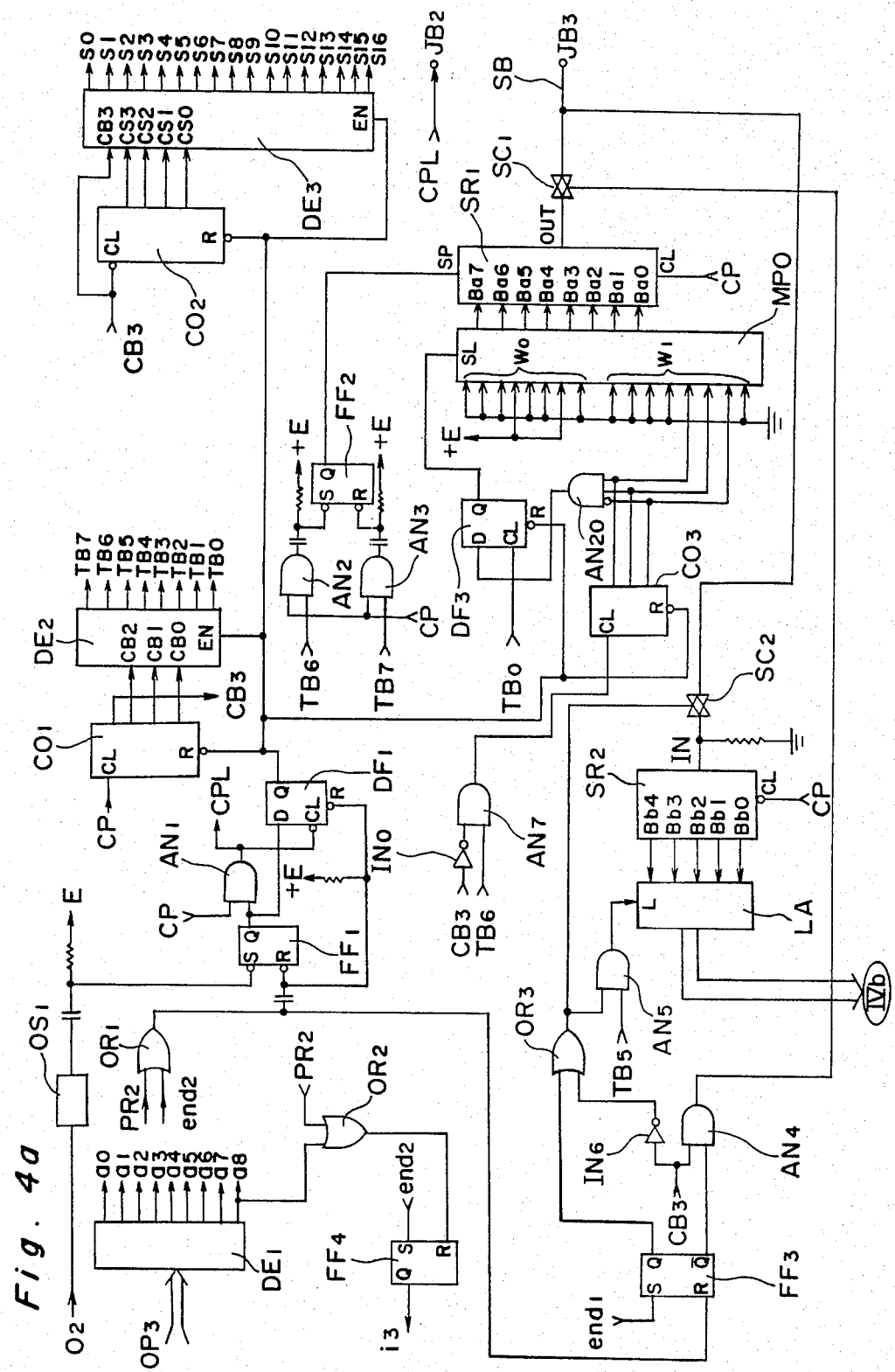
FIGS. 4a and 4b show an exemplified circuit diagram of an interface circuit IF shown in FIG. 1.
Figure 4B:
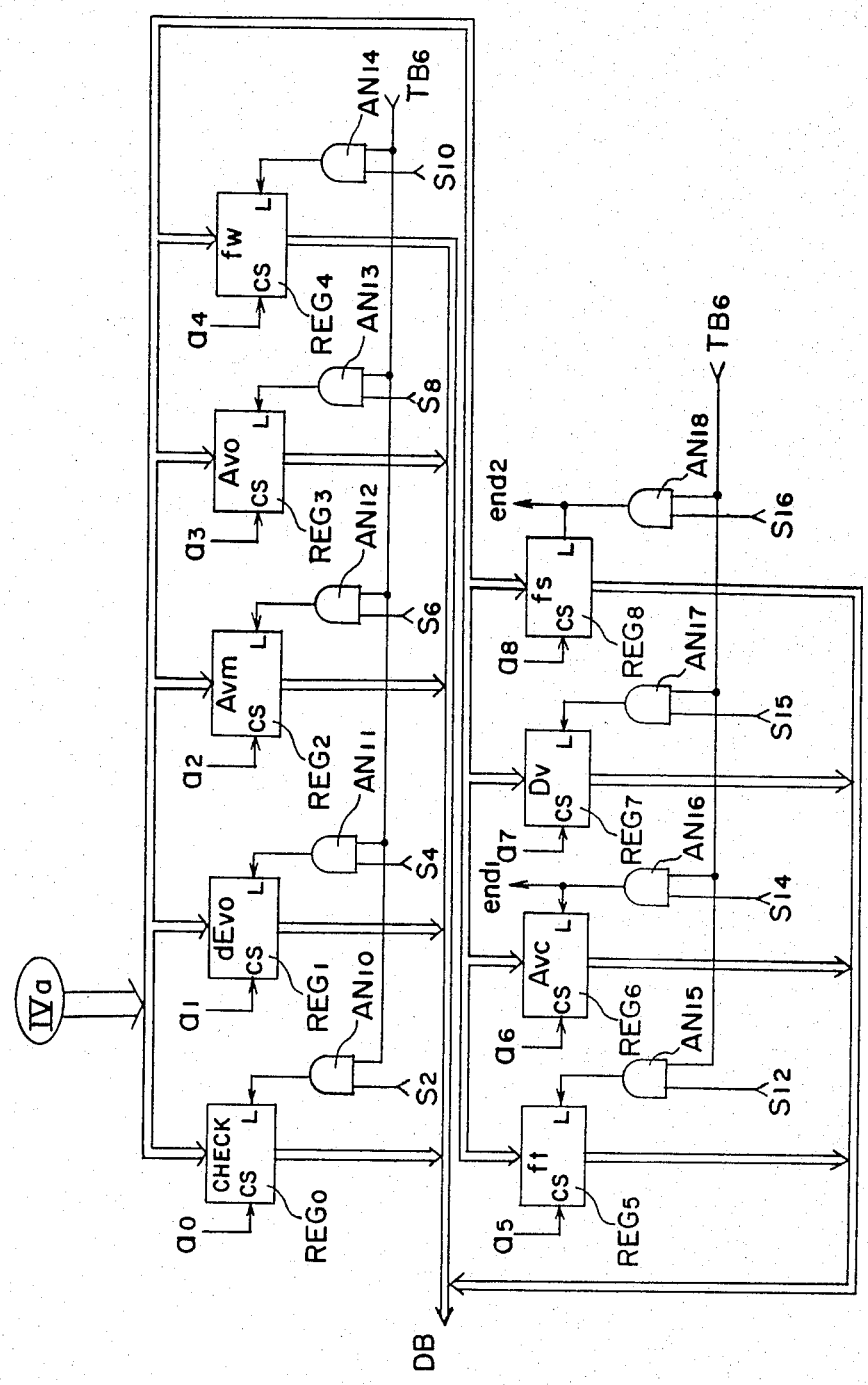

An interface circuit IF sequentially reads various data from the lens LE when it receives a "HIGH" from an output O2 of the micro-computer 1. When the interface circuit IF completes reading the data from the lens LE, the read data is sequentially produced from the interface circuit IF and transmitted through data selector MP1 and external data bus DB to the micro-computer 1 in response to the 4-bit data from an output OP3 of the micro-computer 1. A detail of the interface circuit IF is shown in FIGS. 4a and 4b and will be described later. The data selector MP1 has inputs IP1 to IP6 for receiving various data and transmits this data through the data bus DB to the micro-computer 1 in a selected sequence controlled by a 4-bit signal applied thereto at a selection terminal SL from the output OP3 of the micro-computer 1. A relationship between the data applied to the selection terminal SL of the data selector MP1 and the data produced from the data selector MP1 through the data bus DB is shown in Table 1 below.

TABLE 1

| Data Selector (MP1) | | | |
|---|---|---|---|
| Selection SL | Terminal | Data Bus (DB) Selected terminal | Signification |
| 0 0 0 0 | (0H) | IP4 | Tvs |
| 0 0 0 1 | (1H) | IP5 | Sv |
| 0 0 1 0 | (2H) | IP6 | Mode |
| 0 0 1 1 | (3H) | IP2 | Measured light amount |
| 0 1 0 0 | (4H) | IP3 | Avs-Avo |
| 0 1 0 1 | (5H) | IP1 | Interface |

TABLE 1-continued

| Data Selector (MP1) | | | |
|---|---|---|---|
| Selection SL | Terminal | Data Bus (DB) Selected terminal | Signification |
| : | : | " | " |
| 1 1 0 1 | (DH) | " | " |

As apparent from Table 1, the data applied to the selection terminal SL is 4-bits long, and for the sake of brevity, this 4-bit signal is also indicated with a hexadecimal numbering system, as shown in parentheses in Table 1. When the data applied to the selection terminal SL from the output OP3 is "0H" (i.e., 0 hexadecimal), the data selector MP1 selects exposure time data Tvs inputted to the terminal IP4; when the data to the selection terminal SL is "1H", the data selector MP1 selects film sensitivity data Sv inputted to the terminal IP5; when the data to the selection terminal SL is "2H", the data selector MP1 selects exposure control mode data inputted to the terminal IP6; when the data to the selection terminal SL is "3H", the data selector MP1 selects measured light amount data inputted to the terminal IP2; when the data to the selection terminal SL is "4H", the data selector MP1 selects set aperture size data Avs-Avo inputted to the terminal IP3; and when the data to the selection terminal SL is any one of "5H" to "DH", the data selector MP1 selects data concerning the lens LE inputted to the terminal IP1 from the interface circuit IF. The selected data by the data selector MP1 is applied to the micro-computer 1 through the data bus DB.

It is to be noted that the interface circuit IF produces the read data from the lens LE in a sequence controlled by the data "5H" to "DH" from the output OP3. It is also to be noted that the micro-computer 1 only produces data "0H" to "3H" when the signal to the input i4 is "LOW", i.e., when the lens detecting switch LS is maintained off, whereby no signal related to the lens LE is fed to the micro-computer 1.

A reference character FC designates a flash-light control for controlling the amount of flash-light to be emitted from the flash-light device FL from the camera side. The flash-light control FC produces an emission-start signal which is applied to the flash-light device FL through terminal JB6 of camera side and terminal JF2 of flash device side for effecting the emission of flash-light. Also, the flash-light control FC produces an emission-stop signal which is applied to the flash-light device FL through terminal JB7 of camera side and terminal JF3 of flash device side for stopping the emission of flash-light. The emission-start signal is produced, e.g., when the shutter is fully opened, and the emission-stop signed is produced, e.g., when an integrated amount of light reflected from an object to be photographed and passed through an objective lens and further reflected on a film surface reaches a predetermined level. When the main capacitor (not shown) provided in the flash-light device FL is charged to a predetermined level, the flash-light device FL produces a "HIGH" representing the completion of electric charge, which is applied to the terminal JF1 and, thereafter, by the emission-start signal from the terminal JF2, a xenon lamp (not shown) provided in the flash-light device FL starts to emit light. Then, by an emission-stop signal from the terminal JF3, the xenon lamp stops the light emission.

A release switch RS is provided to close relative to the operation of a shutter release mechanism. A safety switch CS is provided, which closes upon completion of film wind-up for one frame and opens upon completion of exposure control operation, thereby preventing the shutter from being released before it is ready to take a photograph. The release switch RS and the safety switch CS are connected, respectively, to inverters IN3 and IN4, which are in turn connected to two inputs of an AND gate AN0. An output of the AND gate AN0 is connected to an interruption input i5 of the micro-computer 1.

The micro-computer 1 has an output O1 which is connected to a release circuit RL. When the output O1 produces a "HIGH", the release circuit RL starts the shutter release operation. The output O1 is also connected to an inverter IN2 which is further connected to a base of a transistor BT1 through a suitable resistor. Therefore, even if the light measuring switch MS is turned off during the shutter release, the transistor BT1 is maintained in the conductive state.

As a means for producing a start signal, the micro-computer 1 has an output O2 connected to the interface circuit IF. The output O2 produces a "HIGH" while the interface circuit IF is reading data from the lens. The output O2 is further connected to an inverter IN5 and, in turn, to a base of a transistor BT2 through a suitable resistor. The transistor BT2 is provided as a means for providing electric power to the camera accessory. Thus, when the output O2 is producing a "HIGH", the inverter IN5 produces a "LOW" causing turn on of the transistor BT2. Thus, electric power is supplied through the power lines +VB and +VL, terminal JB1 of camera body and terminal JL1 of lens, to circuits in the lens.

In the lens LE, a data producer 7 is provided including a ROM RO1 (FIG. 5) serving as a fixed data storing means and previously stored with various fixed data related to the lens. The clock pulses CPL produced from the interface circuit IF in the camera body are applied to the data producer 7 as a synchronizing signal through a terminal JB2 on camera and a terminal JL2 on lens so as to control the transmission of address signals from the interface circuit IF to the data producer 7 and the transmission of read out data from the data producer 7 to the interface circuit IF through the same path defined by a line SB, a terminal JB3 on the camera and terminal JL3 on the lens. A block 9 encircled by a broken line is an information producing device, and it includes a focusing distance data producing device DS, which produces data corresponding to a focusing distance of a mounted interchangeable lens as set by the turning of a focusing distance control ring (not shown), and a focal length data producing device FS, which produces data corresponding to a focal length of a mounted zoom lens as set by the turning of a zooming ring (not shown). The data produced from the focusing distance data producing device DS and from the focal length data producing device FS are applied to the data producer 7 as address signals specifying a particular location in the ROM RO1. Thus, the ROM RO1 produces data corresponding to the set focusing distance (in absolute amount) or set focal length (in absolute amount). The operation of the above described camera system is given hereinbelow.

Figure 2A:
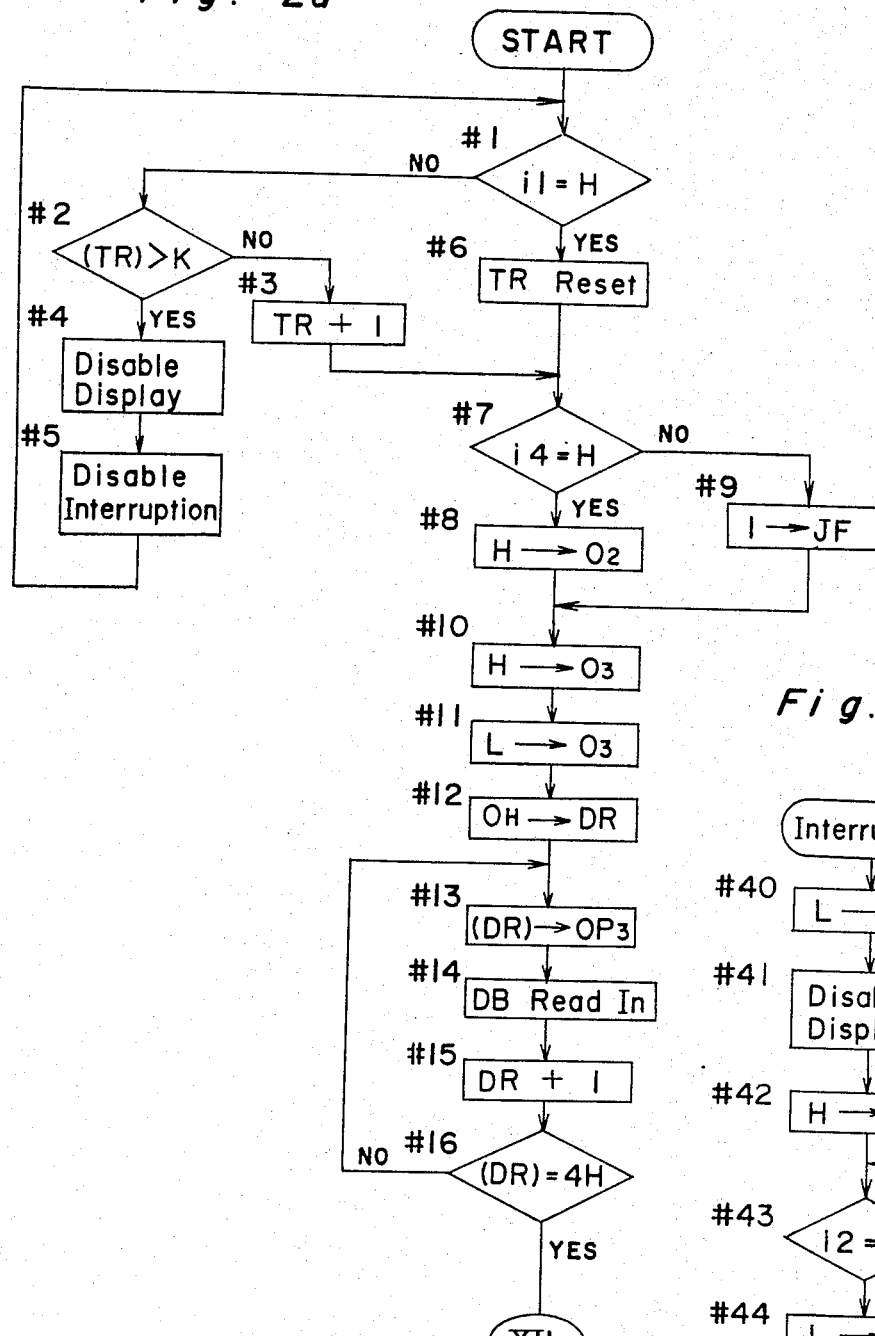
FIGS. 2a and 2b show a flow chart of the operation of the camera system according to one preferred embodiment of the present invention.
Figure 2C:
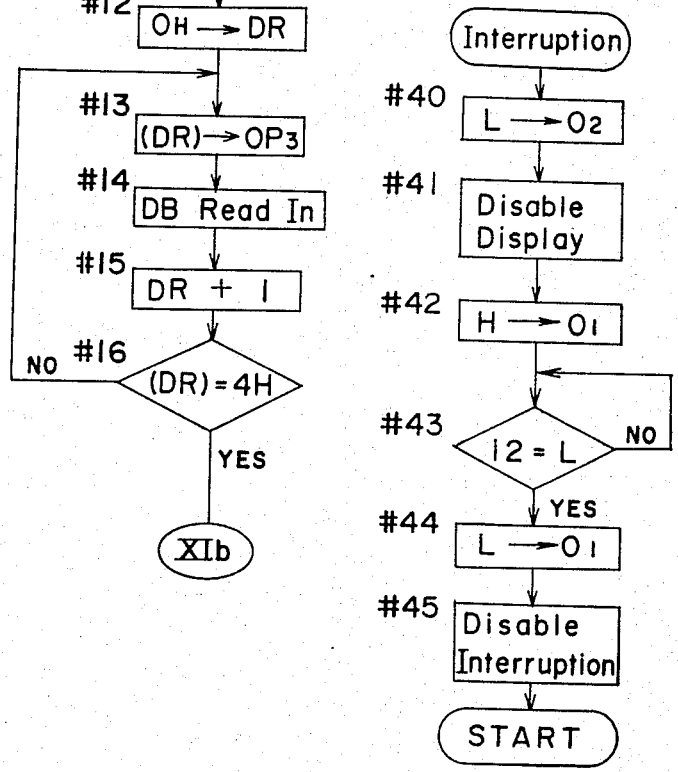
FIG. 2c is a flow chart of an interruption operation to be carried out within the flow chart of FIGS. 2a and 2b.
Figure 2B:
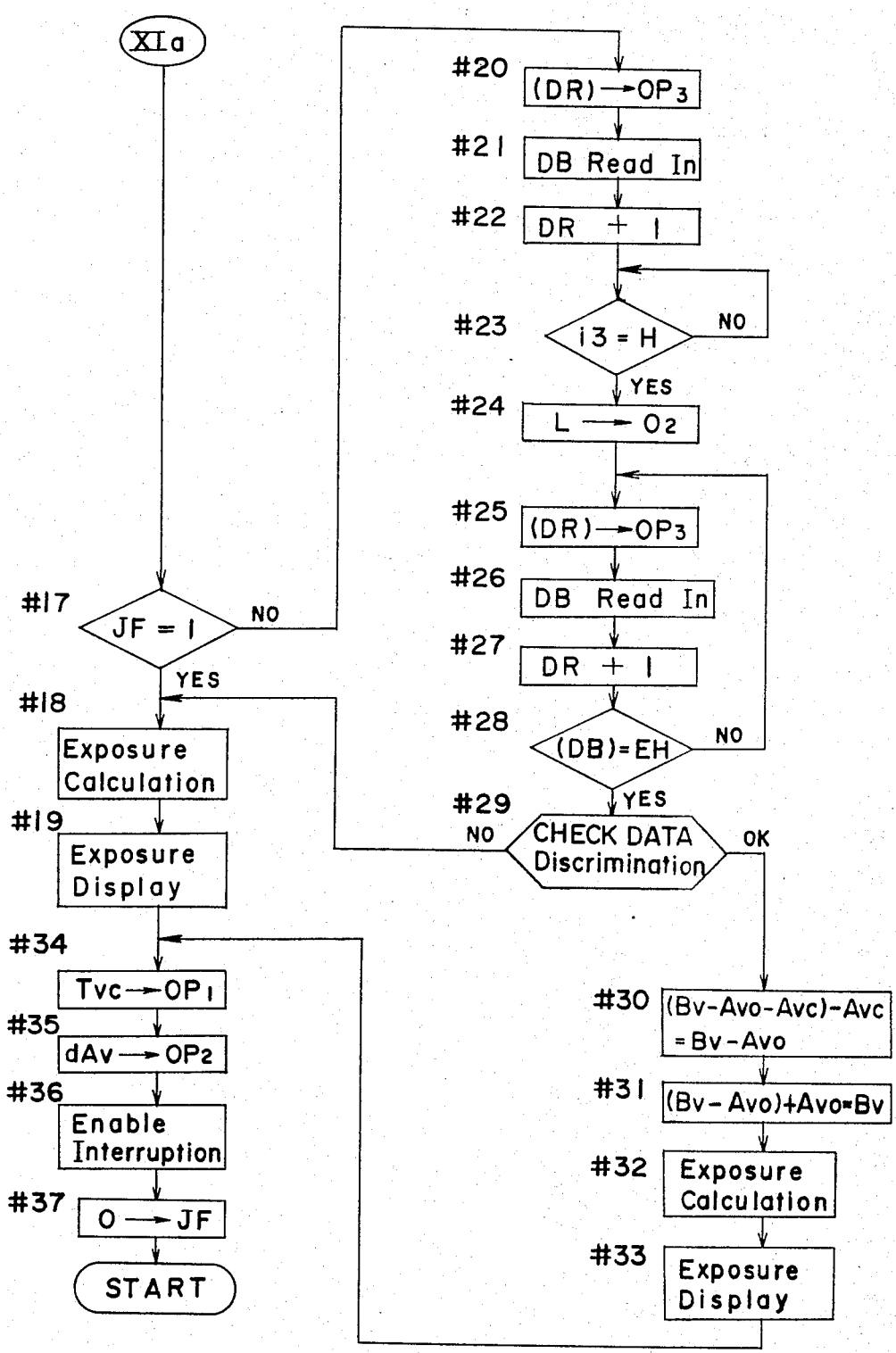

Referring to FIGS. 2a, 2b and 2c, a flow chart of sequential operation of the micro-computer 1 is shown. In the step #1, it is determined whether the input i1 is carrying "HIGH" or not, i.e., whether the light measuring switch MS is turned on or not. If the light measuring switch MS remains open to provide "LOW" to the input i1, the procedure advances to the step #2 and further to the step #3 or to the step #4 and #5; the detail will be described later. When the light measuring switch MS is turned on to provide "HIGH" to the input i1, the procedure advances from the step #1 to #6 so as to reset a timer register TR for counting time. A detail of this timer register TR will also be described later.

Then, in the step #7, it is determined whether the input i4 is carrying "HIGH" or not, i.e., whether the lens detecting switch LS is turned on or not. When the input i4 is receiving "LOW", the procedure advances to the step "9" for setting "HIGH" in a 1-bit discrimination register JF and, then, advances to the step #10. On the other hand, when the input i4 is receiving "HIGH", the procedure advance to the step #8 so as to produce "HIGH" from the output O2 of the micro-computer 1. Thus, the inverter IN5 produces "LOW" to conduct the transistor BT2, resulting in supply of electric power to the circuits 7 and 9 in the lens LE and, at the same time, interface circuit IF is so actuated to read data from the lens. Thereafter, the procedure advances to the step #10.

A further detailed operation will be described later in connection with FIGS. 4a and 4b, but here, it is to be noted that the circuits in lens are reset by a power-on-reset signal that starts the power supply to the lens caused by a "HIGH" produced from the output O2, and thereafter, the system is in a condition ready to transmit data from the lens to the camera body. By the above arrangement, the terminal for the power supply to the lens can also be used for transmitting a start signal for starting the data read out, thereby reducing the number of terminals that interconnect the camera body and camera accessory, e.g., lens. Such a reduction of the number of the terminals not only reduces the manufacturing cost, but also increases the reliability and durability of the camera system.

In the step #10, the micro-computer 1 produces "HIGH" from its output 03 and, in the succeeding step #11, the output O3 is turned to "LOW", whereby an A-D conversion start pulse is applied to the A-D converter AD for starting the A-D conversion of a light signal produced from the light measuring circuit ME. Then, a 4-bit data "0H" is set up in a register DR (not shown) and then, the micro-computer 1 produces the 4-bit data "0H" from its output OP3. In response to the 4-bit data "0H", the data selector MP1 produces the exposure time data Tvs inputted to the terminal IP4, as shown in Table 1, and the produced data Tvs is sent through the data bus DB to the micro-computer 1 wherein the data Tvs is stored in a certain resistor. Then, in the step #15, "1" is added to the content of the register DR. And, in the step #16, it is determined whether the register DR is carrying "4H" or not. If not, the procedure returns back to repeat the steps #13, #14 and #15.

Therefore, until the register DR carries "4H", the micro-computer 1 sequentially reads in various data from the data selector MP1 such that: when the register DR is carrying "0H", the exposure time data Tvs is read in as mentioned above; when the register DR is carrying "1H", the film sensitivity data Sv is read in; when the register DR is carrying "2H", the data representing the exposure control mode is read in; and when the register DR is carrying "3H", the data Bv-Avo-Avc representing the brightness of the object is taken in. It is to be noted that by the time when the register DR is carrying "3H", the A-D conversion of the light signal in the A-D converter AD is completed and, therefore, by this time, the A-D converter AD is applying the converted light signal to the input IP2 of the data selector MP1. Then, when the register DR carries "4H", the procedure advances to the step #17.

In the step #17, it is determined whether the content of the 1-bit register JF is "1" or not. If the content is "1" as occurred when the lens detecting switch LS is maintained off, the procedure advances to the step #18 in which exposure calculation effected in the case of no lens, as will be described later, is carried out. Contrary, if the content of the register JF is "0" as occurred when a lens is mounted and the lens detecting switch LS is turned on, the procedure advances to the step #20 wherein the content of the register DR, which is at present "4H", is outputted from the output OP3. By this signal, the data selector MP1 takes in the data Avs-Avo applied to its terminal IP3 and, in the step #21, the micro-computer 1 reads in the data Avs-Avo through the data bus DB. Then in the step #22, "1" is added to the content of the register DR, thus, the register DR is now holding "5H".

Then, in the step #23, the micro-computer 1 waits until the input i3 receives "HIGH" from the interface circuit IF indicating that all the fixed and variant data from the lens are now stored in the interface circuit IF. Since the moment when the output 02 produces "HIGH" at the step #8, the interface circuit IF has been repeating a cycle of operation of producing serially an address signal which is applied through the line SB and terminals JB3 and JL3 to the ROM RO1 provided in the data producer 7 and receiving serially fixed data stored at a designated location in the ROM RO1 through the same path. When this cycle of operation is repeated for a number of times to store all the fixed data in the interface circuit IF, the information producing circuits DS and FS provided in the lens are actuated to produce address signals for designating locations in the ROM RO1, whereby variant data such as focusing distance as set by the amount of shift of the lens and focal length data as set by zooming the lens are transmitted from the ROM RO1 to the interface circuit IF in the camera body. When all the fixed and variable data are stored in the interface circuit IF, the interface circuit IF produces "HIGH" which is applied to the input i3 of the microcomputer 1.

When the input i3 receives "HIGH", the procedure advances to the step #24 for producing "LOW" from the output 02, thereby turning the transistor BT2 to a non-conductive state for stopping the power supply from the power-line +VL to the lens. Then, in the steps #25 et seq., the micro-computer 1 reads in the data stored in the interface circuit IF.

Before describing the operations carried out in the steps #25 et seq., the operations up to the step #24 are summarized hereinbelow.

First, the address data for designating a location in the ROM RO1 provided in the data producer 7 is transmitted from the camera body to the lens, and the fixed data stored in the designated location in the ROM RO1 is transmitted from the lens to the camera body. This operation is repeated for a number of times to transfer all the fixed data to the camera body. Then, coded information data produced from the information producing circuit 9 is used without any change as address data to designate locations in the ROM RO1, thereby variant data stored in the ROM RO1 is transmitted to the camera body.

With the above arrangement, the fixed data and the variant data are transmitted from the ROM RO1 to the camera body through the same path, whereby only one pair of interconnecting terminals are necessary; one terminal JB3 on camera body and other terminal JL3 on lens. The information producing circuit 9 produces coded data corresponding to an amount of shift from a reference position. Since the ROM RO1 produces data in absolute value based on the data from the information producing circuit 9, the arrangement of the information producing circuit 9 is very simple when compared with an arrangement of a prior art producing circuit that directly produces the data in absolute value from the coded pattern, because the information producing circuit 9, according to the present invention, produces data which has less bits than that produced from the prior art producing circuit. Furthermore, the information producing circuit 9, according to the present invention, can be assembled in a compact size with a small coded pattern. Moreover, since the transmission of an address signal from the camera body to the lens and the signal transmission of read out data from the lens to the camera body are carried out alternately at different times, only one pair of interconnecting terminals is necessary for the mutual transmission, thereby reducing the number of terminals between the camera body and the lens.

Referring back to FIG. 2b, when the input i3 receives "HIGH", the micro-computer 1 starts to sequentially read in the data temporarily stored in the interface circuit IF, in the step #25. This operation is carried out in the follow steps. The output OP3 sequentially produces data "5H" to "DH", each designating a particular data. The produced data "5H" to "DH" are sequentially applied both to the interface circuit IF and to the data selector MP1. When the data produced from the output OP3 is "5H", the interface circuit IF produces check data. Similarly, when the output is "6H", data Ave representing the light measurement error caused by the change of the lens is produced; when the output is "7H", data Avm representing the minimum aperture size is produced; when the output is "8H", data Avo representing the maximum aperture size is produced; when the output is "9H", data fw representing the shortest focal length is produced; when the output is "AH", data ft representing the longest focal length is produced; when the output "BH", data dEvo representing the error compensating data necessary to compensate an exposure error upon exposure control under the fully-open aperture is produced; when the output is "CH", data representing set focusing distance is produced; and when the output is "DH", data representing set focal length is produced. In this case, the data applied to the terminal IP1 of the data selector MP1 is outputted through the data bus DB in a manner shown in Table 1. And, the micro-computer 1 sequentially takes in the data through the data bus DB. When the micro-computer 1 has taken in all the data from the interface circuit IF, the content of the register DR becomes "EH", whereby the step advances from #28 to #29.

The transmission of the data from the lens to the micro-computer 1 can be summarized as follows. First, each data is transmitted serially to the interface circuit IF in which the data is temporarily latched, each data comprising a plurality of bits. Then, in response to the signals from the micro-computer 1 each designating a particular data, the temporarily latched data is transmitted to the micro-computer 1 one after another, with each data being transmitted parallelly. While the interface circuit IF is temporarily storing the data from the lens, the micro-computer 1 is reading other data. This arrangement has an advantage in time saving when compared with an arrangement wherein data is taken into the micro-computer serially bit-by-bit.

In the step #29, it is determined whether or not a check data, which is produced when and while the lens is properly mounted on the camera, is included in the data from the interface circuit IF. If the lens is mounted properly, the micro-computer 1 first receives the check data having a code which is common to all the lens. When the check data is present, the procedure advances to the step #30; but when it is absent, the procedure advances to the step #18. The absence of the check data occurs not only when the lens is improperly mounted, but also when a camera accessory, such as a bellows, a reverse adaptor, a teleconverter, an extension ring, or the like, is mounted between the camera body and the lens.

In the step #30, the following calculation is carried out using the read in data Avc and A-D converted data Bv-Avo-Avc, $$(Bv-Avo-Avc)+Avc=Bv-Avo.$$

Then, in the step #31, the following calculation is carried out using the calculated data Bv-Avo and the fully-open aperture data Avo, $$(Bv-Avo)+Avo=Bv$$

thereby obtaining the data Bv representing the brightness.

Then, in the step #32, an exposure calculation based on the selected mode of exposure control is carried out. The details of the calculations carried out in each mode of operation will be described later in connection with FIGS. 3a, 3b, 3c and 3d.

When the calculations carried out in the step #32 end, the micro-computer displays various control values, exposure control mode, and warnings, if any, using the calculated value, through the display device DP. Thereafter, the micro-computer carries out the step #34.

In the meantime, when it is determined in the step #29 that no check data from the lens LE is dispatched, the procedure advances to the step #18. Before describing the calculation carried out in the step #18, it is to be noted that the step advances from #17 to #18 even when it is determined that the lens LE is not mounted, so long as the content of the register JF is "1". In the case where the selected mode is an automatic mode, i.e., any one of program mode, aperture preferred mode, or shutter speed preferred mode, it is understood that the photographer desires to obtain the proper exposure settings automatically. When the effective aperture value of the automatically set aperture is given as Avn, the light measuring circuit LM produces a signal:

$$Bv-Avn$$

and, in the step #18, a calculation $$(Bv-Avn)+Sv=Tv$$

is carried out, so as to control the shutter speed with the calculated value Tv. On the other hand, as to the aperture size, an output "0" is produced so as not to carry out the stop-down of the aperture. In other words, in the TTL stop-down light measuring system, the shutter speed is controlled automatically.

On the other hand, when the selected mode is a manual mode, the shutter speed is controlled by a manually set amount and, in this case, an output "0" is produced so as not to carry out the stop-down of the aperture.

Furthermore, when the selected mode is a flash-photographing mode, the shutter speed is controlled by Tvf representing the limit of synchronizing shutter speed. In this case, "0" is produced so as not to carry out the stop-down of the aperture. The amount of light to be emitted from the flash device is determined by the detected light which has been reflected on the film surface and the sensitivity of the film in use. Then, in the step #19, data of the exposure control value, selected mode, warnings, if any, are displayed through the display device DP. Thereafter, the procedure advances to the step #34. In this case, the data related to the aperture size of the lens is transmitted to the camera side and, therefore, such a data will not be displayed.

In the step #34, exposure time control data Tvc is transmitted from the output OP1 to the exposure time control device CT, and in the step #35, the stop-down degree data dAv is transmitted from the output OP2 to the aperture control device CA. Then, in the step #36, the interruption terminal i5 is brought to a condition ready to receive "HIGH", thereby enabling the interruption procedure shown in FIG. 2c, which will be described later. Then, "0" is stored in the register JF and, thereafter, the procedure returns back to "START". Here, it is to be noted that "enabling of interruption" means that the terminal i5 is in a condition ready to receive an interruption signal.

When the procedure returns back to "START", it is determined whether or not the input terminal i1 is receiving "HIGH", as occurred when the light measuring switch MS is turned on. If yes, the procedure so advances as to repeat the above described steps #6 and #37. This procedure is repeated again and again so long as the light measuring switch MS is maintained on. If no, as occurs when the input i1 is receiving "LOW", the procedure advances to the step #2, in which it is determined whether a register TR used as a timer is holding a value greater than a predetermined value K, or not. If not, the procedure advances to the step #3 for adding "1" to the content of the register TR and further advances to the step #7 for repeating the above described procedure of data reading, calculation and display. The purpose of providing a routine of steps #1, #2, #3, #7 is to carry out the procedure of #7 to #36 repeatedly for a predetermined number of times (K times) even after the turning off of the light measuring switch MS. Then, when the content of the register TR becomes greater than K, the procedure advances to the step #4 for producing data that effects disabling of the display device DP. Then, in the step #5, it is prohibited to transmit the interruption signal through the input terminal i5 for disabling the interruption. Thereafter, the procedure returns back to the step #1. Then, until the light measuring switch MS is turned on again, a routine of steps #2, #4, #5 and #1 is repeated again and again.

In summary, the micro-computer 1 operates as follows. While the light measuring switch MS is turned on, a successive operation of data reading, calculation and display is repeated again and again, and this successive operation is carried out for a predetermined number of times (until the content of the timer register TR becomes K+1) even after the light measuring switch MS is turned off. This extra repetition is repeated, for example, 15 seconds after the turn-off of the light measuring switch MS.

When one cycle of operation is completed for the first time after the turn-on of the light measuring switch MS, the terminal i5 is brought to a condition ready to receive an interruption signal. Then, after completing the film wind-up of one frame, and when the release switch RS is turned on with the safety switch CS being turned on, the AND gate AN0 produces "HIGH" which is applied to the terminal i5. At this moment, since the system has completed the exposure calculation and is ready to receive the interruption, an interruption procedure, as shown in FIG. 2c, is carried out. It is to be noted that once the exposure data is calculated and, interruption is enabled, the interruption procedure as shown in FIG. 2c can be inserted at any time during the procedure other than the routine procedure of steps #1, #2, #4, #5. When the micro-computer 1 receives the interruption signal to the input i5, the procedure in the micro-computer 1 jumps to a particular address and carries out a procedure stored in the particular address. In order to cope with the interruption procedure requested during the data reading from the lens LE, "LOW" is produced from the output O2 in the step #40, and the data for disabling the display device DP is produced in the step #41. Then, in the step #42, "HIGH" is produced from the output O1 for actuating the release circuit RL and, at the same time, maintaining the transistor BT1 on by "LOW" from the inverter IN2. Thereafter, even if the light measuring switch MS is turned off, the transistor BT1 continues to hold the conductive state. When the release circuit RL actuates, an exposure control mechanism (not shown) starts its operation.

In the first place, the stop-down operation is carried out by the ring 13, and from the pulse generator PG, a number of pulses corresponding to the degree of rotation of the ring 13 are produced. The aperture control device CA counts the pulses from the pulse generator PG and compares the counted number with the stop-down degree data dAv obtained from the output OP2 of the micro-computer 1. When the counted number coincides with the data dAv, the aperture control device CA so controls the ring 13 as to stop its rotation, thereby defining the aperture size. In the case where the camera provided with the system shown in FIG. 1 is a single-reflex camera, the flip-up operation of a reflex mirror (not shown) is also carried out simultaneously with the above mentioned aperture setting. When the aperture setting and the flip-up operation of the reflex mirror are complete, a leading curtain (not shown) starts to scan and, at the same time, the exposure time control device CT starts to count exposure time determined by the data Tvc obtained from the output OP1.

Particularly, if the selected mode is the flash-photographing mode, the flash control device FC produces, e.g., when the shutter is fully opened, an emission-start signal which is applied to a the flash-light device FL through terminal JB6 of camera side and terminal JF2 of flash device side for effecting the emission of flash light. The flash-light control FC integrates the light which has been reflected from an object to be photographed and has passed through an objective lens and further reflected on a film surface, and when the integrated amount reaches a predetermined level, it produces an emission-stop signal which is applied to the flash-light device FL through terminal JB7 of camera side and terminal JF3 of flash device side for stopping the emission of flash-light.

Then, regardless of the selected mode, whether it be the flash-photographing mode or daylight-photographing mode, the trailing curtain (not shown) starts to scan when the shutter speed control device CT has a number corresponding to the exposure time data obtained from the output OP1. When the scanning of the trailing curtain completes, the safety switch CS turns off and, thereafter, the reflex mirror flips down and the aperture is fully opened to its maximum size, thereby completing the exposure operation.

By the turning off of the safety switch CS as occurs upon completion of the exposure operation, the inverter IN4 produces "LOW", thereby producing "LOW" from the output O1 at the step #44. By the "LOW" from the output O1, the release circuit RL is turned to inoperative and, at the same time, self-holding of the transistor BT1 to conductive state is released. Then, in the step #45, the acceptance of the interruption signal to the interruption terminal i5 is prohibited and, thereafter, the procedure returns back to "START". In this case, if the light measuring switch MS is held turned on, or if it is within 15 seconds from the turn off of the light measuring switch MS, the successive operation of the data reading, calculation and display is carried out repeatedly. Also, if the light measuring switch MS is held turned on with the safety switch CS being turned off, the successive operation of the data reading, calculation and display is carried out repeatedly and, at the same time, the micro-computer 1 is in a condition ready to accept the interruption signal. Under this condition, even if the release switch RS is also turned on, the turn on of the safety switch CS prevents the signal from the release switch RS from being transmitted through the AND gate AN0 and, therefore, no interruption signal will be applied to the micro-computer 1 through the input terminal i5. Therefore, it is possible to prevent the micro-computer 1 from erroneously carrying out the exposure control.

It is to be noted that the successive operation of data reading, calculation and display can be stopped immediately upon turn off of the light measuring switch MS, when the turn off of the light measuring switch MS is carried out after the completion of exposure control operation and before the completion of the film wind up operation, i.e., while the safety switch CS is turned off. This can be done by the following procedure. When it is determined that the input i1 is not receiving "HIGH" in the step #1, it is further determined whether the input i2 is receiving "HIGH" or not in a step before the step #2. When it is determined that the input i2 is receiving "HIGH", the procedure advances to the step #2, but it is determined that the input i2 is not receiving "HIGH", a data K+1 is set up in the timer register TR and, thereafter, the procedure advances to the step #2. In this case, since the content of the timer register TR is already greater than K, the procedure advances from the step #2 to the step #4 and further to the step #5 and, thereafter, repeating the routine procedure of steps #1, #2, #4 and #5. Thus, the successive operation of data reading, calculation and display can be stopped immediately upon turn off of the light measuring switch MS.

FIGS. 3a, 3b, 3c and 3d show a detailed flow chart of the step #32 shown in FIG. 2b for carrying out the exposure calculations under a mode selected from any one of: flash-photographing mode (FP mode) in which a photograph is taken with an aid of auxiliary light; programmed mode (P mode) in which the shutter speed and aperture size are automatically determined according to the set program; shutter speed preferred mode (S mode) in which the aperture size is automatically determined with respect to the preferred shutter speed; aperture size preferred mode (A mode) in which the shutter speed is automatically determined with respect to the preferred aperture size; and manual mode (M mode) in which the shutter speed and aperture size are manually set.

Figure 3A:
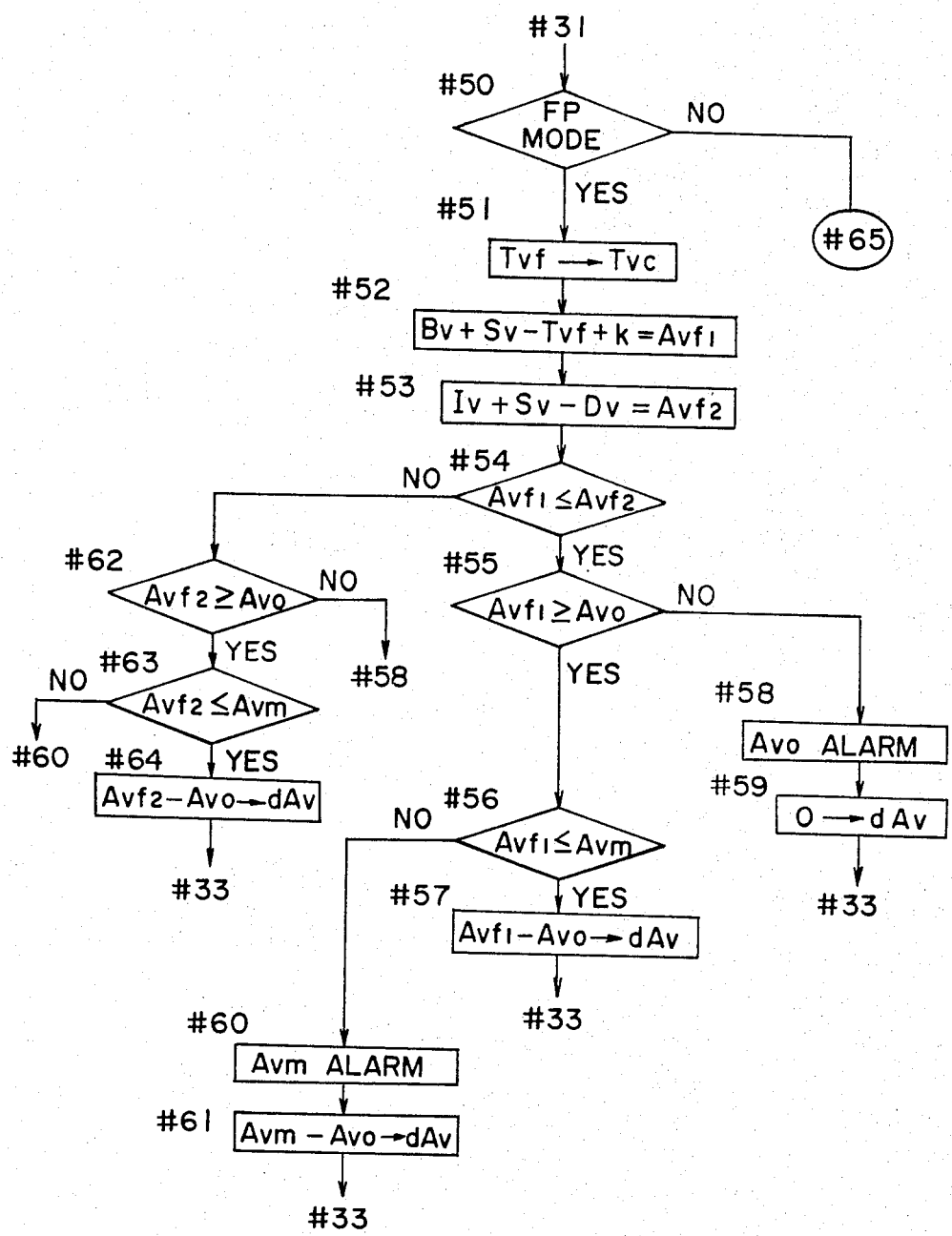
FIGS. 3a, 3b, 3c and 3d show a detailed flow cart of an exposure calculation step #32 shown in FIG. 2b.

Referring particularly to FIG. 3a, it is determined in the step #50 whether or not the charge completion signal has been transferred from the flash-light device FL through the terminals JF1 and JB5 to the mode signal producing device MS, that is whether or not the selected mode is the flash-photographing (FP) mode. If the selected mode is the FP mode, the procedure advances to the step #51 in which the data Tvf representing the limit of flash synchronizing shutter speed (for example Tv=6) is changed to the exposure time control device Tvc. Then, a calculation $$Bv + Sv - Tvf + k = Avf1$$

is carried out, wherein k is equal to or greater than zero. By the above calculation, an aperture size data Avf1, which is equal to kEv degrees stopped down from the appropriate shutter speed for the flash synchronizing shutter speed, is obtained. Then, in the step #53, $$Iv + Sv - Dv = Avf2$$

is calculated, wherein Iv represents data in APEX numbering system corresponding to the maximum light amount that the flash-light device FL can produce, and Dv represents data in APEX numbering system corresponding to the set focusing distance of the mounted lens LE. Therefore, the calculated data Avf2 indicates the limit of aperture value under the photographing with the aid of flash light.

In the step #54, the two calculated values Avf1 and Avf2 are compared with each other. When the comparison results as:

$$Avf1 \leq Avf2,$$

it is understood that the calculated value Avf1 is within said limit of aperture value under the photographing with the aid of the flash light. Thus, in this case, the procedure advances to the to the step #55. In the steps #55 and #56, it is determined whether the calculated value Avf1 is within an available range of aperture size of the mounted lens LE. More particularly, in the step #55, the determined:

$$Avf1 \geq Avo$$

is carried out, and in the step #56, the determination:

$$Avf1 \leq Avm$$

is carried out. If the calculated value Avf1 has a value between Avo and Avm, the procedure advances to the step #57 in which $$Avf1 - Avo$$

is set up as a degree of stop down dAv. Thereafter, the procedure continues from the step #33 described above in connection with FIG. 2b.

Contrary, if it is determined that $$Avf1 < Avo$$

in the step #55, the procedure advances to the step #58 for setting a data that produces a warning indicating that the calculated value Avf1 is beyond the full-open aperture size, and further to the step #59 for setting 0 for the degree of stop down dAv. Then, the procedure continues from the step #33.

Furthermore, in the step #56, if it is determined that $$Avf1 > Avm,$$

the procedure advances to the step #60 for setting a data that produces a warning indicating that the calculated value Avf1 is below the minimum-open aperture size, and further to the step #61 for setting Avm−Avo for the degree of stop down dAv.

Back to the step #54, if it is determined that $$Avf1 > Avf2,$$

meaning that the amount of light will be insufficient if photographed with an aperture size controlled with a value Avf1, the procedure advances to the step #62. Similar to the above, it is determined in the steps #62 and #63, whether the calculated value Avf2 is within an available range of aperture size of the mounted lens LE. More particularly, in the step #62, the determination:

$$Avf2 \geq Avo$$

is carried out, and in the step #63, the determination:

$$Avf2 \leq Avm$$

is carried out. If the calculated value Avf2 has a value between Avo and Avm, the procedure advances to the step #64 in which $$Avf2 - Avo$$

is set up as a degree of stop down dAv. Thereafter, the procedure continues from the step #33 described above in connection with FIG. 2b.

Contrary, if it is determined that $$Avf2 < Avo$$

in the step #62, the procedure advances to the step #58 for producing a warning described above and continues to carry out the steps #59, #33 et seq.

Furthermore, in the step #63, if it is determined that $$Avf2 > Avm,$$

the procedure advances to the step #60 for producing a warning described above and continues to carry out the steps #61, #33, et seq.

According to the above described operation under the flash-photographing mode (FP mode), the calculated aperture value Avf1 is equal to a value which is stopped down by an amount of kEv from a preliminarily calculated aperture value plainly determined by the brightness Bv of the object, film sensitivity Sv and flash synchronizing shutter speed limit Tvf. The reason for this is explained below. First of all, the light receiving elements for the average measurement are generally distributed not with an equal density within a picture taking frame but with an intensive distribution at the center and sparse at the peripheral portions. When taking a photograph, the main object is usually located at the center, and particularly, when taking a photograph under the flash-photographing mode, the main object located at the center is less bright than the background. Thus, from the light receiving elements distributed densely at the center and sparsely at the perimeter, a signal based on the brightness of the center object, which is less bright than the surrounding object, will be produced. If the aperture size is controlled by this signal, the photograph will be over-exposed. From this view point, the calculated aperture value Avf1 is made equal to a value which is stopped down by an amount of kEv from the preliminarily calculated aperture value so as to properly expose the main object located at the center of the frame. The amount kEv can be selected empirically by taking a number of scenes, and picking a most desirable amount, for example, 1 Ev.

As has been described before, since the flash-light control device FC controls the amount of the flash light in relation to the received light from the object through the aperture and reflected on the film surface, the object will be properly exposed with the aid of flash light controlled by the device FC. Also, when there is a high possibility that the flash-light is insufficient because the focusing distance data Dv is relatively great, the control is carried out with the use of calculated aperture value Avf2 corresponding to the focusing distance so as to avoid the under-exposure of the main object due to the lack of total light amount of the flash-light device FL.

Figure 3B:
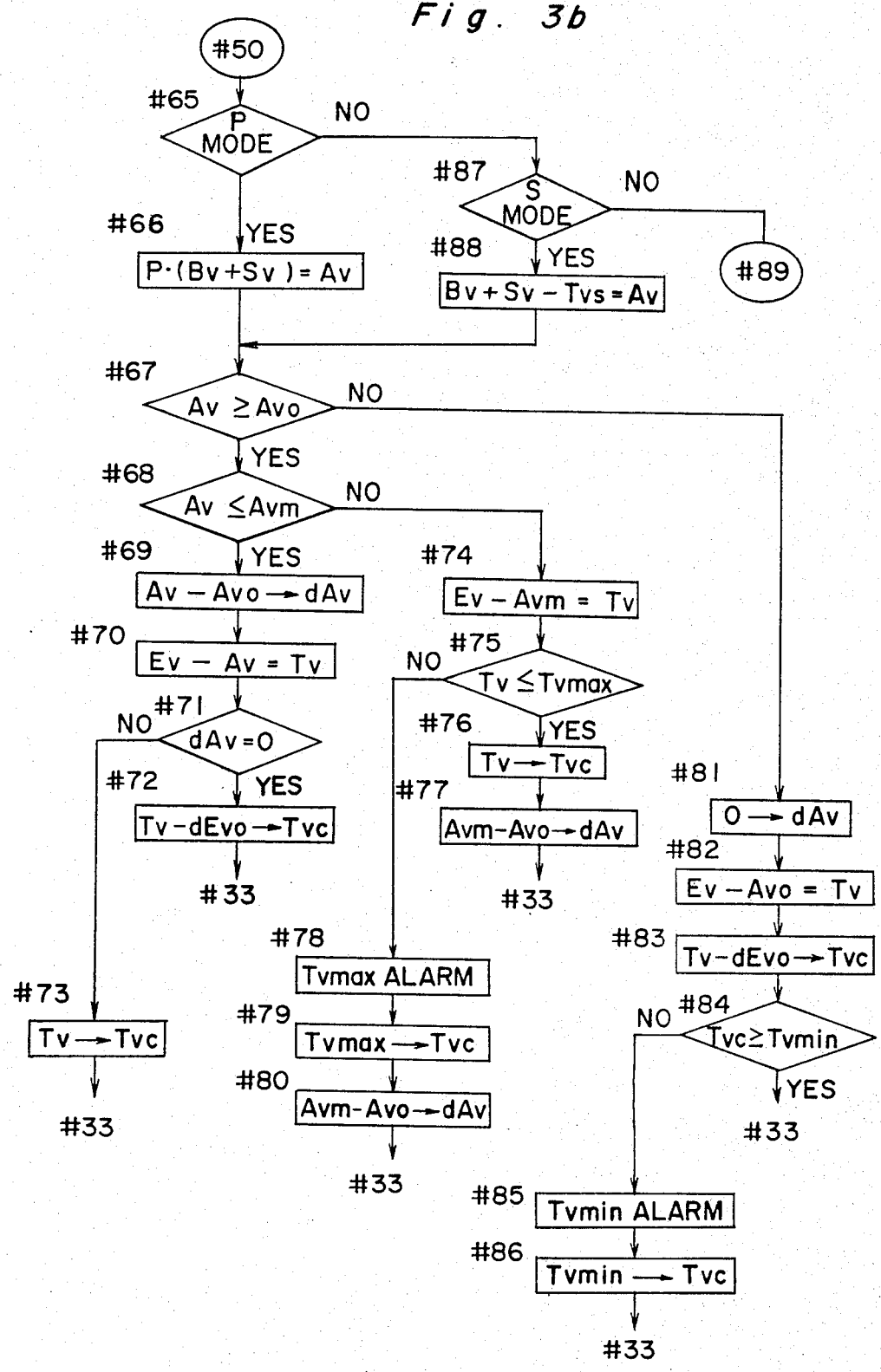

Referring now to FIG. 3b, the description is directed to the automatic exposure control operation and particularly to the operation under the programmed mode (P mode). When it is determined in the step #50 that the selected mode is not the flash-photographing mode, the procedure advances to the step #65 in which it is determined whether the selected mode is the programmed mode or not. When the selected mode is the programmed mode, the procedure advances to the step #66 in which a calculation $$p(Bv+Sv)=Av \quad 0<p<1$$

is carried out. Then, in the steps #67 and #68, it is determined whether the calculated aperture value Av is within a controllable range between Avo and Avm or not. If $$Avo \leq Av \leq Avm,$$

the procedure advances to the step #69 in which Av−Avo is set up as a degree of stop down dAv. Then, in the step #70, $$Ev-Av=Tv$$

is carried out. And in the step #71, it is determined whether the aperture is fully opened or not, i.e., whether $$dAv=Av-Avo=0$$

is satisfied or not. When the aperture is not fully opened, a relation $$dAv \neq 0$$

is obtained and, therefore, in the step #73, the calculated aperture value Tv is used as a control data Tvc. Thereafter, the procedure continues from the step #33. Contrary, when the aperture is fully opened, a relation $dAv=0$, is obtained. In this case, the exposure error will occur if the light amount is evaluated uniformly on every spot within the picture taking frame. Thus, using an exposure error compensating data dEvo, a calculation $$Tv-dEvo$$

is carried out, and the calculated amount is used as a control data Tvc, in the step #72. Thereafter, the procedure continues from the step #33.

It is to be noted here that, when the aperture is so controlled as to be fully opened, the calculated amount Tv is varied by an amount dEvo. The reason for this is explained below. It is found that phenomenon of making the center bright and the peripheral portions dark due to the vignetting will not take place when the aperture is set to a position between the most reduced aperture size and one step stopped down from the fully-opened aperture size, but said phenomenon takes place when the aperture is set to the fully-opened aperture size. More particularly, when the aperture size becomes close to the fully-open aperture size, the amount of incident light on the picture taking frame at positions away from the optical axis is reduced in a greater degree than the $\cos^4$ law. Therefore, when the light amount is averagedly evaluated within a predetermined extent of area including the center of the picture taking frame, the photograph will be taken with an under-exposure. Thus the exposure operation requires compensation. The compensation is carried out such that when the aperture is so controlled as to be fully opened, the exposure time is prolonged for a period corresponding to the exposure error, thereby obtaining a correct exposure when the light amount is averagedly evaluated within the predetermined extent of area. It is preferable to carry out the compensation to each aperture size, which is close to the fully opened aperture size, by an amount corresponding to respective aperture size. To this end, however, it is necessary to provide a memory means for storing exposure error data corresponding to various aperture sizes in each lens. The employment of such a memory means results in complication of the circuit arrangement in the lens and, at the same time, in increase of processing time delaying the data transmission from the lens to the camera.

Furthermore, the cases that require the aperture to be set close to the fully opened size are rare, when compared with the cases that require the aperture to be set to the fully opened size. Thus, from a practical point of view, according to the embodiment shown, the compensation is effected only when the aperture is set to the fully opened size. In this way, the circuit necessary for the compensation can be prepared with a simple structure (only one data is needed to be memorized).

Referring again to FIG. 3b, when it is determined in the step #68 that $$Av > Avm,$$

the procedure advances to the step #74 in which a calculation $$Ev - Avm = Tv$$

is carried out. Then, in the step #75, it is determined whether a relation $$Tv \leq Tvmax$$

is satisfied or not. If the relation $$Tv \leq Tvmax$$

is satisfied, the procedure advances to the step #76 in which the calculated exposure time Tv is used as a control data Tvc. Then, in the step #77, a data Avm−Avo is set up as a degree of stop down dAv, and, thereafter, the procedure continues from the step #33. If it is determined in the step #75 that the relation $$Tv \leq Tvmax$$

is not satisfied, the procedure advances to the step #78 in which an alarm indicating that the calculated exposure time Tv is shorter than the minimum available exposure time. In this case, the data Tvmax is set up as an exposure time control data Tvc. Then, in the step #80, a data Avm−Avo is set up as a degree of stop down dAv, and, thereafter, the procedure continues from the step #33.

Back to the step #67, if it is determined that $$Av < Avo,$$

the procedure advances to the step #81 in which 0, representing the fully opened aperture, is set up as a degree of the stop down dAv. Then, in the step #82, a calculation $$Ev - Avo = Tv$$

is carried out. Since the aperture is controlled to be fully opened, a calculation $$Tv - dEvo$$

is carried out, and the calculated result is used as an exposure control data Tvc in the step #83. Then, in the step #84, it is determined whether a relation $$Tvc \geq Tvmin$$

is satisfied or not. If is it determined that the relation $$Tvc \geq Tvmin$$

is satisfied, the procedure continues from the step #33. Contrary, if it is determined that the relation is such that Tvc < Tvmin, the procedure advances to the step #85 in which an alarm data indicating that the calculated exposure time Tv−dEvo is longer than the maximum available exposure time. In this case, the data Tvmin is set up as an exposure time control data Tvc. Thereafter, the procedure continues from the step #33.

If the selected mode is shutter speed preferred mode (S mode), the procedure advances from the step #65 to the step #87 and further to the step #88 in which a calculation $$Bv + Sv - Tvs = Av$$

is carried out. Thereafter, the procedure continues from the step #67 with the use of aperture data Av as calculated in the step #88.

Next, the operation when the selected mode is aperture size preferred mode (A mode), is described.

Figure 3C:
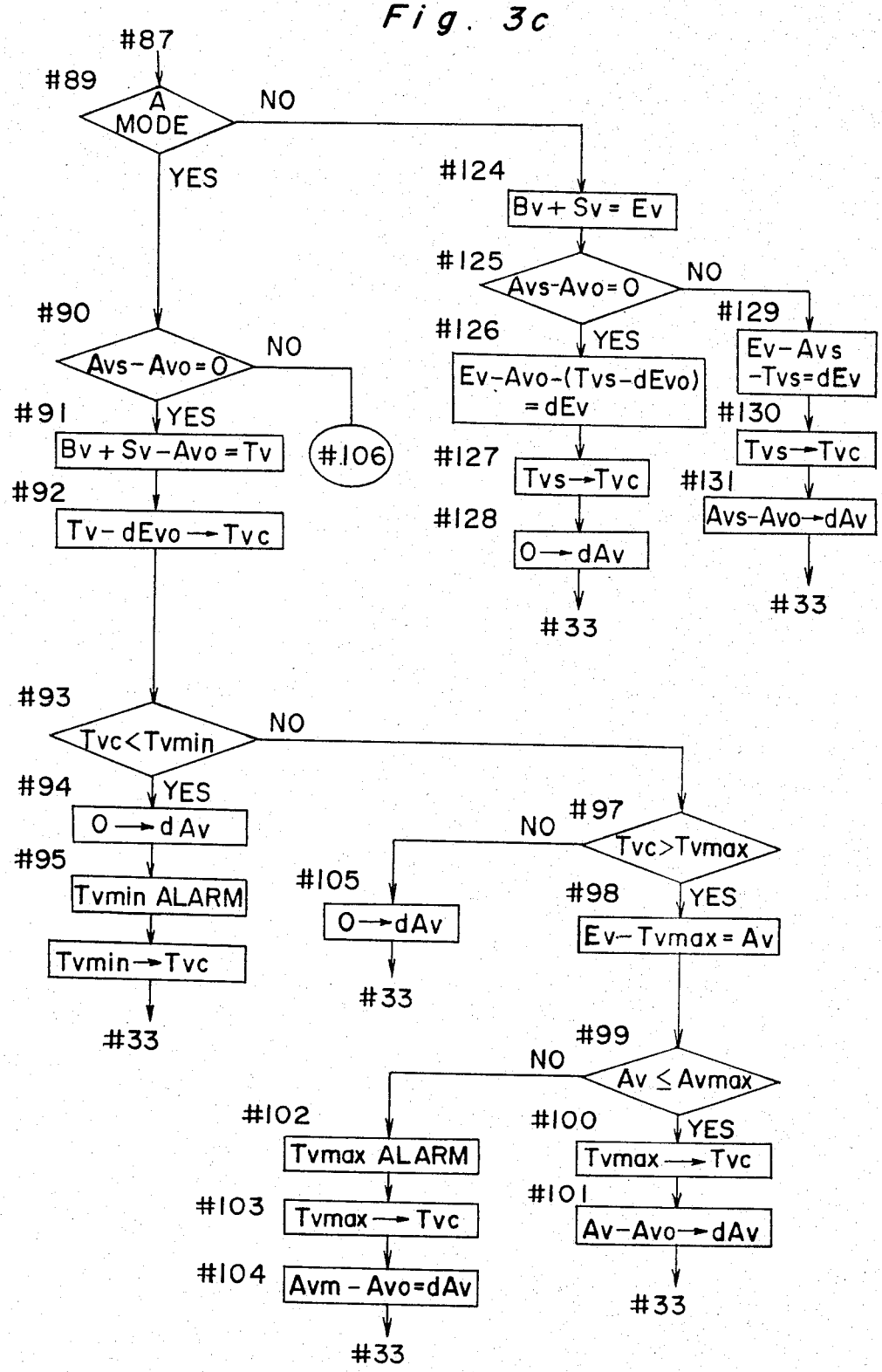

Referring to FIG. 3c, when the selected mode is aperture size preferred mode, the procedure advances from the step #87 to the #89 and further to the step #90 in which it is determined whether the aperture is set to the fully opened size or not, i.e., whether a relation $$Avs - Avo = 0$$

is satisfied or not. When the aperture is set to the fully opened size, a relation $$Avs - Avo = 0$$

is satisfied and, in this case, the procedure advances to the step #91 in which a calculation $$Bv + Sv - Avo = Tv$$

is carried out. Then, in the step #92, a calculation $$Tv - dEvo$$

is carried out, and the calculated data is set up as a control data Tvc. Then, in the step #93, it is determined $$Tvc < Tvmin,$$

or not. If $$Tvc < Tvmin,$$

the procedure advances to the step #94 in which 0 is set up as a degree of stop down dAv. And in the step #95, an alarm data indicating that the calculated exposure time Tvc is longer than the maximum available exposure time. Then, Tvmin is set up as a data Tvc for controlling the exposure time. Thereafter, the procedure continues from the step #33.

Back to the step #93, if $$Tvc \geq Tvmin,$$

the procedure advances to the step #97 in which it is determined $$Tvc > Tvmax,$$

or not. If $$Tvc > Tvmax,$$

the procedure advances to the step #98 for carrying out a calculation $$Ev - Tvmax = Av.$$

And then, in the step #99, it is determined $Av \leq Avmax,$ or not. If $Av \leq Avmax,$ the procedure advances to the step #100 in which Tvmax is set up as a control data, and in the step #101, Av−Avo is set up as a degree of stop down data. Thereafter, the procedure continues from the step #33. In the step #99, if it is determined that $Av > Avmax,$ the procedure advances to the step #102 an alarm data indicating that the calculated exposure time Tvc is shorter than the minimum available exposure time. Then, Tvmax is set up as a data Tvc for controlling the exposure time. Thereafter, the procedure continues from the step #33. In the step #97, if it is determined that $Tvc \leq Tvmax,$ the procedure advances to the step #105 in which 0 is set up as a degree of stop down dAv. Thereafter, the procedure continues from the step #33.

Back to the step #90, if it is determined that $Avs - Avo \neq 0,$ the procedure advances to the step #106.

Figure 3D:
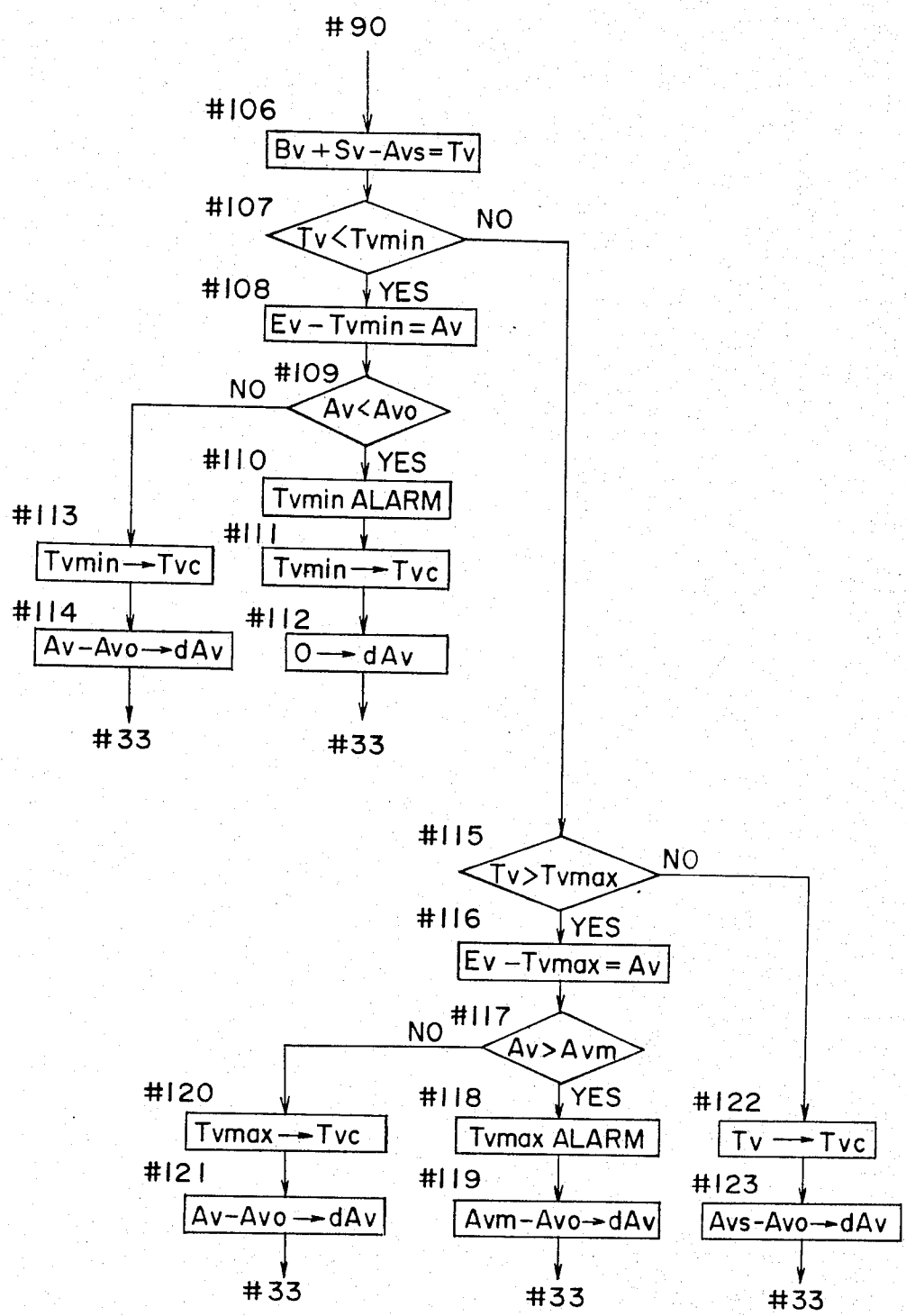

Referring to FIG. 3d, in the step #106, a calculation $Bv + Sv - Avs = Tv$ is carried out. Then, in steps #107–#123, in a similar manner described above, when $Tvmin \leq Tv \leq Tvmax,$ the calculated Tv is used as an exposure time control data Tvc, and, at the same time, Avs−Avo is set up as a degree of stop down dAv. If $Tv < Tvmin,$ a calculation $Ev - Tvmin = Av$ is carried out, and the calculated Av is compared with Avo. If, $Avo \leq Av,$ Av−Avo is set up as a degree of stop down dAv, and Tvmin is set up as an exposure time control data Tvc. If, $Avo > Av,$ 0 is set up as a degree of stop down dAv, and Tvmin is set up as an exposure time control data Tvc. And at the same time, an alarm is produced. Furthermore, if, $Tv > Tvmax,$ a calculation $Ev - Tvmax = Av$ is carried out, and the calculated Av is compared with Avm. If, $Av \leq Avm,$ Av−Avo is set up as a degree of stop down dAv, and Tvmax is set up as an exposure time control data Tvc. Contrary, if, $Av > Avm,$ Avm−Avo is set up as a degree of stop down dAv, and Tvmax is set up as an exposure time control data Tvc. And at the same time, an alarm is produced.

Referring again to FIG. 3c, when it is determined in the step #89 that the selected mode is not an aperture size preferred mode, that is when the selected mode is a manual mode, the procedure advances to the step #124 for carrying out the control under the manual mode. In the step #124, a calculation $Bv + Sv = Ev$ is carried out, and in the step #125, it is determined whether $Avs - Avo = 0,$ or not. If it is determined that $Avs - Avo = 0,$ the procedure advances to the step #126 in which a calculation $Ev - Avo - (Tvs - dEvo) = dEv$ is carried out. Then, in the steps #127 and #128, Tvs is set up as an exposure time control data Tvc, and 0 is set up as a degree of stop down dAv. Then, the procedure continues from the step #33.

In the step #125, if it is determined that $Avs - Avo \neq 0,$ the procedure advances to the step #129 for carrying out a calculation $Ev - Avs - Tvs = dEv.$ Then, in the steps #130 and #131, Tvs is set up as an exposure time control data Tvc, and Avs−Avo is set up as a degree of stop down dAv. Then, the procedure continues from the step #33.

Figure 5:
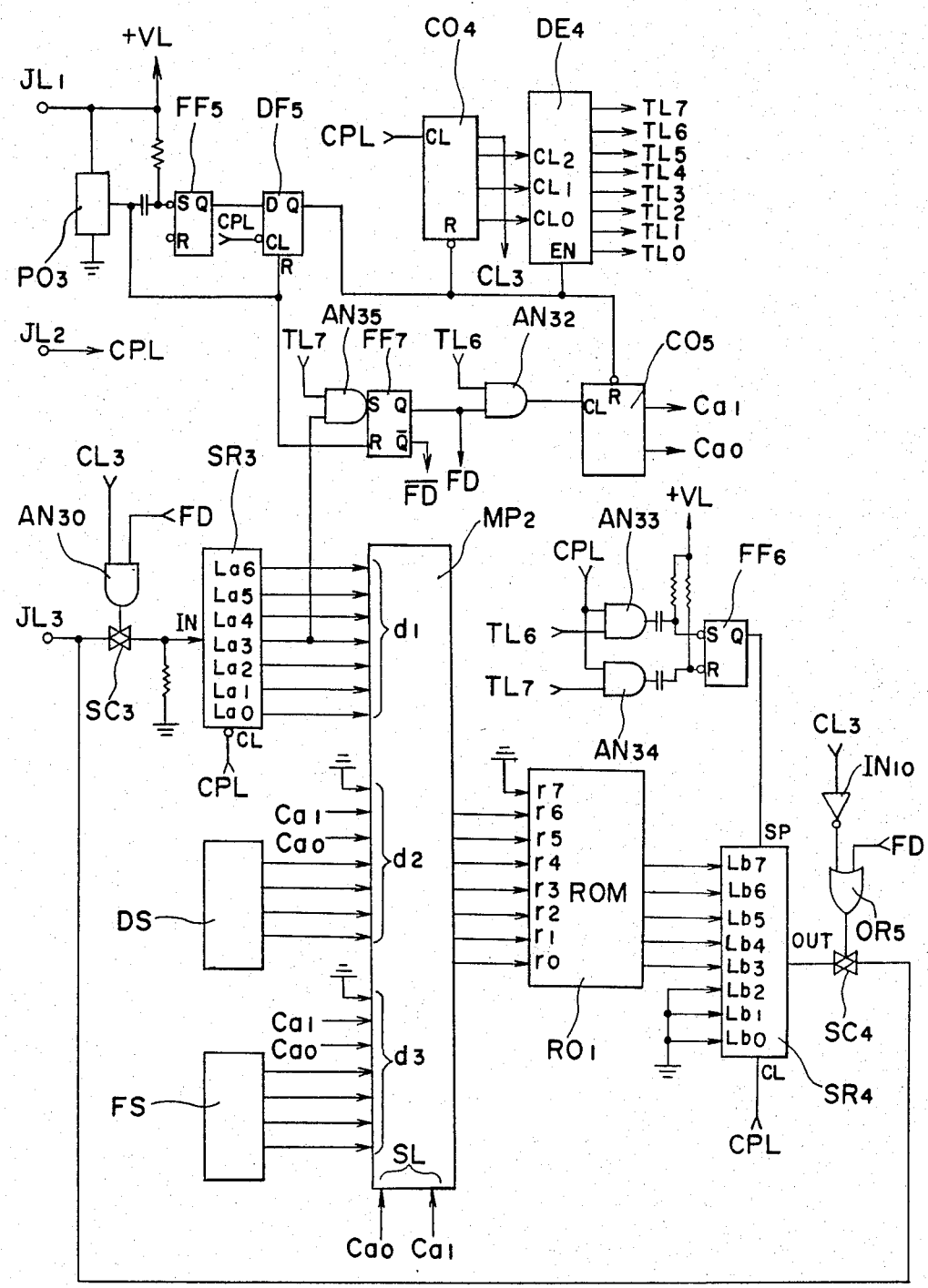
FIG. 5 shows an exemplified circuit diagram of a data producer 7 shown in FIG. 1.
Figure 6:
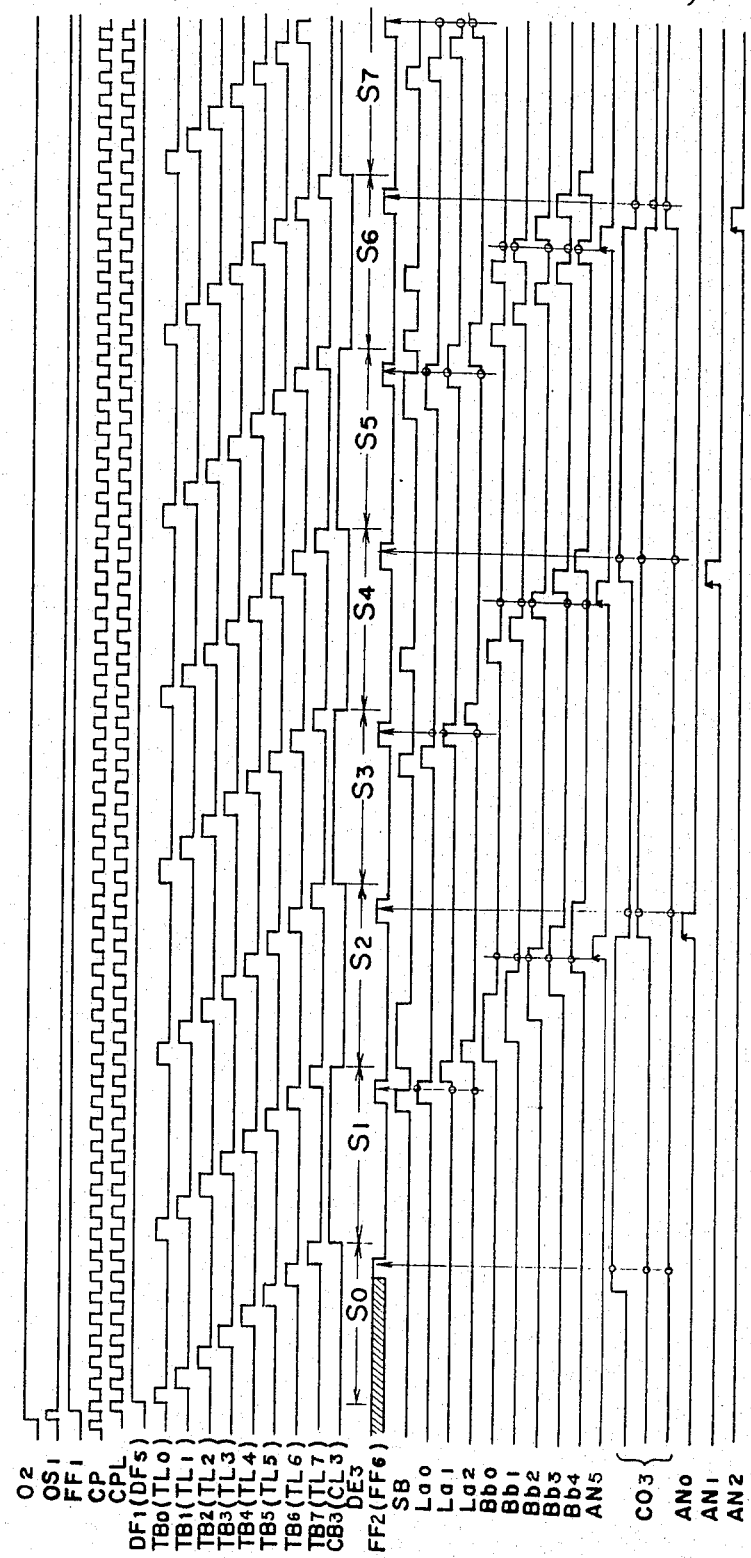
FIGS. 6 and 7 are time charts showing waveforms obtained from the circuit shown in FIGS. 4a, 4b and 5.
Figure 7:
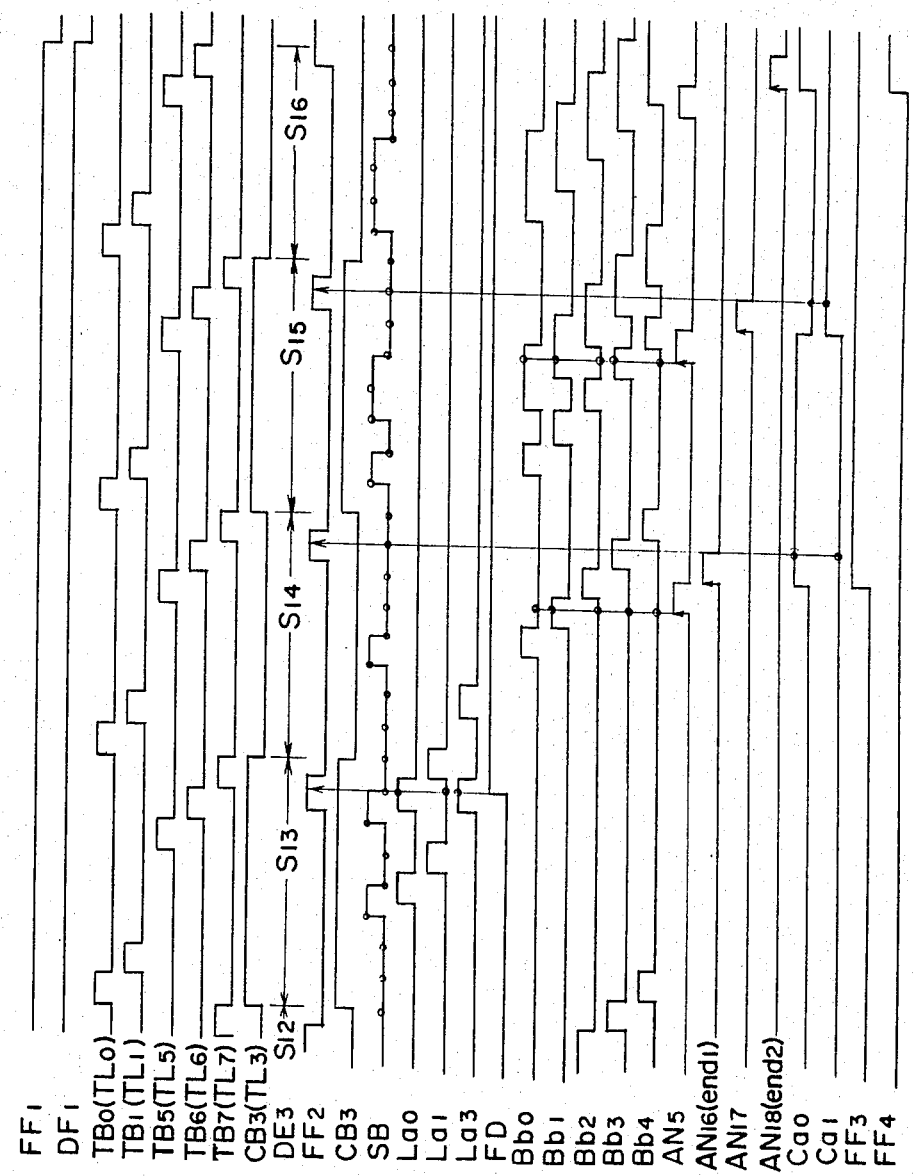

FIGS. 4a and 4b show a circuit diagram which is an example of the interface circuit IF shown in FIG. 1, FIG. 5 shows a circuit diagram which is an example of data producer 7 shown in FIG. 1, FIG. 6 shows a time chart of initial operation of the interface circuit IF, and FIG. 7 shows a time chart of ending operation of the interface circuit IF. Next, the description will be directed to the interface circuit IF and data producer shown in FIGS. 4a, 4b, and 5. First, various data stored in a ROM at various locations with various addresses and the significance of such data will be described with reference to Tables 2 and 3 given below.

TABLE 2

| Address $a_7a_6a_5a_4a_3a_2a_1a_0$ | Significance | Data Example in ROM Meaning | $b_4b_3b_2b_1b_0$ |
|---|---|---|---|
| 0 0 0 0 0 0 0 1 | Code for Check | | 1 1 1 0 0 |
| 0 0 0 0 0 0 1 0 | dEvo | dEvo = 2/8 | 0 0 1 1 0 |
| 0 0 0 0 0 0 1 1 | Avm | Avm = 9 = F22 | 1 1 0 1 0 |
| 0 0 0 0 0 1 0 0 | Avo | Avo = 3.62 | 0 1 0 1 0 |
| 0 0 0 0 0 1 0 1 | focal length fw* | fw = 50 mm | 0 1 0 1 1 |
| 0 0 0 0 0 1 1 0 | focal length ft** | ft = 135 mm | 1 0 0 0 1 |
| 0 0 0 0 1 0 0 0 | Avc | +2/8 | 0 1 0 1 0 |
| 0 0 0 0 1 0 0 1 | | −3/8 | 0 0 1 0 1 |
| 0 0 0 0 1 0 1 0 | | +1/8 | 0 1 0 0 1 |
| 0 0 0 1 0 0 0 0 | Focusing | 1.4 m | 0 1 0 1 0 |
| 0 0 0 1 0 0 0 1 | Distance | 1.7 | 0 1 0 1 1 |
| 0 0 0 1 0 0 1 0 | | 2 | 0 1 1 0 0 |
| 0 0 0 1 0 0 1 1 | | 2.4 | 0 1 1 0 1 |
| 0 0 0 1 0 1 0 0 | | 2.8 | 0 1 1 1 0 |
| 0 0 0 1 0 1 0 1 | | 3.4 | 0 1 1 1 1 |
| 0 0 0 1 0 1 1 0 | | 4 | 1 0 0 0 0 |
| 0 0 0 1 0 1 1 1 | | 4.7 | 1 0 0 0 1 |
| 0 0 0 1 1 0 0 0 | | 5.6 | 1 0 0 1 0 |
| 0 0 0 1 1 0 0 1 | | 6.7 | 1 0 0 1 1 |
| 0 0 0 1 1 0 1 0 | | 8 | 1 0 1 0 0 |
| 0 0 0 1 1 0 1 1 | | 9.5 | 1 0 1 0 1 |
| 0 0 0 1 1 1 0 0 | | 11 | 1 0 1 1 0 |
| 0 0 0 1 1 1 0 1 | | 13 | 1 0 1 1 1 |
| 0 0 0 1 1 1 1 0 | | 16 | 1 1 0 0 0 |
| 0 0 0 1 1 1 1 1 | | ∞ m | 1 1 1 1 1 |
| 0 0 1 0 0 0 0 0 | Focal | 50 mm | 0 0 1 0 1 |
| 0 0 1 0 0 0 0 1 | Length | 50 | 0 0 1 1 0 |
| 0 0 1 0 0 0 1 0 | | 50 | 0 0 1 1 1 |
| 0 0 1 0 0 0 1 1 | | 70 | 0 1 0 0 0 |
| 0 0 1 0 0 1 0 0 | | 75 | 0 1 0 0 1 |
| 0 0 1 0 0 1 0 1 | | 75 | 0 1 0 1 0 |
| 0 0 1 0 0 1 1 0 | | 85 | 0 1 0 1 1 |
| 0 0 1 0 0 1 1 1 | | 85 | 0 1 1 0 0 |
| 0 0 1 0 1 0 0 0 | | 100 | 0 1 1 0 1 |
| 0 0 1 0 1 0 0 1 | | 100 | 0 1 1 1 0 |
| 0 0 1 0 1 0 1 0 | | 105 | 0 1 1 1 1 |
| 0 0 1 0 1 0 1 1 | | 105 | 1 0 0 0 0 |
| 0 0 1 0 1 1 0 0 | | 105 | 1 0 0 0 1 |
| 0 0 1 0 1 1 0 1 | | 135 | 1 0 0 0 1 |
| 0 0 1 0 1 1 1 0 | | 135 | 1 0 0 0 1 |
| 0 0 1 0 1 1 1 1 | | 135 mm | 1 0 0 0 1 |

Note *: "fw" stands for minimum focal length when lens is zoomed to widest.
Note **: "ft" stands for maximum focal length when lens is zoomed to most telescopic side.

TABLE 3

| Data in Rom $b_4b_3b_2b_1b_0$ | Aperture Value F No. | Av | Focusing Distance m | Dv | Avc | Focal Length mm | dEvo |
|---|---|---|---|---|---|---|---|
| 0 0 0 0 0 | 1.0 | 0 | 0.25 | −4.0 | −8/8 | 6.0 | 0 |
| 0 0 0 0 1 | 1.2 | 0.5 | 0.30 | −3.5 | −7/8 | 7.5 | 1/8 |
| 0 0 0 1 0 | 1.4 | 1.0 | 0.35 | −3.0 | −6/8 | 8.0 | 2/8 |
| 0 0 0 1 1 | 1.7 | 1.5 | 0.42 | −2.5 | −5/8 | 16 | 3/8 |
| 0 0 1 0 0 | 1.8 | 1.7 | 0.50 | −2.0 | −4/8 | 17 | 4/8 |
| 0 0 1 0 1 | 2.0 | 2.0 | 0.60 | −1.5 | −3/8 | 20 | 5/8 |
| 0 0 1 1 0 | 2.4 | 2.5 | 0.70 | −1.0 | −2/8 | 24 | 6/8 |
| 0 0 1 1 1 | 2.5 | 2.64 | 0.84 | −0.5 | −1/8 | 25 | 7/8 |
| 0 1 0 0 0 | 2.8 | 3.0 | 1.0 | 0.0 | 0 | 28 | 8/8 |
| 0 1 0 0 1 | 3.4 | 3.5 | 1.2 | 0.5 | +1/8 | 35 | |
| 0 1 0 1 0 | 3.5 | 3.62 | 1.4 | 1.0 | +2/8 | 45 | |
| 0 1 0 1 1 | 3.6 | 3.7 | 1.7 | 1.5 | +3/8 | 50 | |
| 0 1 1 0 0 | 4.0 | 4.0 | 2.0 | 2.0 | +4/8 | 70 | |
| 0 1 1 0 1 | 4.5 | 4.34 | 2.4 | 2.5 | +5/8 | 75 | |
| 0 1 1 1 0 | 4.7 | 4.5 | 2.8 | 3.0 | +6/8 | 85 | |
| 0 1 1 1 1 | 5.0 | 4.64 | 3.4 | 3.5 | +7/8 | 100 | |
| 1 0 0 0 0 | 5.6 | 5.0 | 4.0 | 4.0 | +8/8 | 105 | |
| 1 0 0 0 1 | 6.3 | 5.31 | 4.7 | 4.5 | | 135 | |
| 1 0 0 1 0 | 6.5 | 5.4 | 5.6 | 5.0 | | 150 | |
| 1 0 0 1 1 | 6.7 | 5.5 | 6.7 | 5.5 | | 180 | |
| 1 0 1 0 0 | 8.0 | 6.0 | 8.0 | 6.0 | | 200 | |
| 1 0 1 0 1 | 9.5 | 6.5 | 9.5 | 6.5 | | 210 | |
| 1 0 1 1 0 | 11 | 7.0 | 11 | 7.0 | | 250 | |
| 1 0 1 1 1 | 13 | 7.5 | 13 | 7.5 | | 300 | |
| 1 1 0 0 0 | 16 | 8.0 | 16 | 8.0 | | 400 | |
| 1 1 0 0 1 | 19 | 8.5 | 19 | 8.5 | | 500 | |
| 1 1 0 1 0 | 22 | 9.0 | 22 | 9.0 | | 600 | |

TABLE 3-continued

| Data in Rom $b_4b_3b_2b_1b_0$ | Aperture Value F No. | Av | Focusing Distance m | Dv | Avc | Focal Length mm | dEvo |
|---|---|---|---|---|---|---|---|
| 1 1 0 1 1 | 27 | 9.5 | 27 | 9.5 | | 800 | |
| 1 1 1 0 0 | 32 | 10.0 | 32 | 10.0 | | 1000 | |
| 1 1 1 0 1 | 38 | 10.5 | 38 | 10.5 | | 1200 | |
| 1 1 1 1 0 | 45 | 11.0 | 45 | 11.0 | | 1600 | |
| 1 1 1 1 1 | | | Infinite | | | Fixed | |

The description is now directed to the data stored in ROM RO1 with reference to the above given Tables 2 and 3. It is to be noted that the data in Table 2 under the column "Data Example in ROM" are given as an example, and such data are for a zoom lens having a range of focal length between 50 mm and 135 mm, and a range of aperture size between F 3.5 and F 22. At a location specified by an address "00000001", data "11100" necessary for checking whether the lens is properly mounted or not is stored. The data "11100" is stored at the address "00000001" not only in the case of the above given zoom lens, but also in any other types of lenses. Also, the data for checking is not necessarily "11100", but can be any other combination of 5-bit data, so long as such data is common to all other types of lenses.

In the location specified by the address "00000010", a data dEvo, representing the fully-open aperture exposure error compensating data, is stored. Since the data dEvo for the exemplary zoom lens is dEvo=2/8, data "00010" corresponding to dEvo=2/8, as shown in Table 3, is stored. In the address "00000011", data Avm representing the minimum aperture size is stored, and in the exemplary case, Avm is F22 (=9 Av). Thus, a data "10010" representing F22 as indicated in Table 3, is stored in the address "00000011". In the address "00000100", a data Avo, representing the fully-open aperture size, is stored, and in the exemplary case, it is Avo=3.62 (=F 3.5). Thus, a data "01010" representing Avo=3.62, as indicated in Table 3, is stored in the address "00000100".

In the address "00000101", a data fw, representing the minimum focal length of the zoom lens, is stored, and in the exemplary case, the actually stored data is "01011" representing the focal length 50 mm, as understood from Table 3. In the address "00000110", a data ft, representing the maximum focal length of the zoom lens, is stored, and in the exemplary case, the stored data is "10001" representing the focal length 135 mm, as understood from Table 3. In the case where the interchangeable lens is not a zoom lens, i.e., a lens with a fixed focal length, a data indicating such a fixed focal length is stored in the address "00000101", and a data "11111" indicating that the interchangeable lens has a fixed focal length is stored in the address "00000110".

In each of the addresses "00001000", "00001001" and "00001010", data Avc representing the light measurement error caused by the exchange of the lens is stored. The reason for providing a plurality of data for the light measurement error is because, even when the lens to be mounted is the same, the light measurement error shows a different amount when the camera body has a different arrangement of the light receiving element, that is when the light receiving element is located at a different position relative to the exit pupil of the lens. According to the preferred embodiment, the ROM RO1 is prepared not only applicable to one type of the camera body, but also to a number of types, such as 3, types of the camera bodies. From this point of view, if ROM RO1 is stored with only one data for the light measurement error, there will be an exposure error when the same lens is mounted on another type of camera body.

When a lens is mounted on a first type of the camera body, an address "00001000" is designated, when a lens is mounted on a second type of the camera body, an address "00001001" is designated, and when a lens is mounted on a third type of the camera body, an address "00001010" is designated. It is to be noted that, according to the embodiment described herein, the circuit shown in connection with FIGS. 4a and 4b is designed for the second type of the camera. And, according to the exemplification shown in Table 2, a data stored in the address "00001000" for the first type camera is "01010", representing Avc = +2/8; a data stored in the address "00001001" for the second type camera is "00101", representing Avc = −⅜; and a data stored in the address "00001010" for the third type camera is "01001", representing Avc = +⅛.

An example of data representing the light measurement error to be stored in other lenses is shown in Table 4 below.

TABLE 4

| Lens | Address | Camera Type | Avc | Data |
|---|---|---|---|---|
| 28 mm/F 2.8 | 08H | 1st | 0 | 01000 |
| | 09H | 2d | +1/8 | 01001 |
| | 0AH | 3d | −1/8 | 00111 |
| 35 mm/F 2.8 | 08H | 1st | −1/8 | 00111 |
| | 09H | 2d | 0 | 01000 |
| | 0AH | 3d | −2/8 | 00110 |
| 50 mm/F 1.4 | 08H | 1st | 0 | 01000 |
| | 09H | 2d | 0 | 01000 |
| | 0AH | 3d | 0 | 01000 |
| 85 mm/F 2 | 08H | 1st | −2/8 | 00110 |
| | 09H | 2d | −4/8 | 00100 |
| | 0AH | 3d | −1/8 | 00111 |
| 135 mm/F 2.8 | 08H | 1st | −4/8 | 00100 |
| | 09H | 2d | −3/8 | 00101 |
| | 0AH | 3d | −1/8 | 00111 |
| 300 mm/F 5.6 | 08H | 1st | −4/8 | 00100 |
| | 09H | 2d | +1/8 | 01001 |
| | 0AH | 3d | 0 | 01000 |

According to the example shown in Table 4, a 50 mm/F 1.4 lens is considered to be a standard lens. Accordingly, the light measurement error Avc for each of the first, second and third cameras in combination with the standard lens is rendered 0, and other errors Avc are calculated relatively to the standard lens. The above data are fixed data for the lens.

In the addresses "00010000" through "00011111", data of various focusing distances are stored as variable data. From the focusing distance data producing device DS, a 4-bit data corresponding to the shifted amount of the distance ring (not shown) from the nearest-focusing position is produced; and the produced 4-bit data is applied through a data selector MP2 to four least significant inputs r3, r2, r1 and r0 of the ROM RO1 for designating a particular location therein, thereby a data of focusing distance in absolute value stored in the designated location is read out from the ROM RO1. According to the example given in Table 3, if the data produced from the focusing distance data producing device DS is "0010", an address "00010010" defined by the data "0010" designates a particular location in the ROM RO1, whereby the ROM RO1 produces a data "01100" representing the focusing distance of 2 m (Dv=2). If the data produced from the device DS is "1011", an address "00011011" defined by the data "1011" is produced, designating a particular location in the ROM RO1, whereby the ROM RO1 produces a data "10101" representing the focusing distance of 9.5 m (Dv=6.5). It is to be noted that, since the focusing distance data is used for the flash-photographing calculation and, therefore, the data is given by the APEX numbering system, the produced data corresponds to a value $2^{\frac{1}{2}Dv}$ m wherein Dv changes with a rate of ½. In contrast to this, it is possible to increase the range of data with a more precise rate of change by increasing the number of bits in the address data from the focusing distance data producing device DS and, at the same time, increasing the number of bits in the ROM RO1.

In the addresses "00100000" through "00101111", data of various focal lengths set by the zooming ring are stored for the case of zoom lens, and fixed data of "11111" indicating the fixed focal length is stored for the case of fixed focal length lens in each of said addresses. In a similar manner to the focusing distance, a 4-bit data corresponding to the shifted amount of zoom ring (not shown) from the minimum focal length is produced from the focal length data producing device FS; and the produced 4-bit data is applied through a data selector MP2 to four least significant inputs r3, r2, r1 and r0 of the ROM RO1 for designating a particular location therein, thereby a data of focal length in absolute value stored in the designated location is read out from the ROM RO1. According to the example given in Table 3, if the data produced from the focal length data producing device FS is "0010", an address "00100010" defined by the data "0010" designates a particular location in the ROM RO1, whereby the ROM RO1 produces a data "01011" representing the focal length of 50 mm. If the data produced from the device FS is "1010", an address "00101010" defined by the data "1010" is produced, designating a particular location in the ROM RO1, whereby the ROM RO1 produces a data "10000" representing the focal length of 105 mm. It is to be noted that, in the example shown in Table 3, the ROM RO1 is stored with various data of popular focal lengths, such as 50 mm, 85 mm, 100 mm, and so on; that is, focal lengths of fixed focal length lenses are available. In contrast to this, it is possible to obtain data of further precise focal lengths by increasing the number of bits in the address data and the focal length data.

Referring next to FIGS. 4a and 4b, the description is directed to the interface circuit IF. When the switches LS and MS close, the micro-computer 1 produces from its output O2 a "HIGH" (waveform O2 shown in FIG. 6) as a start signal for starting the data reading. The positive edge of this start signal actuates the one-shot circuit OS1, whereby the one-shot circuit OS1 produces a positive going pulse (waveform OS1 shown in FIG. 6). By the negative edge of this pulse, a flip-flop FF1 is turned to a set condition. The flip-flop FF1 is turned to a reset condition by a negative edge of a pulse from an OR gate OR1 which receives a pulse PR2 from the power-on-reset circuit PO2 (FIG. 1) or a pulse end 2 from an AND gate AN18 indicating the completion of data reading of the interface circuit IF, as will be described in detail later. The Q output of the flip-flop FF1 is connected to one input of AND gate AN1 and D input of D flip-flop DF1. The other input of the AND gate AN1 is connected to oscillator OSC shown in FIG. 1 for receiving a train of clock pulses CP. The output CPL of the AND gate AN1 is connected to clock terminal CL of the D flip-flop DF1 and also to a terminal JB2, and further to a terminal JL2, when the lens LE is mounted, for supplying clock pulses CPL to the lens LE. Therefore, the D flip-flop DF1 accepts D input and produces "HIGH" (waveform DF1 in FIG. 6) from its Q output by the negative edge of a clock pulse CPL which is produced immediately after the setting of the flip-flop FF1. The Q output of the D flip-flop DF1 is connected to reset terminal of each of counters CO1, CO2 and CO3 and also to enable terminal of each of decoders DE2 and DE3, thereby releasing the reset condition of the counters CO1, CO2 and CO3 and turning the decoders DE2 and DE3 in a condition ready to produce a signal, by the "HIGH" from the Q output of the D flip-flop DF1. In other words, by the "HIGH" from the Q output of the D flip-flop DF1, it is ready to carry out the data transmission between the interface circuit IF and the lens. The output of the OR gate OR1 is also connected to a reset terminal of each of flip-flop FF3 and D flip-flops DF1, whereby the flip-flop FF3 is turned to a reset condition by the positive edge of the pulse from the OR gate OR1 and the D flip-flop DF1 is turned to a reset condition by the negative edge of the pulse from the OR gate OR1.

Referring now to FIG. 5, when the micro-computer 1 produces "HIGH" from its output 02, the transistor BT2 (FIG. 1) is turned on for supplying power from the camera body to the lens through the terminals JB1 and JL1. Accordingly, a power-on-reset circuit P03 is so actuated as to produce a pulse from its output. The output of the power-on-reset circuit P03 is connected to each of flip-flops FF7 and FF5 and D flip-flop DF5. Thus, by the positive edge of the pulse from the power-on-reset circuit P03, the flip-flop FF7 and D flip-flop DF5 are turned to reset condition, and by the negative edge of the pulse from the power-on-reset circuit P03, the flip-flop FF5 is turned to set condition. It is to be noted that the power-on-reset P03, flip-flop FF3 and D flip-flop DF5 are provided as a means for turning a timing control means (described later) to a condition ready to operate in response to the power supply to the lens through the terminals JB1 and JL1. Thereafter, by the negative edge of a clock pulse CPL, which is transmitted from the AND gate AN1 (FIG. 4a) through the terminals JB2 and JL2, the D flip-flop DF5 takes in a "HIGH" from the Q output of the flip-flop FF5 and, thus, the Q output of the D flip-flop DF5 produces "HIGH". The Q output of the D flip-flop DF5 is connected to reset terminal of counters CO4 and CO5 and also to enable terminal of a decoder DE4, whereby the "HIGH" from the Q output of the D flip-flop DF5 releases the reset condition of the counters CO4 and CO5 and, at the same time, turns the decoder DE4 to a condition ready to produce an output.

It is to be noted that by making the pulse width of the "HIGH" pulse from the one-shot-circuit OS1 wider than that from the power-on-reset P03, the flip-flop FF1 shown in FIG. 4a will be turned to a set condition after the flip-flop FF5 shown in FIG. 5 is turned to a set condition. By the set condition of the flip-flop FF1, the AND gate AN1 produces a train of clock pulses and, therefore, by the negative edge of the first clock pulse CPL from the AND gate AN1, the D flip-flops DF1 and DF5 positively produce "HIGH" from their Q output, thereby the circuits in the camera body and those in the lens are released from the reset condition simultaneously.

The counter CO1 and decoder DE2 shown in FIG. 4a and the counter CO4 and decoder DE4 shown in FIG. 5 are provided for producing timing signals which synchronize the circuit operations between the circuits in the camera and the lens.

It is to be noted that the counter CO4 and decoder DE4 are provided as a means for controlling the timing of operations of data selector MP2, focusing distance data producing device DS, focal length data producing device FS, shift registers SR3 and SR4 and ROM RO1, and their associated elements such as, AND gates AN30, AN32, AN33, AN34 and AN35, OR gate OR5, inverter IN10, flip-flops FF6 and FF7, and counter CO5.

The counter CO1 is a 4-bit counter capable of counting 16 pulses, and it counts clock pulses CP. The counter CO4 is also a 4-bit counter, and it counts clock pulses CPL. The decoder DE2 has 3 inputs for receiving 3-bit signal from the least significant digit outputs CB2, CB1 and CB0 of the counter CO1 and, by the combination of 3-bit signal, the decoder DE2 produces a "HIGH" from one of its outputs TB7 to TB0. Similarly, the decoder DE4 has 3 inputs for receiving 3-bit signal from the least significant digit outputs CL2, CL1 and CL0 of the counter CO4 and, by the combination of the 3-bit signal, the decoder DE4 produces a "HIGH" from one of its outputs TL7 and TL0. The waveforms of pulse signals from the outputs TB7 to TB0, which are identical to the pulse signals from the outputs TL7 to TL0, respectively, are shown in FIGS. 6 and 7. Also, the relationship between the combination of the 3-bit signal from the counter CO1 (or CO4) and the output signal produced from the decoder DE2 (or DE4) is shown in Table 5 below.

TABLE 5

| Counter CO1 (CO4) | | | Decoder DE2 (DE4) | | | | | | | |
|---|---|---|---|---|---|---|---|---|---|---|
| CB2 or CL2 | CB1 or CL1 | CB0 or CL0 | TB0 or TL0 | TB1 or TL1 | TB2 or TL2 | TB3 or TL3 | TB4 or TL4 | TB5 or TL5 | TB6 or TL6 | TB7 or TL7 |
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 1 | 0 | 0 | 0 | 0 | 1 | 0 | 0 | 0 |
| 1 | 1 | 1 | 0 | 0 | 0 | 0 | 0 | 0 | 0 | 1 |

The counter CO2 shown in FIG. 4a is a 4-bit counter for counting pulses produced from output CB0 of the counter CO1, and has four outputs CS3, CS2, CS1 and CS0, which are connected to inputs of the decoder DE3, as well as the output CB0 of the counter CO1. By the combination of a 5-bit signal (CB0, CS3, CS2, CS1 and CS0), the decoder DE3 produces a "HIGH" from one of its outputs S16 to S0. The "HIGH" signal produced from the decoder DE3 is used for determining a transmitting address data from the interface circuit IF to the lens and the steps for reading data from the lens. From this viewpoint, a period in which the terminal S1 is producing "HIGH" is referred to as a period S1, and, in general terms, a period in which a terminal Sn (n is an integer between 1 and 16) is producing "HIGH" is referred to as a period Sn.

The relationship between the combination of the 5-bit signal applied to the decoder DE3 and the output signals produced from the decoder DE3 is shown in Table 6 below.

TABLE 6

| Input | | | | | Decoder DE3 Output | | | | | | | | | | | | | | | | |
|---|---|---|---|---|---|---|---|---|---|---|---|---|---|---|---|---|---|---|---|---|---|
| CS3 | CS2 | CS1 | CS0 | CB3 | S0 | S1 | S2 | S3 | S4 | S5 | S6 | S7 | S8 | S9 | S10 | S11 | S12 | S13 | S14 | S15 | S16 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 0 | 0 | 0 | 0 | 1 | 0 | 1 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 1 | 0 | 0 | 0 | 0 | 0 | 0 | 0 | 0 | 0 | 0 | 0 | 0 | 0 | 0 |
| 0 | 0 | 0 | 1 | 1 | 0 | 0 | 0 | 1 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 1 | 0 | 0 | 0 | 0 | 0 | 0 | 0 | 0 | 0 | 0 | 0 | 0 |
| 0 | 0 | 1 | 0 | 1 | 0 | 0 | 0 | 0 | 0 | 1 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 1 | 0 | 0 | 0 | 0 | 0 | 0 | 0 | 0 | 0 | 0 |
| 0 | 0 | 1 | 1 | 1 | 0 | 0 | 0 | 0 | 0 | 0 | 0 | 1 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 1 | 0 | 0 | 0 | 0 | 0 | 0 | 0 | 0 |
| 0 | 1 | 0 | 0 | 1 | 0 | 0 | 0 | 0 | 0 | 0 | 0 | 0 | 0 | 1 | 0 | 0 | 0 | 0 | 0 | 0 | 0 |
| 0 | 1 | 0 | 1 | 0 | 0 | 0 | 0 | 0 | 0 | 0 | 0 | 0 | 0 | 0 | 1 | 0 | 0 | 0 | 0 | 0 | 0 |
| 0 | 1 | 0 | 1 | 1 | 0 | 0 | 0 | 0 | 0 | 0 | 0 | 0 | 0 | 0 | 0 | 1 | 0 | 0 | 0 | 0 | 0 |
| 0 | 1 | 1 | 0 | 0 | 0 | 0 | 0 | 0 | 0 | 0 | 0 | 0 | 0 | 0 | 0 | 0 | 1 | 0 | 0 | 0 | 0 |
| 0 | 1 | 1 | 0 | 1 | 0 | 0 | 0 | 0 | 0 | 0 | 0 | 0 | 0 | 0 | 0 | 0 | 0 | 1 | 0 | 0 | 0 |
| 0 | 1 | 1 | 1 | 0 | 0 | 0 | 0 | 0 | 0 | 0 | 0 | 0 | 0 | 0 | 0 | 0 | 0 | 0 | 1 | 0 | 0 |
| 0 | 1 | 1 | 1 | 1 | 0 | 0 | 0 | 0 | 0 | 0 | 0 | 0 | 0 | 0 | 0 | 0 | 0 | 0 | 0 | 1 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 1 |

Referring to FIG. 4a, one input of the AND gate AN7 is connected to the terminal TB6 of the decoder DE2, and the other input thereof is connected to the terminal CB3 of the counter CO1 through an inverter IN0. The output of the AND gate AN7 is connected to a clock terminal CL of the counter CO3. The counter CO3 is a 3-bit counter for providing data necessary for defining address data for the ROM RO1 provided in the lens, and has 3 outputs which are connected through a data selector MP0 to inputs Ba3, Ba2 and Ba1 of a shift register SR1. The counter CO3 counts pulses from the output TB6 of the decoder DE2 while the output CB3 of the counter CO1 is producing "LOW". Thus, when the output TB6 of the decoder DE2 produces "HIGH" during the period S0, the counter CO3 produces a 3-bit signal "001". Likewise, when the output TB6 produces "HIGH" during the period S2, the counter CO3 produces a 3-bit signal "010"; when the output TB6 produces "HIGH" during the period S4, the counter CO3 produces a 3-bit signal "011"; when the output TB6 produces "HIGH" during the period S6, the counter CO3 produces a 3-bit signal "100"; when the output TB6 produces "HIGH" during the period S8, the counter CO3 produces a 3-bit signal "101"; and when the output TB6 produces "HIGH" during the period S10, the counter CO3 produces a 3-bit signal "110".

The 3 outputs of the counter CO3 are also connected to 3 inputs of an AND gate AN20 with the output of the counter CO3 carrying the least significant bit being connected to an inverting input of the AND gate AN20. The output of the AND gate AN20 is connected to D input of a D flip-flop DF2. The D flip-flop DF2 has a clock terminal CL connected to the output TB0 of the decoder DE2, and a Q terminal connected to a select terminal SL of the data selector MP0. Thus, in response to the output "110" from the counter CO3 as produced when the output TB6 produces "HIGH" during the period S10, the AND gate AN20 produces a "HIGH". And then, when the output TB0 produces "HIGH" during the period S11, the D flip-flop DF2 produces "HIGH" from its Q terminal. Since the data selector MP0 is so designed that it produces an 8-bit signal as applied to its inputs in a group w0 when the signal applied to the select terminal SL is low, and that it produces an 8-bit signal as applied to its inputs in a group w1 when the signal applied to the select terminal SL is high, the data selector MP0 now produces an 8-bit signal as applied to its inputs in the group w1. The inputs in the group w1 have the lowest bit and the four upper bits connected to ground, as shown, and the remaining 3-bits connected to the counter CO3. While on the other hand, the 8 inputs in the group w2 are so connected to the ground and the power source +E as to produce a fixed signal "00010010".

Therefore, from the data selector MP0, a signal of the group w1 determined by the output of the counter CO3 is produced up to the period S10, and from the period S11 on, the signal of the group w0, i.e., the address data indicating the location where the light measurement error data Avc for the camera body is stored is produced.

The shift register SR1 shown in FIG. 4a is an 8-bit shift register having 8 inputs Ba0 to Ba7. While the switching terminal SP of the shift register SR1 is receiving "HIGH", and when the positive edge of a clock pulse CP is applied to the clock terminal CL, the shift register SR1 simultaneously and parallelly stores an 8-bit signal applied to its 8 inputs Ba7 to Ba0. Contrary, while the switching terminal SP of the shift register SR1 is receiving "LOW", the positive edges of the clock pulses CP sequentially send out the stored 8-bit signal bit-by-bit from the most significant bit serially through the output terminal.

One input of an AND gate AN2 is connected to the output TB6, and one input of an AND gate AN3 is connected to the output TB7. The other inputs of the AND gates AN2 and AN3 are connected to the pulse generator for receiving clock pulses CP. The output of the AND gate AN2 is connected to a set terminal of a flip-flop FF2, and the output of the AND gate AN3 is connected to a reset terminal of the flip-flop FF2. A Q output of the flip-flop FF2 is connected to the switching terminal SP of the shift register SR1. Therefore, the flip-flop FF2 is turned to a set condition by the negative edge of a clock pulse CP produced while the terminal TB6 is "HIGH", and is turned to a reset condition by the negative edge of a clock pulse CP produced while the terminal TB7 is "HIGH" (See waveforms FF2 shown in FIGS. 6 and 7.). Accordingly, the shift register SR1 stores the 8-bit signal by the positive edge of the "HIGH" from the terminal TB7, and sequentially sends out the stored 8-bit signal by the sequential "HIGH" signals from the terminals TB0 and TB6. The counter CO3, D flip-flop DF2, data selector MP0, flip-flop FF2, shift register SR1, AND gates AN2, AN3, AN7 and AN20, and inverter IN0 define a means for producing address data for the camera accessory.

Referring to FIG. 4a, a set terminal of a flip-flop FF3 is connected to an output of AND gate AN16 (FIG. 4b) for receiving a signal end1. The AND gate AN16 has one input connected to the terminal TB6 of the decoder DE2 and the other input connected to the terminal S14 of the decoder DE3. Therefore, during a period S14 and when the terminal TB6 produces a pulse, the signal end1 is produced from the AND gate AN16 and is applied to the set terminal of the flip-flop FF3. The signal end1 is produced when the reading of fixed data from the lens is completed. Therefore, after the signal end1, it is not necessary to produce any address data from the interface circuit IF. Thus, when the flip-flop FF3 is turned to a set condition by the signal end1, it produces "LOW" from its $\bar{Q}$ terminal, whereby an AND gate AN4, having its one input connected to the $\bar{Q}$ terminal, produces "LOW" to turn a switching circuit SC1 off. The other input of the AND gate AN4 is connected to the output CB3 of the counter CO1. Thus, the AND gate AN4 produces "HIGH" when the terminal CB3 of the counter CO1 produces "HIGH" while the $\bar{Q}$ terminal of the flip-flop FF3 is producing "HIGH", i.e., during a period from the generation of "HIGH" from the OR gate OR1 until the generation of the signal end1. When the AND gate AN4 produces "HIGH", the switching circuit SC1 is turned on to transmit address data produced from the shift register SR1 to the lens through the terminals JB3 and JL3.

An OR gate OR3 has two inputs: one input is connected to the Q terminal of the flip-flop FF3; and the other is connected to the terminal CB3 of the counter CO1 through an inverter IN6. The output of the OR gate OR3 is connected to a control terminal of a switching circuit SC2 and also to one input of an AND gate AN5. The other input of the AND gate AN5 is connected to the terminal TB5 of the decoder DE2, and the output of the AND gate AN5 is connected to a latch terminal L of a latch circuit LA. The switching circuit SC2 is connected between the terminal JB3 and an IN terminal of a shift register SR2, provided as a means for reading accessory data. The shift register SR2 sequentially stores the signal applied at its IN terminal in synchronized relation with the negative edge of the clock pulse CP, and produces the stored signal from its outputs Bb0 and Bb4. Thus, the OR gate OR3 produces "HIGH" when the output CB3 of the counter CO1 produces "LOW" and when the flip-flop FF3 is in reset condition producing "HIGH" from its Q output (a period from the start of data reading in the lens until the end of fixed data reading of all the data in the lens). And, when the OR gate OR3 is producing "HIGH", the switching circuit SC2 is turned on to transmit signals from the terminal JB3 to the shift register SR2.

As apparent from the above, the switching circuits SC1 and SC2 are turned on alternately, thus preventing the simultaneous turn of the switching circuits SC1 and SC2. In this manner, the address data produced from the shift register SR1 is transmitted through the switching circuit SC1 and terminals JB3 and JL3 to the lens while the switching circuit SC1 is turned on, and the lens data from the lens is transmitted through the terminals JL3 and JB3 and the switching circuit SC2 to the shift register SR2 while the switching circuit SC2 is turned on, thereby preventing any interference between the address data and lens data. The outputs Bb4 and Bb0 of the shift register SR2 are connected to a latch circuit LA, so that the latch circuit LA latches the data at the outputs Bb4 to Bb0 in response to the positive edge of a pulse from the terminal TB5 while the OR gate OR3 is producing "HIGH". The switching circuits SC1 and SC2, flip-flop FF3, AND gate AN4, OR gate OR3 and inverter IN6 define a first switching means provided in the camera body for switching the direction of signal propagation between the camera body and the lens through the terminals JB3 and JL3.

Referring to FIG. 4b, the output of the latch LA is connected to each of registers REG0 to REG8. The registers REG0 to REG8, each having a latch terminal L, are connected to AND gates AN10 to AN18, at respective latch terminals L. One of the inputs of AND gates AN10 to AN18 are connected to each other and further to the terminal TB6 of the decoder DE2, and other of the inputs thereof are connected to terminals S2, S4, S6, S8, S10, S12, S14, S15 and S16 of the decoder DE3, respectively. The output of the AND gate AN18 produces an end2 signal indicating that reading and storing of all data from the lens are completed. The output of the AND gate AN18 is connected not only to the latch terminal L of the register REG8, but also to a set terminal S of a flip-flop FF4 (FIG. 4a). The Q terminal of the flip-flop FF4 is connected to the input i3 of the micro-computer 1 (FIG. 1), and the reset terminal R thereof is connected to an OR gate OR2. The OR gate OR2 has two inputs: one is connected to the output PR2 of the power-on-reset PO2 (FIG. 1); and the other is connected to output a8 of a decoder DE1, which will be described below. Therefore, the flip-flop FF4 is turned to reset condition when the power-on-reset circuit PO2 produces a pulse from its output PR2 in response to the turn on of the light measurement switch MS, and is turned to set condition when the AND gate AN18 produces the signal end2 upon completion of data reading and storing from the lens. The output a8 of the decoder DE1, as will be described below, produces "HIGH" at the end of data transmission from the interface circuit IF to the micro-computer 1 and, therefore, the flip-flop FF4 is turned to reset the condition at the end of data transmission from the interface circuit IF to the micro-computer 1.

Referring to FIG. 4a, the decoder DE1 receives data from the output OP3 of the micro-computer 1 and produces a "HIGH" from one of its outputs a0 to a8 depending on the received data from the micro-computer 1. A relationship between the input data and output data of the decoder DE1 is shown below in Table 7.

TABLE 7

| Inputs (OP3 output) | | | | Decoder DE1 Outputs | | | | | | | | |
|---|---|---|---|---|---|---|---|---|---|---|---|---|
| | | | | a0 | a1 | a2 | a3 | a4 | a5 | a6 | a7 | a8 |
| 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 |
| 0 | 1 | 0 | 1 | 1 | 0 | 0 | 0 | 0 | 0 | 0 | 0 | 0 |
| 0 | 1 | 1 | 0 | 0 | 1 | 0 | 0 | 0 | 0 | 0 | 0 | 0 |
| 0 | 1 | 1 | 1 | 0 | 0 | 1 | 0 | 0 | 0 | 0 | 0 | 0 |
| 1 | 0 | 0 | 0 | 0 | 0 | 0 | 1 | 0 | 0 | 0 | 0 | 0 |
| 1 | 0 | 0 | 1 | 0 | 0 | 0 | 0 | 1 | 0 | 0 | 0 | 0 |
| 1 | 0 | 1 | 0 | 0 | 0 | 0 | 0 | 0 | 1 | 0 | 0 | 0 |
| 1 | 0 | 1 | 1 | 0 | 0 | 0 | 0 | 0 | 0 | 1 | 0 | 0 |
| 1 | 1 | 0 | 0 | 0 | 0 | 0 | 0 | 0 | 0 | 0 | 1 | 0 |
| 1 | 1 | 0 | 1 | 0 | 0 | 0 | 0 | 0 | 0 | 0 | 0 | 1 |

The outputs a0 to a8 of the decoder DE1 are connected to chip select terminals CS of the registers REG0 to REG8, respectively. When the chip select terminal CS of a particular register receives "HIGH" from the decoder DE1, said particular register provides data stored therein to the input IP1 of the data selector MP1 and further to the micro-computer 1.

Referring to FIG. 5, an AND gate AN30 has two inputs: one is connected to the output CL3 of the counter CO4; and the other is connected to output $\overline{FD}$ of $\overline{Q}$ terminal of the flip-flop FF7. The output of the AND gate AN30 is connected to the switching circuit SC3, which is connected between the terminal JL3 and input of a shift register SR3. Furthermore, the clock input CL of the shift register SR3 is connected to the terminal JL2 for receiving a train of clock pulses CPL. Thus, while the switching circuit SC3 is on, the shift register SR3 sequentially stores the address data a from the camera body through the terminals JB3 and JL3 in response to the negative edge of the clock pulses, thereby producing an address data from its terminals La0 to La6. An AND gate AN35 is provided having its one input connected to the output La3 of the shift register SR3, and the other input connected to the terminal TL7 of the decoder DE4. When the output La3 produces "HIGH" while the terminal TL7 is producing "HIGH", the AND gate AN35 produces "HIGH". That is, the AND gate AN35 produces "HIGH" when the last address data, which is either "00001000", "00001001" or "00001010" for designating the fixed data of light measurement error data Avc, is sent from the camera body to the lens. The output of the AND gate AN35 is connected to a set terminal of a flip-flop FF7. Therefore, the flip-flop FF7 is turned to a set condition when the output La3 produces "HIGH" (i.e., when the last address for the fixed data is applied to the shift register SR3) while the terminal TL7 is producing "HIGH". When the flip-flop FF7 is turned to the set condition, its output FD of Q terminal produces "HIGH" and its output $\overline{FD}$ of $\overline{Q}$ terminal produces "LOW". An AND gate AN32 has two inputs: one is connected to the output FD of Q terminal of the flip-flop FF7; and the other is connected to the terminal TL6 of the decoder DE4. The output of the AND gate AN32 is connected to a clock terminal CL of a counter CO5. Therefore, the outputs Ca1 and Ca0 of the counter CO5 produce a 2-bit signal "01" when the flip-flop FF7 produces "HIGH" from its output FD of the Q terminal and when the output TL6 produces "HIGH" during a period S12 in the next sequence. Furthermore, the outputs Ca1 and Ca0 of the counter CO5 produce a 2-bit signal "10" when the output TL6 produces "HIGH" during a period S13 in the next sequence.

The outputs Ca1 and Ca0 of the counter CO5 are connected to the data selector MP2 and, more particularly, to the data input portions d2 and d3 and also to selection terminal SL. The data input portion d1 of the data selector MP2 is connected to the outputs La0 to La6 of the shift register SR3. The data input portion d2 has its most significant bit terminal grounded, the second and third bit terminals from the most significant bit terminal are connected to the outputs Ca1 and Ca0 of the counter CO5, and the remaining 4 bit terminals are connected to the outputs of the focusing distance data producing device DS. The data input portion d3 has its most significant bit terminal grounded, the second and third bit terminals from the most significant bit terminal are connected to the outputs Ca1 and Ca0 of the counter CO5, and the remaining 4 bit terminals are connected to the outputs of the focal length data producing device FS.

When the selection terminal SL receives "00", the data selector MP2 produces data applied to its input portion d1. Similarly, when the selection terminal SL receives "01", the data selector MP2 produces data applied to its input portion d2, and when the selection terminal SL receives "11", the data selector MP2 produces data applied to its input portion d3. Therefore, until the terminal TL6 produces "HIGH" during a period of S14, the data selector MP2 produces address data which has been transmitted from the camera body through the shift register SR3. And from that time until the terminal TL6 produces a "HIGH" during a period S15, the data selector MP2 produces address data concerning the focusing distance applied to the input portion d2, and thereafter, the data selector MP2 produces address data concerning the focal length applied to the input portion d3. It is to be noted that the shift register SR3, data producing devices DS and FS and data selector MP2 are provided as a means for designating address in the ROM (RO1).

The 7 outputs of the data selector MP2 are connected to the lower 7 inputs r6 to r0 of the ROM RO1. The remaining input r7 of the ROM RO1 is connected to ground. As shown in Table 2, various data is stored in the ROM RO1 at various locations which can be specified by the addresses. Therefore, by the address data applied to the inputs r0 to r7 of the ROM RO1, data stored in a particular location is read out and produced as a 4-bit signal from the ROM RO1. The 4 outputs of the ROM RO1, serving as an accessory data producing means, are connected to 4 upper-bit inputs Lb4 to Lb7 of a shift register SR4. The remaining 3 inputs Lb2 to Lb0 of the shift register SR4 are grounded. The shift register SR4, AND gates AN33 and AN34, and flip-flop FF6 are arranged in the same manner as the above described shift register SR1, AND gates AN2 and AN3, and flip-flop FF2 shown in FIG. 4a. Thus, by the positive edge of a pulse from the terminal TL7, the shift register SR4 simultaneously stores the data applied to its inputs Lb7 to Lb0 and, thereafter, by the positive edge of clock pulses applied to the clock terminal CL, the stored data is sequentially sent out from its output bit-by-bit.

An OR gate OR5 has two inputs: one is connected to an output CL3 of a counter CO4 through an inverter IN10; and the other is connected to the output FD of the Q terminal of the flip-flop FF7. The output of the OR gate OR5 is connected to a control input of a switching circuit SC4, which is connected between the output of the shift register SR4 and the terminal JL3. By the arrangement of the OR gate OR5, switching circuit SC4, and by the arrangement of AND gate AN30 and switching circuit SC3, the switching circuits SC3 and SC4 turn on alternately. More specifically, the switching circuit SC3 turns on when the output $\overline{FD}$ of $\overline{Q}$ terminal of flip-flop FF7 is "LOW" (i.e., while the fixed data of the lens is transmitted) and when the output CL3 of the counter CO4 produces "HIGH", thereby transmitting address data from the camera body to the shift register SR3 through the terminals JB3 and JL3. And, the switching circuit SC4 turns on when the output CL3 of the counter CO4 produces a "LOW", thereby transmitting the data read out from the ROM RO1 to the camera body through the same terminals JL3 and JB3. In this manner, address data and fixed data from the ROM RO1 are transmitted alternately through the same and single transmission line between the terminals JB3 and JL3. Thereafter, when the output FD of Q terminal of the flip-flop FF7 produces "HIGH", only the switching circuit SC4 is maintained turned on, thereby transmitting variable data, such as focusing distance data and focal length data, to the camera body through the same terminals JL3 and JB3. It is to be noted that the switching circuits SC3 and SC4, flip-flop FF7, AND gate AN30, OR gate OR5 and inverter IN10 define a second switching means provided in the lens for switching the direction of the signal propagation between the camera body and the lens.

Next, the description is directed to the operation of circuits of FIGS. 4a, 4b and 5 with reference to the time chart shown in FIGS. 6 and 7. When the output 02 of the micro-computer 1 produces "HIGH" (FIG. 6, waveform 02), the one-shot circuit OS1 produces a pulse (FIG. 6, waveform OS1) for turning the flip-flop FF1 to a set condition. Then, by the positive edge of a next clock pulse, the D flip-flop DF1 produces "HIGH" from its Q output, thereby releasing the reset condition of the counters CO1, CO2 and CO3 and, at the same time, setting the decoders DE2 and DE3 in a condition ready to produce an output. Furthermore, when the flip-flop FF1 is turned to the set condition, the AND gate AN1 produces clock pulses CPL (FIG. 6, waveform CPL), which is applied to the circuit of FIG. 5 provided in the lens through the terminals JB2 and JL2.

In the meantime, by the "HIGH" from the output 02 of the micro-computer 1, the power supply transistor BT2 conducts to supply electric power to the circuit of FIG. 5 through the terminals JB1 and JL1. When the terminal JL1 receives power from the camera body, the power-on-reset circuit PO3 produces a pulse; and by the positive edge of this pulse, the flip-flop FF7 and D flip-flop DF5 are turned to the reset condition; and also by the negative edge of this pulse, the flip-flop FF5 is turned to the set condition. Then, by the positive edge of the first clock pulse CPL, the Q output of the D flip-flop DF5 produces a "HIGH", thereby releasing the reset condition of the counters CO4 and CO5 and, at the same time, putting the decoder DE4 in a condition ready for producing an output. This completes the initial preparation for the data transfer operation.

Next, referring particularly to FIG. 4a, when the terminal TB6 produces "HIGH" during a period S0, the counter CO3 produces a data "001" which is applied to the shift register SR1 through a data selector MP0. Then when the terminal TB7 produces "HIGH" immediately thereafter, the shift register SR1 stores the data "001", thus, the shift register SR1 is now holding an 8-bit data "00000010". Then, in the next period S1, the shift register SR1 sequentially sends out the data "00000010" bit-by-bit in response to the positive edges of the pulses from the terminals TB0 to TB7. Thus sent out data is transmitted serially through the switching circuit SC1, terminals JB3 and JL3 to the lens. During this moment, since the switching circuit SC3 in FIG. 5 is on, the data is sequentially stored in the shift register SR3 in response to the negative edges of the clock pulses CPL (FIG. 6, waveforms La0, La1 and La2). It is to be noted that the shift register SR1 sends out 8 bits of signal, but the shift register SR3 accommodates only 7 bits. Therefore, when the shift register SR3 stores the upper 7 bits "0000001" from the shift register SR1, the stored data "0000001" is transmitted through the data selector MP2 to the inputs r6 to r0 of the ROM RO1 as a part of address data (FIG. 6, waveforms SB, La0, La1 and La2), and, thereupon, the ROM RO1 receives 8-bit address data "00000001" to its inputs r7 to r0, thereby producing a data stored in the designated address "00000001". More specifically, by the negative edge of a clock pulse produced when the terminal TL6 is "HIGH" during the period S1, the shift register SR3 produces from its outputs La6 to La0 the data "0000001" (FIG. 6, waveforms La0, La1 and La2), thereby specifying a location in the ROM RO1 with an address "00000001". In the specified location in the ROM RO1, a data for check "11100", as shown in Table 2, is stored, and is produced from the ROM RO1. The data "11100" produced from the ROM RO1 is stored in the shift register SR4 in response to the positive edge of a pulse from the terminal TL7.

Then, in the next period S2, since the output CL3 of the counter CO4 produces "LOW" while the terminals TL0 to TL7 produce pulses, the data sequentially produced from the outputs Lb7 to Lb0 of the shift register SR4 in response to the positive edges of the pulses from the terminals TL0 to TL7 is serially transmitted through the switching circuit SC4, terminals JL3 and JB3 to the camera body (FIG. 6, waveform SB).

In FIG. 4a, during the period S2 in which the data is transmitted from the lens to the camera body, the output CB3 of the counter CO1 is maintained "LOW", thereby turning on the switching circuit SC2. Thus, the data for check "11100" transmitted to the camera body through the terminals JL3 and JB3 is applied through the switching circuit SC2 and stored in the shift register SR2 in response to the negative edges of the clock pulses CP (FIG. 6, waveform Bb0 to Bb4). Then, by the negative edge of the clock pulse CP produced from the terminal TB4, the shift register SR2 produces "11100" (FIG. 6, waveforms Bb0 to Bb4). And by the positive edge of the pulse produced from the AND gate AN5 in response to the pulse from the terminal TB5 (FIG. 6, waveform AN5), that data from the shift register SR2 is latched in the latch circuit LA. Then, by the pulse from the terminal TB6, the AND gate AN10 produces a pulse. By the positive edge of this pulse, the register REG0 stores the data from the latch circuit LA (FIG. 6, waveform AN10).

During the period S2, the AND gate AN7 produces a pulse in response to the pulse from the terminal TB6, thereby producing data "010" from the counter CO3. Then, by the pulse produced from the terminal TB7, the shift register SR1 stores the data "010" from the counter CO3. Thus, the shift register SR1 is now holding a data "0000001". Then, in the next period S3, the output CB3 of the counter CO1 produces "HIGH", thereby turning the switching circuit SC1 on and, furthermore, the output CL3 of the counter CO4, shown in FIG. 5, produces "HIGH", thereby turning the switching circuit SC3 on. As a consequence, the upper 7-bit data "0000010" from the shift register SR1 is transferred to the shift register SR3 (FIG. 5), in a similar manner described above. The data "0000010" is further transferred through the data selector MP2 to the ROM RO1 at its terminals r6 to r0. Thus, the ROM RO1 receives an address data "00000010" to its inputs r7 to r0, thereby producing a data dEvo representing the exposure difference. According to the example given in Table 2, the exposure difference dEvo is shown as dEvo=2/8 (the address for this data in ROM RO1 is "00010"), but in the time chart given in FIG. 6, the exposure difference dEvo is shown as dEvo=4/8 (the address for this data in ROM RO1 is "00100").

During a period S4, both the output CB3 of the counter CO1 and the output CL3 of the counter CO4 produce "LOW". Therefore, the switching circuits SC2 and SC4 turn on so as to transfer the data "00100" stored in the shift register SR4 to the shift register SR2 in a similar manner described above. And, thereafter, by a pulse produced from the terminal TB5, the data "00100" in the shift register SR2 is latched in the latch circuit LA. And then, by a pulse produced from the terminal TB6, the AND gate AN11 produces a pulse (FIG. 6, waveform AN11), thereby the data "00100" representing the exposure difference dEvo is stored in the register REG1.

In a similar manner, during a period S5, the address data "00000110" (which will be revised to "00000011" in later stage) is transmitted to the lens and, during a period S6, the Avm data representing the minimum aperture size, such as "11010" shown in Table 2, is transmitted from the ROM RO1 to the camera body and, in response to a pulse from the terminal TB6, the Avm data "11010" is stored in the register REG2.

During a period S7, the address data "00001000" (which will be revised to "00000100" in a later stage) is transmitted to the lens and, during a period S8, the data Avo representing the fully-opened aperture size, such as "01010" shown in Table 2, is transmitted from the ROM RO1 to the camera body and, in response to a pulse from the terminal TB6, the data Avo "00001" is stored in the register REG3.

During a period S9, the address data "00001010" (which will be revised to "00000101" in a later stage) is transmitted to the lens and, during a period S10, the fw data representing the minimum focal length, such as "01011" shown in Table 2, is transmitted from the ROM RO1 to the camera body and, in response to a pulse from the terminal TB6, the fw data "01011" is stored in the register REG4.

During a period S11, the address data "00001100" (which will be revised to "00000110" in a later stage) is transmitted to the lens and, during a period S12, the ft data representing the maximum focal length, such as "10001" shown in Table 2, is transmitted from the ROM RO1 to the camera body and, in response to a pulse from the terminal TB6, the ft data "10001" is stored in the register REG4.

During the period S10 and in response to a pulse from the terminal TB6, the counter CO3 produce "110" causing AND gate AN20 to produce a "HIGH". Then during the period S11 and in response to a pulse from the terminal TB0, the D flip-flop DF2 produces a "HIGH" from its Q terminal. Accordingly, the data selector MP0 produces a fixed data "00010010" as obtained from its inputs w0. This fixed data "00010010" indicates that the type of the camera body is the second type among the above-mentioned various types. And, during the period S11 and in response to a pulse from the terminal TB7 the fixed data "00010010" is transferred to and stored in the shift register SR1. Then, during a period S12, the stored data "00010010" are sequentially sent out from the shift register SR1 through its output OUT. Since, during the period S12, the switching circuit SC1 is de-activated, the data "00010010" will not be sent to the lens circuit (FIG. 5). During the period S12 and in response to a pulse from the terminal TB7 the fixed data "00010010" (which will be revised to "00001001" in a stage) is again transferred from the data selector MP0 to the shift register SR1. And, during a period S13, the data "00010010" stored in the shift register SR1 is transferred through the switching circuit SC1, terminals JB3 and JL3 to the lens circuit of FIG. 5, particularly to the shift register SR3. Then, during the period S13 and in response to a pulse from the terminal TL7, the data "00010" (Avc=−6/8) indicating the light measuring difference Avc as stored in ROM RO1 at the address "00001001", is transferred and stored in the shift register SR4, and this data "00010" will be sent to the camera body. FIGS. 4a and 4b show an embodiment of a camera body of the second type, but if it were the first type, a data "00010000" will be applied to the inputs w0 of the data selector MP0. This data "00010000" will be revised as an address data "00001000" in a later stage for designating a location in the ROM RO1, from which data of light measuring error of the first type camera will be produced. In a similar manner, if the camera body is the third type, a data "00010100" will be applied to the inputs w0 of the data selector MP0. Thus, the ROM RO1 is designated with an address "00001010" for producing data of light measurement error of the third type camera body. The above procedure completes the reading of fixed data from the lens.

During the period S13, by the negative edge of a clock pulse produced from the terminal TB6, the shift register SR3 produces "HIGH" from its output La3 (FIG. 7 waveforms La3). Then, by the positive edge of a pulse produced from the AND gate AN35 in response to the pulse produced from the terminal TL7, the flip-flop FF7 is turned to a set condition, thereby producing "HIGH" from the output FD of the Q terminal and "LOW" from the output $\overline{FD}$ of $\overline{Q}$ terminal. Thereupon, the AND gate AN30 produces "LOW" and the OR gate OR5 produces "HIGH" regardless of the output from the terminal CL3 of the counter CO4 and, therefore, the switch circuit SC3 turns off and the switch circuit SC4 turns on, ready for sending various variant data from the lens to the camera body in a manner described below.

During a period S14, the data transfer of the light measuring error data is carried out, and in response to a pulse produced from the terminal TB6 and applied through the AND gate AN16, the register REG6 stores the above-mentioned data and, at the same time, in response to pulse from the output end1 of the AND gate AN16, the flip-flop FF3 is turned to the set condition (FIG. 7 waveforms AN16, end1 and FF3). After that, regardless of signal produced from the output CB3 of the counter CO1, the AND gate AN4 produces a "LOW" and the OR gate OR3 produces a "HIGH". Thus, the switching circuit SC1 is de-activated and the switching circuit SC2 is activated. Thereafter, the data from the lens is transferred to the camera body.

During a period S14 and when the terminal TL6 produces a "HIGH", the counter CO5 counts a pulse from the AND gate AN32 so as to produce "01" (FIG. 7, waveforms Ca0 and Ca1) from its output, thereby actuating the data selector MP2 to select data from the data input portion d2. Thus, the ROM RO1 receives data from the input portion d2. It is to be noted that, in this case, the lower 4-bit inputs r0, r1, r2 and r3 of the ROM RO1 receive data from the focusing distance data producing device DS, the intermediate 2-bit inputs r4 and r5 thereof receives data "01" from the outputs Ca0 and Ca1 of the counter CO5, and the upper 2-bit inputs r6 and r7 thereof receives data "00". Therefore, if the data from the focusing distance data producing device DS is "0000", the final address data applied to the ROM RO1 is "00010000". In this case, the ROM RO1 produces a focusing distance data Dv of "01010" indicating that the focusing distance is 1.4 m, as understood from Table 2. If the data from the device DS is "0001", the final address data applied to the ROM RO1 is "00010001". In this case, the ROM RO1 produces a Dv data "01011" indicating that the focusing distance is 1.7 m. Furthermore, if the data from the device DS is "1110", the final address data applied to the ROM RO1 is "00011110". In this case, the ROM RO1 produces a Dv data "11000" indicating that the focusing distance is 16 m, and, if the data from the device DS is "1111", the final address data applied to the ROM RO1 is "00011111". In this case, the ROM RO1 produces a Dv data "11111" indicating that the focusing distance is infinite.

The focusing distance data Dv produced from the ROM RO1 is stored in the shift register SR4 in response to a pulse produced from the terminal TL7, and by the positive edges of the clock pulses CP produced from the terminals TB0 to TB4 during a period S15 (FIG. 7, waveforms Bb0 to Bb4), the data Dv is stored in the shift register SR2 (FIG. 4a). And, thereafter, by a pulse from the terminal TB5, the data Dv is latched in the latch LA, and then, by a pulse from the terminal TB6, the AND gate AN16 produces a "HIGH" (FIG. 7, waveform AN16), thereby storing the data Dv in the register REG6.

In the step S15 and when the terminal TL6 produces "HIGH", the AND gate AN32 produces "HIGH", thereby producing "10" (FIG. 7, waveform Ca0 and Ca1) from the counter CO5. By the signal "10" from the outputs Ca0 and Ca1 of the counter CO5, the data selector MP2 selects data input portion d3. Thus, the ROM RO1 receives data from the input portion d3. It is to be noted that, in this case, the lower 4-bit inputs r0, r1, r2 and r3 of the ROM RO1 receives data from the focal length data producing device FS, the intermediate 2-bit inputs r4 and r5 thereof receives data "10" from the outputs Ca0 and Ca1 of the counter CO5, and the upper 2-bit inputs r6 and r7 thereof receives data "00". Therefore, if the data from the focal length data producing device FS is "0000", the final address data applied to the ROM RO1 is "00100000". In this case, the ROM RO1 produces a focal length data of "01011" indicating that the focal length is 50 mm, as understood from Table 2. If the data from the device FS is "1010", the final address data applied to the ROM RO1 is "00101010". In this case, the ROM RO1 produces a data "01111" indicating that the focal length is 105 mm. Furthermore, if the data from the device FS is "1111", the final address data applied to the ROM RO1 is "00101111". In this case, the ROM RO1 produces data "10001" indicating that the focal length is 135 mm.

The focal length data produced from the ROM RO1 is stored in the shift register SR4 in response to a pulse produced from the terminal TL7 during the period S15 in a similar manner as described above, and by the positive edges of the clock pulses CP produced from the terminals TB0 to TB4 during a period S16 (FIG. 7, waveforms Bb0 to Bb4), the focal length data is stored in the shift register SR2 (FIG. 4a). And, thereafter, by a pulse from the terminal TB5, the focal length data is latched in the latch LA, and then, by a pulse from the terminal TB6, the AND gate AN18 produces a "HIGH" (FIG. 10 waveform AN18), thereby storing the focal length data in the register REG8. At this moment, the "HIGH" produced from the AND gate AN18 serves as a signal end2 which is applied to the set terminal of the flip-flop FF4, thereby producing "HIGH" from the Q output of the flip-flop FF4 (FIG. 7, waveforms AN18, end2 and FF4). The "HIGH" from the Q output of the flip-flop FF4 is applied to the input i3 of the micro-computer 1. Thus, the micro-computer 1 is informed that reading of all the data from the lens has been completed and that the read out data is temporarily stored in the interface circuit IF and, thereupon, it produces "LOW" from its output 02 for stopping the power supply to the lens.

Next, the micro-computer 1 starts to read data from the interface circuit IF through the data bus DB. First, when the data from the output OP3 of the micro-computer 1 is "5H", the output a0 of the decoder DE1 produces a "HIGH" and, therefore, the check data stored in the register REG0 is transmitted through the data selector MP1 and data bus DB to the micro-computer 1. Then, when the data from the output OP3 of the micro-computer 1. Then, when the data from the output OP3 of the micro-computer 1 is "6H", the output a1 of the decoder DE1 produces "HIGH" and, therefore, the dEvo data stored in the register REG1 is transmitted to the micro-computer 1. Likewise, the various data stored in the other registers REG3 to REG8 is sequentially transmitted to the micro-computer 1. When all the data from the interface circuit IF has been transmitted to the micro-computer 1, the micro-computer 1 carries out the procedure described above in connection with FIGS. 2a, 2b and 2c.

It is to be noted that the shift register SR1 shown in FIG. 4a and provided for outputing address data, and the shift register SR4 shown in FIG. 5 and provided for outputing accessory data, operate such that, as shown in FIGS. 6 and 7, by the positive edge of the pulse produced from the terminal TB7 (TL7), the data is parallelly stored in at once and, thereafter, by the positive edges of the pulses produced from the terminals TB0 to TB7 (TL0 to TL7), the stored data is sent out bit-by-bit serially from its output OUT from the most significant bit. This type of shift-register can be formed as follows. First, 8 flip-flops are provided for parallelly receiving 8 bits of data at a time at respective present terminals. A flip-flop which receives the least significant bit signal has its output connected to the input of a flip-flop which receives the second significant bit signal. The other flip-flops are connected in the same manner, and the flip-flop which receives the most significant bit signal is connected to an input of another (ninth) flip-flop. Thus, by a clock pulse applied to all the flip-flops, the signal present in the Nth flip-flop (N is an integer between 1 and 8) is sent to the (N+1)th flip-flop. Therefore, by a train of clock pulses applied to all the flip-flops, the 8-bit signal is sequentially produced out bit-by-bit from the output of the 9th flip-flop with a delay of one clock pulse.

The camera system according to the preferred embodiment of the invention as described above can be modified as follows. First of all, most of the control operations for controlling the aperture size and the shutter speed can be carried out by the micro-computer, and from this view point, many external parts can be eliminated. Secondly, it is possible to send the data already stored in the interface circuit IF parallel from the interface circuit IF to the micro-computer 1 during the reading and serial transmission of other data to the interface circuit IF. In this manner, the time for the data transmission from the lens to the micro-computer 1 can be shortened.

Furthermore, according to the flow chart shown in FIGS. 2a, 2b and 2c, the micro-computer 1 operates constantly and, therefore, it consumes electric power rather quickly. To prevent this, it is possible to reorganize the program so as to cut off the power when it is not necessary to run the micro-computer. Since such a reorganization of the program is not difficult to those skilled in the art, a further description therefor is omitted.

According to the first embodiment described above, the fixed data storing means, i.e., the ROM RO1, provided in each interchangeable lens is stored with 3 different address data for the light measurement error data corresponding respectively to 3 types of optical systems of the camera body. When one of the three different address data corresponding to the type of camera body on which the interchangeable lens is mounted is designated from said camera body, only a particular light measurement error data necessary for said camera body is read out and taken in to the camera body. It is to be noted that, according to the present invention, the manner in which the data is read out is not limited to the one described above, but can be done in other ways. For example, an address counter corresponding to the counter CO3 described as provided in the camera body can be provided in the interchangeable lens such that the address counter sequentially designates 3 different addresses, thereby producing 3 different light measurement error data. And in the camera body, only a necessary light measurement error data is selected. To this end, the camera body must be provided with a selecting means, which can be accomplished, for example, by providing a particularly designed input-device which permits the transmission of light measurement error data in a certain timed relation for a camera having a certain type of optical system. A second embodiment employing such an arrangement is described later in connection with FIGS. 8 to 12. As will be apparent from the description below, it is not necessary for the second embodiment to designate the address of ROM of the interchangeable lens from the camera body.

Furthermore, according to the first embodiment, the data producing device of the interchangeable lens is arranged such that the light measurement error data Avc is transferred as it is to the camera body. According to an alternative arrangement, the data Avc can be transferred to the camera body in a combined form with other data. For example, the ROM in the interchangeable lens may carry a combined data of Avo+Avc for each of 3 different camera bodies, so that when the interchangeable lens is mounted on one type of camera body, a combined data corresponding to said one type of camera body may be transferred from the lens to the camera body. Alternatively, instead of providing the set aperture size data to the camera body mechanically, as described in the above embodiment, it is possible to store the data Avs - Avc in ROM corresponding to the plurality of types of the camera bodies, in a similar manner to the other data, such as focusing distance data or focal length data, so that the aperture size data can be electrically transmitted from the lens to the camera body.

According to the first embodiment, although it is described that the signal corresponding to the light measurement error is transmitted in an electrical and digital form from the interchangeable lens to the camera body, such a signal can be prepared in other forms, for example, a mechanical signal. More specifically, the interchangeable lens may be provided with a plurality of signal producing elements (such as a plurality of pins each projecting in an amount corresponding to the amount of light measurement error) each having a mechanically arranged amount corresponding to the light measurement error for a particular type of camera body. In this case, the camera body may be so arranged as to receive a necessary light measurement error from one of the signal producing elements.

Moreover, according to the first embodiment, it has been described that the light measurement error signal has 3 different amounts, but can be any number other than 3 depending on the number of different optical systems available in the respective different camera bodies.

Figure 8:
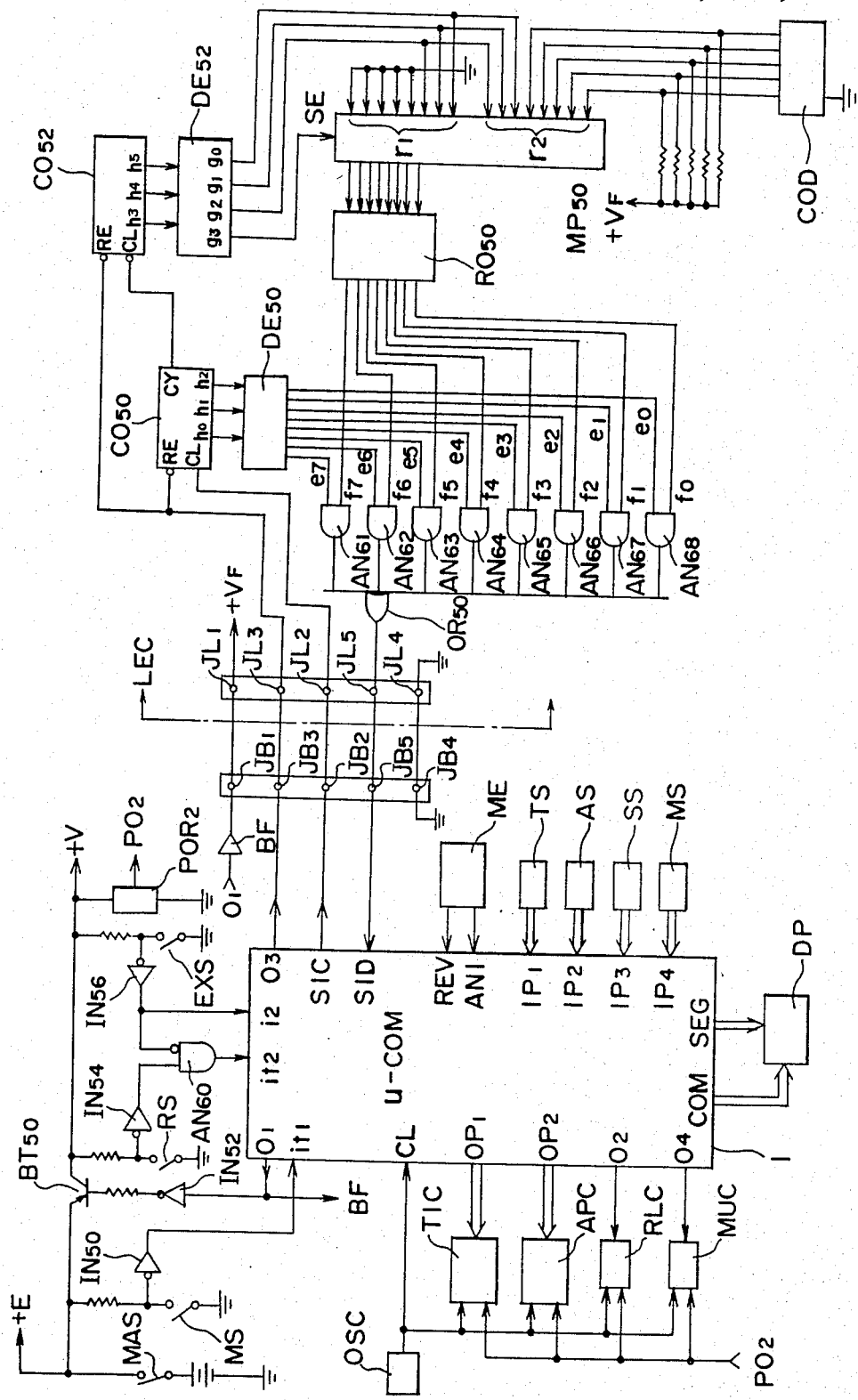
FIG. 8 is a block diagram of a camera system according to another embodiment of the present invention.

Referring now to FIG. 8, there is shown a block diagram of an interchangeable lens type camera system according to the second embodiment of the present invention. A circuit portion shown on the right-hand side of a chain line LEC is provided in an interchangeable lens, and the other is provided in a camera body. A reference character BA designates a battery, and MAS designates a manually operable switch for the power supply. When the switch MAS turns on, an electric power is supplied from a power supply line +E to the micro-computer 1 and also to the oscillator OSC, thereby resetting the micro-computer 1 and, at the same time, starting the sending of clock pulses from the oscillator OSC to the clock terminal CL of the micro-computer 1. The train of clock pulses is also applied to each of exposure time control circuit TIC, aperture control circuit APC, release circuit RLC and mirror release circuit MRC.

A reference character MS designates a light measuring switch that closes when a shutter release button (not shown) is depressed down to a first level. When the switch MS closes, an inverter IN50 produces "HIGH" from its output, and this "HIGH" is applied to an interruption input it1 of the micro-computer 1. When the micro-computer 1 receives "HIGH" to its interruption input it1, an output O1 produces "HIGH", whereby an inverter IN52 produces "LOW" causing a transistor BT50 to go to a conductive state. Thus, electric power is supplied from the power supply line +V to the circuit elements in the camera side other than the oscillator OSC and the micro-computer 1. Electric power is further supplied through a buffer BF, terminals JB1 and JL1 to a power supply line +VF in the interchangeable lens.

When the power supply starts from the power line +V in response to the turning on of the transistor BT50, a power-on-reset circuit POR2 so actuates as to provide a pulse to the exposure time control circuit TIC, aperture control circuit APC, release circuit RLC and mirror release circuit MRC, thereby resetting these circuits.

A reference character ME designates a light measuring circuit which produces an analog form output signal representing:

$$Bv - Avo - Avc$$

wherein Bv is the brightness of the object, Avo is the full open aperture value, and Avc is full open aperture light measurement error. The signal produced from the light measuring circuit ME is applied to an A/D conversion input terminal ANI of the micro-computer 1. Furthermore, an input terminal REV of the mirco-computer 1 is provided for inputting reference voltage for being used in an D/A converter provided in the micro-computer 1. To the input terminal REV, a reference voltage from a constant voltage source provided in the light measuring circuit ME is applied.

A reference character TS designates a device for producing data of set exposure time which is applied to an input port IP1 of the micro-computer 1. A reference character AS designates a device for producing data of set aperture amount which is applied to an input port IP2 of the micro-computer 1. A reference character SS designates a device for producing data of film sensitivity which is applied to an input port IP3 of the micro-computer 1. A reference character MS designates a device for producing data corresponding to the set exposure calculation mode which is applied to an input port IP4 of the micro-computer 1. A reference character DP designates a display circuit for displaying various data, such as exposure control value. The data to be displayed is controlled by signals obtained from common terminal COM and segment terminal SEG which are provided to the micro-computer 1.

An output O3 of the micro-computer 1 is connected through terminals JB3 and JL3 to a reset terminal RE of each of counters CO50 and CO52. The output O3 produces "HIGH" while reading data from the mounted interchangeable lens, thereby releasing the counters CO50 and CO52 from the reset condition. A terminal SIC of the micro-computer 1 is provided for producing clock pulses, and in a synchronized manner with the clock pulses, data from the lens is serially read out and taken into the micro-computer through a terminal SID. The terminal SIC is connected through terminals JB2 and JL2 to a clock input terminal CL of the counter CO50, and the terminal SID is connected through terminals JL5 and LB5 to an output of an OR gate OR 50.

Figure 9:
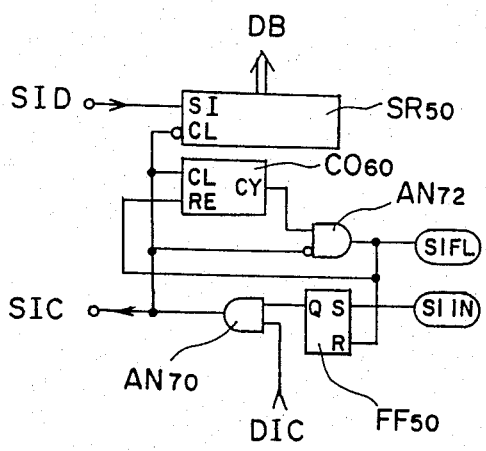
FIG. 9 shows an exemplified circuit diagram of a serial data reading portion shown in FIG. 8.
Figure 10:
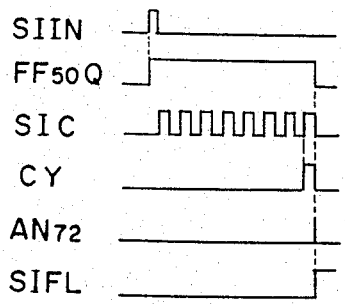
FIG. 10 is a time chart showing waveforms obtained from the circuit of FIG. 9.

FIG. 9 shows an exemplary circuit to be provided in the micro-computer 1 and connected to the above-mentioned terminals SIC and SID for reading the serial data, and FIG. 10 shows waveforms of signals appearing in the circuit of FIG. 9. In FIG. 9, when a data-reading request signal SIIN (FIG. 10, SIIN) is applied to a flip-flop FF50, the flip-flop FF50 turns to a set condition (FIG. 10, FF50). Thus, an AND gate AN70 produces a train of clock pulses DIC. The clock pulses DIC are produced from a frequency divider provided in the micro-computer 1 so that the clock pulses DIC have a frequency lower than that of the clock pulses produced from the oscillator OSC. The clock pulses DIC are outputted from the terminal SIC and, at the same time, are applied to clock terminal CL of each of 3-bit binary counter CO60 and 8-bit shift register SR50. In response to the negative edge of each clock pulse applied to the clock terminal CL, the shift register SR50 takes in the data through the terminal SID. Then, in response to the positive edge of the 8th clock pulse, a carry terminal CY of the counter CO60 produces "HIGH" (FIG. 10, CY), and in response to the negative edge of the 8th clock pulse, an AND gate AN72 produces "HIGH" (FIG. 10, AN72), thereby resetting the flip-flop FF50 and counter CO60. Furthermore, the "HIGH" from the AND gate AN72 causes a flag SIFL (FIG. 10, SIFL) to become "HIGH" for inputting serial data, thereby completing the operation.

Referring again to FIG. 8, a switch RS is a release switch which closes when the shutter release button is depressed down to a second level, and a switch EXS is a switch that closes when an exposure control mechanism (not shown) completes its operation and opens when the exposure control mechanism is set to a charged condition ready to start its operation. When the switch EXS opens upon completion of charging of the exposure control mechanism, an inverter IN56 produces "LOW". While the inverter IN56 is producing "LOW", and when the release switch RS closes, an AND gate AN60 produces "HIGH" which is applied to the interruption terminal it2 of the micro-computer 1. In response to the positive edge of the "HIGH" applied to the interruption terminal it2, the micro-computer 1 starts to carry out the exposure control operation no matter what operation has been carried out. Contrary, when the switch EXS is held closed as it is before the completion of charge of the exposure control mechanism, the inverter IN56 produces "HIGH". While the inverter IN56 is producing "HIGH", the AND gate AN60 continues to produce "LOW" even when the release switch RS closes. Thus, in this case, the micro-computer 1 will not carry out the exposure control operation.

An output port OP1 of the micro-computer 1 produces an exposure time data Tv and applies it to an exposure time control circuit TIC, and an output port OP2 produces aperture stop down data Av-Avo and applies it to an aperture control circuit APC. Furthermore, an output O2 of the mirco-computer 1 produces a pulse that effects the start of exposure control, and the produced pulse is applied to a release circuit RS. An output O4 of the micro-computer 1 also produces a pulse, but this pulse effects the start of mirror-up operation. The pulse produced from the output O4 is applied to the mirror release circuit MRC.

It is to be noted that the input ports IP1 to IP4 and output ports OP1 to OP2 can be replaced with a common data bus so that the signal transmission between the micro-computer 1 and each of the circuits TS, AS, SS, MS, TIC, and APC can be carried out in a time divided manner.

Next, the description is directed to the circuit provided in the lens. The counter CO50, which is a 3-bit binary counter, counts the positive edges of the clock pulses produced from the terminal SIC, and the counter CO52, hich is also a 3-bit binary counter, counts negative edges of the pulses produced from the carry terminal CY of the counter CO50. The three outputs h2, h1 and h0 of the counter CO50 are connected to the decoder DE50, which produces output relatively to the counted number of pulses from the counter CO50, as shown in Table 7 below.

TABLE 7

| Counter CO50 | | | Decoder DE50 | | | | | | | |
|---|---|---|---|---|---|---|---|---|---|---|
| h2 | h1 | h0 | e7 | e6 | e5 | e4 | e3 | e2 | e1 | e0 |
| 0 | 0 | 0 | H | L | L | L | L | L | L | L |
| 0 | 0 | 1 | L | L | L | L | L | L | L | H |
| 0 | 1 | 0 | L | L | L | L | L | L | H | L |
| 0 | 1 | 1 | L | L | L | L | L | H | L | L |
| 1 | 0 | 0 | L | L | L | L | H | L | L | L |
| 1 | 0 | 1 | L | L | L | H | L | L | L | L |
| 1 | 1 | 0 | L | L | H | L | L | L | L | L |
| 1 | 1 | 1 | L | H | L | L | L | L | L | L |

The three outputs h2, h1 and h0 of the counter CO52 are connected to the decoder DE52. Thus, the decoder DE52 produces a 4-bit signal from its output g3, g2, g1 and g0 in response to the signal from the counter CO52, as shown in Table 8, below.

TABLE 8

| Counter CO52 | | | Decoder DE52 | | | |
|---|---|---|---|---|---|---|
| h5 | h4 | h3 | g3 | g2 | g1 | g0 |
| 0 | 0 | 0 | 0 | 0 | 0 | 0 |
| 0 | 0 | 1 | 0 | 0 | 0 | 1 |
| 0 | 1 | 0 | 0 | 0 | 1 | 0 |
| 0 | 1 | 1 | 0 | 0 | 1 | 1 |
| 1 | 0 | 0 | 0 | 1 | 0 | 0 |
| 1 | 0 | 1 | 0 | 1 | 0 | 1 |
| 1 | 1 | 0 | 0 | 1 | 1 | 0 |
| 1 | 1 | 1 | 1 | 0 | 0 | 1 |

Of the outputs of the decoder DE52, the output g3 is connected to the select terminal SE of the data selector MP50. When the data selector MP50 receives "LOW" to its select terminal SE from the output g3, it produces a signal applied to its input r1 and when the same receives "HIGH", it produces a signal applied to its input r2. The signal produced from the data selector MP50 is applied to a ROM RO50 as an address signal. The input r1 includes 8 terminals in which the terminals of the upper 5 bits are grounded, and the terminals of the lower 3 bits are connected to the outputs g2, g1 and g0 of the decoder DE52. Therefore, the ROM RO50 receives an address signal "00000000", "00000001", . . . , or "00000110" in response to the output "000", "001", . . . , or "110", respectively, of the counter CO52. The input r2 also includes 8 terminals in which the terminals of the upper 3 bits are connected to the outputs g2, g1 and g0 of the decoder DE52 and the terminals of the lower 5 bits are connected to a code plate of a focal length setting device (not shown) of a zoom lens. Therefore, when the counter CO52 produces "111", the data selector MP50 produces "001∅∅∅∅∅" as an address signal, wherein the lower 5 bits ∅∅∅∅∅ carry a signal obtained from the code plate COD.

Next, the signals stored in the ROM RO50 are described with reference to the Table 9 given below.

TABLE 9

| Address | Significance |
|---|---|
| 0 0 0 0 0 0 0 0 | Zoom/Fixed Focal length |
| 0 0 0 0 0 0 0 1 | Fully-Open Aperture Value Avo |
| 0 0 0 0 0 0 1 0 | Maximum Open Aperture Value Avmax |
| 0 0 0 0 0 0 1 1 | Minimum/Fixed Focal length fw |
| 0 0 0 0 0 1 0 0 | |
| 0 0 0 0 0 1 0 1 | Fully-Open Aperture light measurement |
| 0 0 0 0 0 1 1 0 | error Avc |
| 0 0 1 0 0 0 0 0 | |
| | Set Focal length |
| 0 0 1 1 1 1 1 1 | |

At the address "00H" (H indicates that the number is given in a hexadecimal numbering system) of the ROM RO50, a data "F8H" is stored if the mounted lens is a zoom lens, and "F0H" if it is a Fixed focal length lens. If neither of the data "F8H" or "F0H" is read-in in the camera, it is determined that no lens is mounted on the camera body. In this case, the exposure control is carried out under an aperture stop down light measuring mode. If either of the data "F8H" or "F0H" is read-in in the camera, the exposure control is carried out under fully-open aperture light measuring mode.

At the address "01H", data Avo representing the fully-opened aperture size is stored. At the address "02H", data Avmax representing the maximum aperture size is stored. At the address "03H", data representing the focal length of the lens, if the lens is fixed focal length type, is stored or data representing the minimum focal length, if the lens is a zoom lens, is stored.

At the addresses "03H", "04H" and "05H", three different data Avc representing the fully-opened aperture light measurement error for the three different types of camera bodies are stored.

If the mounted lens is a zoom lens, a number of focal length data corresponding to the data obtained from the code plate COD are stored at the addresses "00100000" to "00111111". Such data representing the focal length of the zoom lens is used for producing a warning signal of wobbling when the focal length becomes long.

Figure 11:
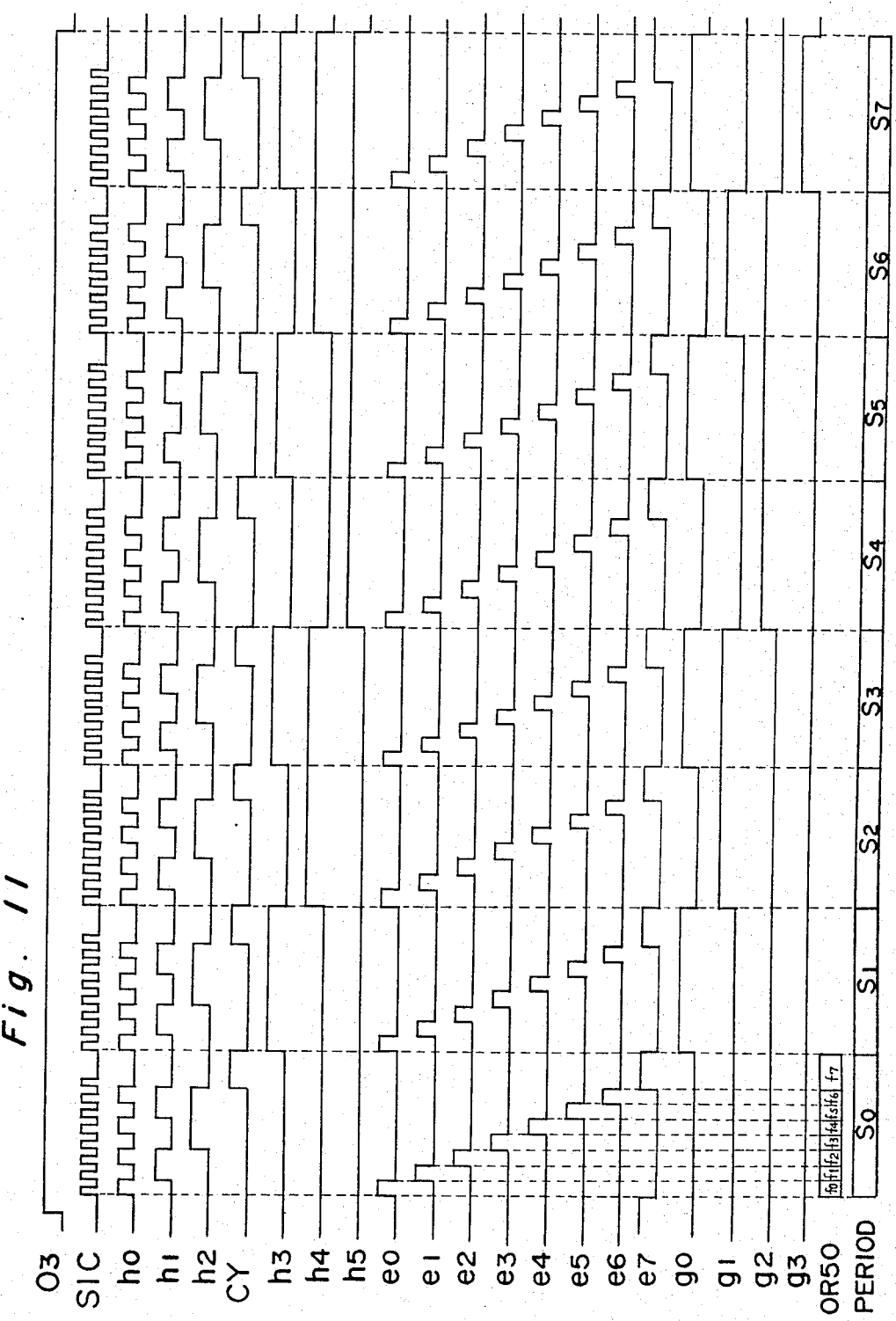
FIG. 11 is a time chart showing waveforms obtained from the circuit of FIG. 8.

Referring to FIG. 11, a time chart of various waveforms is given, showing the operation of data reading from the lens of the second embodiment of FIG. 8. Now, the description is directed to the data reading from the lens with reference to the time chart of FIG. 11. First, the output O3 of the micro-computer 1 produces "HIGH" so as to release the counters CO50 and CO52 from the reset condition. As has been described above in connection with FIGS. 9 and 10, the clock terminal SIC of the micro-computer 1 produces a train of 8 clock pulses each time a data of 1 bit-long is read-in. In the period S0 for reading the first data, a location in the ROM RO50 is specified by an address "00000000" so as to produce a check data "F0H" or "F8H". Then, as the counter CO50 counts up, the decoder DE50 sequentially produces "HIGH" from its outputs e0 to e7. Accordingly, AND gates AN68 to AN61 open one after another to transmit the 8-bit data produced from the terminals f0 to f7 of the ROM RO50 to an OR gate OR50, which then serially produces the 8-bit data bit-by-bit from the least significant bit. The serially produced 8-bit data is transmitted through the terminals JL5 and JB5 to the input SID of the micro-computer 1. The signal serially applied to the input SID is serially stored in the shift register SR50 of the micro-computer 1, in a similar manner described in connection with FIGS. 9 and 10, in response to the negative edges of the clock pulses which are the same as those applied to the terminal SIC.

In response to the positive edge of the 8th clock pulse, the counter CO50 produces "HIGH" from its carry terminal CY, thereby starting a new period S1. Then, in response to the positive edge of the 1st clock pulse, the counter CO50 produces "LOW" from its carry terminal CY, thereby effecting the count up of the counter CO52 by 1. Then, the ROM RO50 receives an address data "00000001" as obtained from the input r1 of the data selector MP50.

Thereafter, a similar operation is carried out repeatedly until the period S6 ends, whereby the micro-computer 1 reads data stored in various locations in the ROM RO50 as specified by the address "00H" to "06H". When the carry terminal CY produces "LOW" at the end of the period S6, the counter CO52 produces "111", thereby the decoder DE52 produces "1001". Thus, the data selector MP50 selects input r2, thereby producing an address data "001∅∅∅∅∅", which is applied to the ROM RO50. Here, ∅∅∅∅∅ represents a 5-bit signal obtained from the code plate COD. Thereupon, the ROM RO50 produces a data representing the set focal length in a similar manner described above, and the produced data is read-in in the micro-computer 1, thereby completing the data reading from the mounted zoom lens. When the data reading from the zoom lens completes, the micro-computer 1 produces "LOW" from its output O3, thereby turning the counters CO50 and CO52 to the reset condition. In the case where the mounted lens is a fixed focal length type, the micro-computer 1 produces "LOW" from its output O3 at the end of the period S6, thereby turning the counters CO50 and CO52 to the reset condition and, at the same time, completing the data reading from the mounted lens.

Figure 12A:
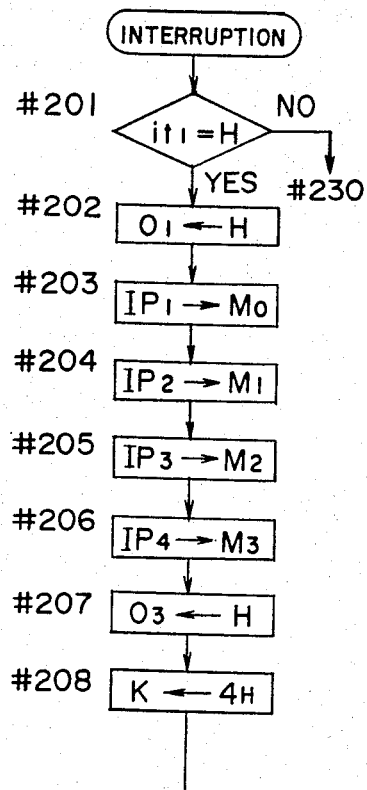
FIGS. 12a and 12b show a flow chart according to said another embodiment of the present invention.
Figure 12A:
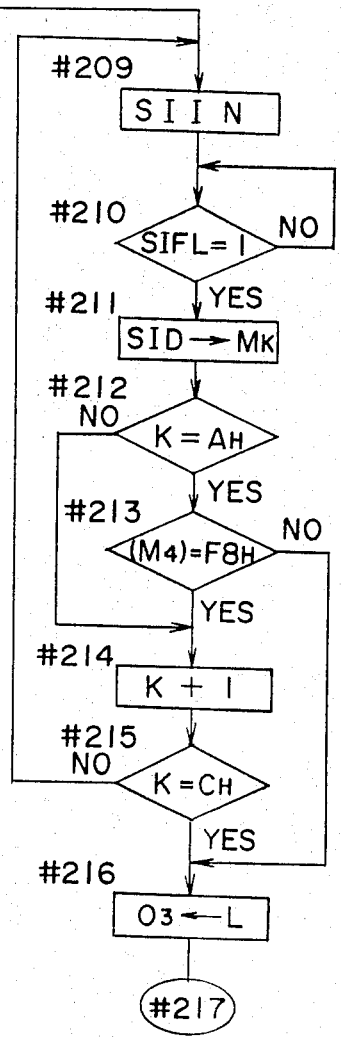
Figure 12B:
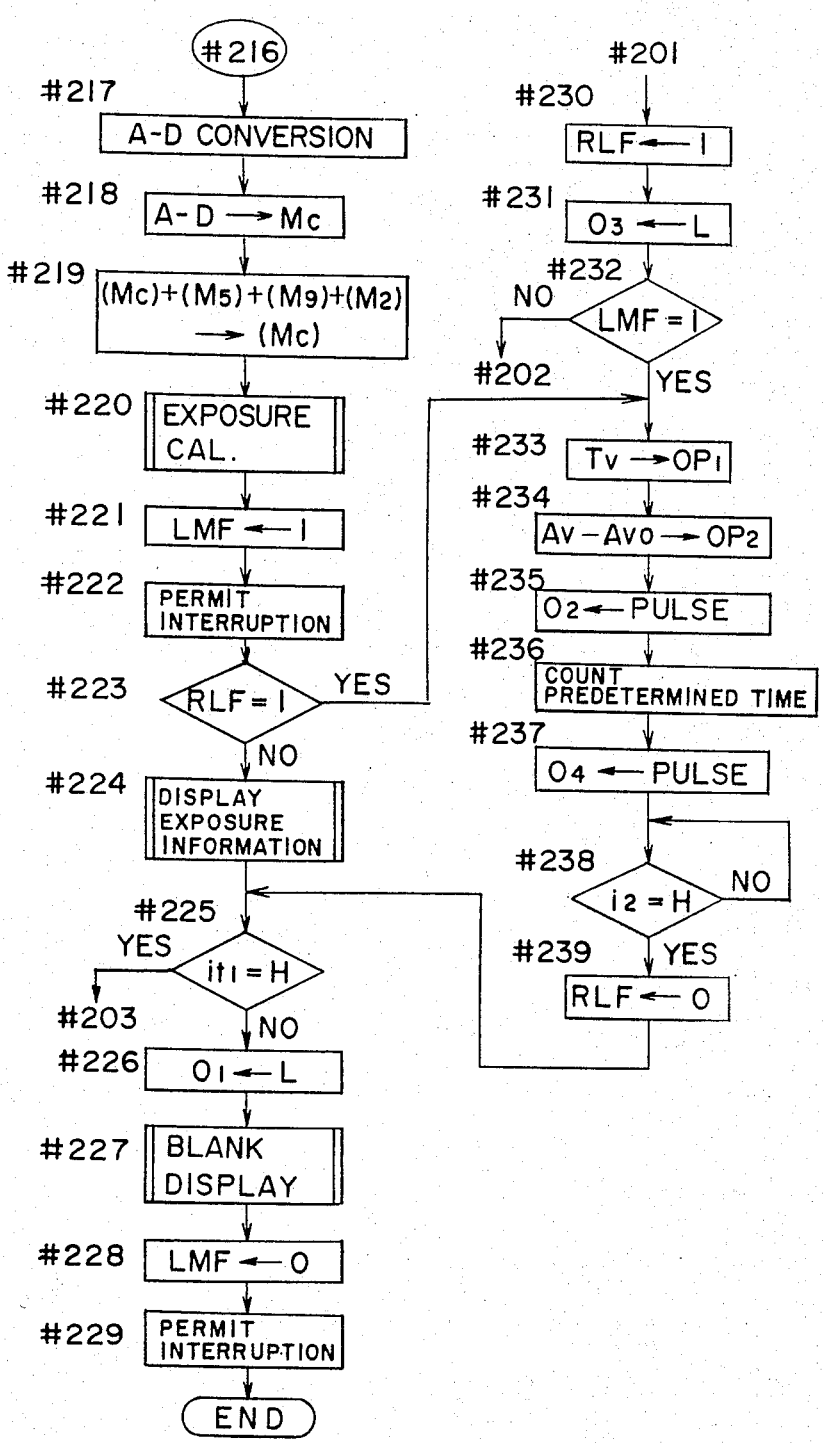

Referring to FIGS. 12a and 12b, a flow chart is given, showing an operation of the micro-computer 1 according to the second embodiment. Now, the operation of the circuit of FIG. 8 is described with reference to the flow chart of FIGS. 12a and 12b.

When the light measuring switch MS turns on, an interruption signal is applied to the interruption terminal it1, thereby start actuating the micro-computer 1 from the step #201. In the step #201, it is determined whether the terminal it1 is receiving "HIGH" or not. When the interruption terminal it1 receives "HIGH", the procedure advances to the step #202 in which the output O1 produces "HIGH", whereby the inverter IN52 produces "LOW". Thus, the transistor BT50 conducts to supply power to the power line +V. The "HIGH" from the output O1 is also applied to through the buffer BF, terminals JB1 and JL1 to the lens. Then, the set data from the input ports IP1, IP2, IP3 and IP4 are sequentially transmitted and stored in registers MO, M1, M2 and M3 in the steps #203, #204, #205 and #206.

Then, in the step #207, the output O3 produces "HIGH", thereby releasing the counters CO50 and CO52 from the reset condition, and at the same time, setting "4H" in a k-register. And, in the step #209, the serial reading of the data from the lens to the camera is carried out in the manner described above until the completion flag SIFL holds "1". When the flag SIFL holds "1", the read-in data is stored in a register Mk (initially, it is M4) and, thereafter, it is determined in the step #212 whether the k-register is carrying "AH" or not. If the k-register is not carrying "AH", "1" is added to the content of the k-register and the procedure advances to the step #215, wherein it is determined whether k-register is carrying "CH" or not. In the step #215, if it is discriminated that the k-register is not carrying "CH", the procedure returns back to the step #210 to read in the next data. After carrying out the above procedure for a number of times and, when it is determined that the step #212 that the k-register is carrying "AH", it is further determined in the step #213 whether the content of the register M4 is "F8H" or not. If it is determined that the register M4 is not carrying "F8H", it is understood that the mounted lens is a focal length fixed type, or that no lens is mounted. In such a case, it is not necessary to further read-in any data from the lens and, accordingly, the procedure advances to the step #216. Contrary, if it is determined that the register M4 is carrying "F8H", it is understood that the mounted lens is a zoom lens. In such a case, the procedure advances to the step #214 and further to #215 to carry out the data reading Then, in the step #215, if it is determined that the k-register is carrying "CH", the procedure advances to the step #216. Thus, in the registers M4 to MB, various data as indicated below are stored.

register M4: check code;
register M5: Avo;
register M6: Avmax;
register M7: fw;
register M8: Avc1 for the first type of the camera;
register M9: Avc2 for the second type of the camera;
register MA: Avc3 for the third type of the camera; and
register MB: fs.

Then, in the step #216, the output O3 produces "LOW", thereby resetting the counters CO50 and CO52. And then, referring to FIG. 12b, in the step #217, the analog signal produced from the light measuring circuit ME is converted into digital form, and the converted digital signal Bv-Avo-Avc2 is stored in a register Mc. Then, in the step #219, the content Bv-Avo-Avc2 of the register Mc is added with the contents Avo, Avc2 and Sv of the registers M5, M9 and M2, respectively, thereby calculating an exposure value Ev as follows:

$$EV = (Bv - Avo - Avc2) + Avo + Avc2 + Sv = Bv + Sv.$$

The obtained sum, i.e., the exposure value Ev is again stored in the register Mc.

It is to be noted that the above calculation is carried out when the camera body has the optical system of the second type. If the camera body has the optical system of the first type, the content of the register M8 should be added; and if the camera body has the optical system of the third type, the content of the register MA should be added. Then, using the obtained sum Ev, the exposure calculation is carried out in the step #220.

When the exposure calculation completes, the flag LMF carries "1" in the step #221, and then, the interruption routine is permitted in the step #222. In the next step #223, it is determined whether the flag RLF is carrying "1" or not. If the flag RLF is carrying "1", the procedure advances to the step #233, and if not, the procedure advances to the step #224 for displaying the exposure information. A detailed description on the flag RLF will be given later.

In the step #225, it is determined whether the interruption terminal it1 is receiving "HIGH" or not. If the interruption terminal it1 is receiving "HIGH", the procedure returns back to the step #203 to repeat the operation thereafter. If the terminal it1 is receiving "LOW", the output O1 produces "LOW", thereby cutting the power supply to the power line +V and also to the circuits in the lens. Then, in the step #227, nothing is displayed (blank display), and in the step #228, flag LMF for the light measuring carries "0". Then, the interruption routine is permitted (step #229) and ending the operation of the micro-computer 1 (step #230).

When the shutter release switch RS closes under the condition that the exposure control mechanism is charged and that the switch EXS is held open, the AND gate AN60 produces "HIGH", thereby providing "HIGH" to the interruption terminal it2. Then, the micro-computer 1 immediately starts the procedure from the step #201 (FIG. 12a) no matter what operation it is carrying out. Then, the procedure advances from the step #201 to the step #230 (FIG. 12b), because it is determined in the step #201 that the interruption terminal receiving "HIGH" is not it1, but it2. In the step #230, the flag RLF for the release holds "1", and in the step #231, the output O3 produces "LOW" just in case the interruption routine is requested while carrying out the serial reading of data. Then, in the step #232, it it determined whether the flag LMF is carrying "1" or not, i.e., whether the calculation for obtaining the exposure control data is completed or not. If not, the procedure returns back to the step #202 to carry out the exposure calculation through the steps #202 to #223, and continues again from the step #233. If the flag LMF is carrying "1" in the step #232, the procedure advances directly to the step #233.

In the step #233, exposure time data Tv is supplied from the output OP1 to the exposure time control circuit TIC. Then, in the step #234, aperture stop down data Av-Avo is supplied from the output OP2 to the aperture control circuit APC. And, in the step #235, a pulse for the shutter release is supplied from the output O2 to the release circuit RLC of the exposure control mechanism.

In the next step #236, a predetermined time is counted and, thereafter, a pulse for effecting the shutter release is supplied to the mirror-up release circuit MRC. Then, the program waits until the input terminal i2 receives "HIGH", i.e., until the switch EXS closes upon completion of the exposure control operation. When the input terminal i2 receives "HIGH", the flag RLF holds "0", and thereafter, the procedure continues from the step #225. If the light measuring switch MS is held closed the procedure follows the steps of #225, #203 et seq., and if it is held open, the procedure follows the steps of #225, #226 et seq., thereby cutting the power supply, turning off the display, setting "0" in the flag LMF, and ending the operation of the micro-computer 1. Now it is ready to carry out another cycle of operation as carried out when an interruption signal is applied to the terminal it1 while the light measuring switch MS is held closed.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. In a camera system with an interchangeable objective lens a combination of, a camera and an interchangeable objective lens selectively attachable to said camera body and to at least one different camera body, comprising:
means located in said interchangeable objective lens for storing a plurality of compensation data suitable to said first mentioned camera body and to the at least one different camera body, respectively, to prepare for each case of compensating an error in a fully-open aperture light measurement;
means located in said interchangeable objective lens for transmitting said compensation data to the camera body to which said interchangeable objective lens is attached;
means located in said first mentioned camera body for registering said compensation data from said transmitting means;
means located in said first mentioned camera body for controlling the camera system so that a predetermined one of said compensation data stored in said storing means is registered in said registering means;
means located in said first mentioned camera body for practicing a fully-open aperture light measurement through said interchangeable objective lens to produce light measuring information including the error; and
means located in said first mentioned camera body for calculating correct exposure information in response to said compensation data registered in said registering means and said light measuring signal, in which the error included in said light measuring signal is removed by utilizing said compensation data registered in said registering means.

2. The invention of claim 1, wherein said controlling means includes means for forwarding a digital signal to said interchangeable objective lens, and said storing means includes a read only memory with a plurality of addresses at which said compensating data is located, respectively, and wherein said interchangeable objective lens further comprises means for determining an address of said storing means in response to said digital signal, whereby said compensation data located at the determined address is transmitted by said transmitting means.

3. The invention of claim 2, wherein said forwarding means includes means for selectively producing a predetermined address data as said digital signal for designating an address at which the predetermined one of said compensation data is stored, and said determining means includes means for passing said predetermined address data from said producing means to said storing means, whereby the predetermined one of said compensation data is transmitted to be registered in said registering means.

4. The invention of claim 2, wherein said forwarding means includes means for generating a train of clock pulses as said digital signal, and said determining means includes means for designating the addresses of said storing means one by one in response to said clock pulses from said generating means to transmit said plurality of compensation data one by one by means of said transmitting means, and wherein said controlling means further includes means for actuating said registering means to register the predetermined one of said compensation data in a timing when the predetermined one of said compensation data arrives at said first mentioned camera body.

5. The invention of claim 2, wherein said storing means further includes an address for storing exposure compensating data to be transmitted to said first mentioned camera body for the purpose of compensating an exposure error upon fully-open aperture size control, and said calculating means further includes means for providing aperture size information and at least another exposure factor information in response to said correct exposure information, and wherein said first mentioned camera body further comprises means for discriminating whether or not the calculated aperture size information corresponds to the fully-open aperture size, means responsive to said discriminating means for modifying said other exposure factor information by said exposure compensating data when the calculated aperture size information corresponds to the fully-open aperture size, and for adopting said other exposure factor information as it is when the calculated aperture size information does not correspond to the fully-open aperture size, means for controlling the aperture size in response to said providing means, and means for controlling another exposure factor in response to said modifying and adopting means.

6. In a camera system with an interchangeable objective lens, a camera body to be combined with an interchangeable objective lens which stores a plurality of compensation data suitable to the camera body and at least one different camera body, respectively, to prepare for each case of compensating an error in fully-open aperture light measurement, comprising:

means for registering the compensation data to be transmitted from the interchangeable objective lens;

means for controlling the camera system so that a predetermined one of the plurality of compensation data is registered in said registering means;

means for practicing a fully-open aperture light measurement through the interchangeable objective lens to produce light measuring information including the error; and means for calculating correct exposure information in response to said compensation data registered in said registering means and said light measuring signal, in which the error included in said light measuring signal is removed by utilizing said compensation data registered in said registering means.

7. The invention of claim 6, wherein said controlling means includes means for ordering the interchangeable objective lens to selectively transmit the predetermined one of the plurality of compensation data to said registering means.

8. The invention of claim 6, wherein said controlling means includes means for making the interchangeable objective lens transmit the plurality of compensation data one by one, and means for actuating said registering means to register the predetermined one of the compensation data in a timing when the predetermined one of the compensation data arrives at the camera body.

9. In a camera system with an interchangeable objective lens, an interchangeable objective lens selectively attachable to a plurality of different camera bodies each capable of fully-open aperture light measurement, comprising:

read only memory having a plurality of addresses for storing a plurality of compensation data suitable to the plurality of camera bodies, respectively, to prepare for each case of compensating an error in fully-open aperture light measurement;

means for receiving a digital signal from the camera body to which said interchangeable objective lens is attached;

means for determining an address of said read only memory in response to said digital signal; and means for transmitting the compensation data stored in the determined address to the camera body to which said interchangeable objective lens is attached.

10. The invention of claim 9, wherein said receiving means includes means for introducing address data as said digital signal, and said determining means includes means for passing said address data from said introducing means to said read only memory to designate an address.

11. The invention of claim 9, wherein said receiving means includes means for introducing a train of clock pulses as said digital signal, and said determining means includes means for designating the address of said read only memory one by one in response to said clock pulses.

12. In a camera system with an interchangeable objective lens, an interchangeable objective lens attachable to a camera body capable of an automatic exposure control, comprising:

a read only memory having a plurality of addresses, one of which stores an exposure time compensating data for compensating an exposure error upon fully-open aperture size control;

means for receiving a digital signal from the camera body;

means for determining an address of said read only memory in response to said digital signal; and means for transmitting the data stored in the determined address to the camera body.

13. In a camera system with an interchangeable objective lens, a camera body to be combined with an interchangeable objective lens which stores exposure compensating data for compensating an exposure error upon fully-open aperture size control, comprising:

means for receiving the exposure compensating data from the interchangeable objective lens;

means for practicing a light measurement to produce exposure information;

means for providing aperture size information and at least another exposure factor information in response to said exposure information;

means for discriminating whether or not the calculated aperture size information corresponds to the fully-open aperture size;

means responsive to said discriminating means for modifying said other exposure factor information by said exposure compensating data when the calculated aperture size information corresponds to the fully-open aperture size, and for adopting said other exposure factor information as it is when the calculated aperture size information does not correspond to the fully-open aperture size;

means for controlling the aperture size in response to said providing means; and means for controlling an exposure factor in response to said modifying and adopting means.

14. A camera system capable of compensating an exposure error upon fully-open aperture size control comprising:

means for preparing exposure compensating data;

means for practicing a light measurement to produce exposure information;

means for providing aperture size information and at least another exposure factor information in response to said exposure information;

means for discriminating whether or not the calculated aperture size information corresponds to the fully-open aperture size;

means responsive to said discriminating means for modifying said other exposure factor information by said exposure compensating data when the calculated aperture size information corresponds to the fully-open aperture size, and for adopting said other exposure factor information as it is when the calculated aperture size information does not correspond to the fully-open aperture size;

means for controlling the aperture size in response to said providing means; and means for controlling an exposure factor in response to said modifying and adopting means.

* * * * *